(12) United States Patent
Layachi et al.

(10) Patent No.: US 9,420,284 B2
(45) Date of Patent: Aug. 16, 2016

(54) METHOD AND SYSTEM FOR SELECTIVELY PERFORMING MULTIPLE VIDEO TRANSCODING OPERATIONS

(71) Applicant: ECOLE DE TECHNOLOGIE SUPERIEURE, Montreal (CA)

(72) Inventors: Hicham Layachi, Laval (CA); Stephane Coulombe, Brossard (CA)

(73) Assignee: Ecole de Technologie Superieure, Montreal (CA)

( * ) Notice: Subject to any disclaimer, the term of this patent is extended or adjusted under 35 U.S.C. 154(b) by 0 days.

(21) Appl. No.: 14/303,477

(22) Filed: Jun. 12, 2014

(65) Prior Publication Data

US 2014/0294085 A1    Oct. 2, 2014

Related U.S. Application Data

(63) Continuation of application No. 13/226,332, filed on Sep. 6, 2011, now Pat. No. 8,755,438.

(60) Provisional application No. 61/417,721, filed on Nov. 29, 2010.

(51) Int. Cl.
*H04N 19/40* (2014.01)
*H04N 19/105* (2014.01)
(Continued)

(52) U.S. Cl.
CPC ....... *H04N 19/00472* (2013.01); *H04N 19/105* (2014.11); *H04N 19/176* (2014.11);
(Continued)

(58) Field of Classification Search
CPC ............. G03B 17/20; H04N 19/00472; H04N 19/105; H04N 19/176; H04N 19/40; H04N 19/51; H04N 19/513; H04N 19/61; H04N 7/50; H04N 7/26244; H04N 5/145; H04N 7/26765; H04N 7/26015
USPC ...................................... 375/240.16
See application file for complete search history.

(56) References Cited

U.S. PATENT DOCUMENTS 4,862,259 A * 8/1989 Gillard et al. ................. 348/699
5,983,251 A   11/1999 Martens et al.
(Continued)

FOREIGN PATENT DOCUMENTS

CA  PCTCA08/01821-ISR   4/2009
EP            2234083   6/2011
(Continued)

OTHER PUBLICATIONS

S. Borman, M. A. Robertson, R. L. Stevenson, "Block-matching subpixel motion estimation from noisy undersampled frames: an empirical performance evaluation," Proc. SPIE 3653, Visual Communications and Image Processing '99, 1442 (Dec. 28, 1998); doi: 10.1117/12.334654.
(Continued)

*Primary Examiner* — Shan Elahi
(74) *Attorney, Agent, or Firm* — IP-MEX Inc.; Victoria Donnelly

(57) ABSTRACT

Method and system for transcoding a sequence of input images into a sequence of output images that can effectively handle one or more transcoding uses cases are presented. The embodiments of the invention exploit the incoming metadata retrieved from the decoding process to adapt the video content and to achieve a significant speed-up in comparison to the traditional cascaded approach while maintaining high quality for output images.

24 Claims, 28 Drawing Sheets

(51) Int. Cl.
*H04N 19/176* (2014.01)
*H04N 19/513* (2014.01)
*H04N 19/61* (2014.01)
*H04N 5/14* (2006.01)
*H04N 19/51* (2014.01)

(52) U.S. Cl.
CPC ............ *H04N 19/40* (2014.11); *H04N 19/513* (2014.11); *H04N 19/61* (2014.11); *H04N 5/145* (2013.01); *H04N 19/51* (2014.11)

(56) References Cited

U.S. PATENT DOCUMENTS

| | | | |
|---|---|---|---|
| 6,081,622 A * | 6/2000 | Carr et al. | 382/236 |
| 6,639,945 B2 * | 10/2003 | Chaddha et al. | 375/240.23 |
| 6,674,873 B1 * | 1/2004 | Donescu | G06T 1/0035 375/E7.001 |
| 7,119,723 B1 * | 10/2006 | Nagori | 341/67 |
| 7,620,107 B2 | 11/2009 | Lee et al. | |
| 7,881,386 B2 * | 2/2011 | Liang et al. | 375/240.24 |
| 8,259,809 B2 * | 9/2012 | Lin | 375/240.17 |
| 8,311,095 B2 * | 11/2012 | Brown | H04N 21/234309 375/240.02 |
| 8,411,756 B2 | 4/2013 | Metoevi et al. | |
| 8,457,958 B2 * | 6/2013 | Koishida et al. | 704/230 |
| 8,767,838 B1 * | 7/2014 | Xin et al. | 375/240.26 |
| 8,982,952 B2 * | 3/2015 | Drezner et al. | 375/240.16 |
| 2002/0106019 A1 * | 8/2002 | Chaddha et al. | 375/240.02 |
| 2002/0110193 A1 * | 8/2002 | Yoo | H04N 19/70 375/240.02 |
| 2002/0163968 A1 | 11/2002 | Moschetti | |
| 2002/0176495 A1 | 11/2002 | Vetro et al. | |
| 2003/0016751 A1 | 1/2003 | Vetro et al. | |
| 2003/0039310 A1 * | 2/2003 | Wu et al. | 375/240.16 |
| 2003/0113027 A1 * | 6/2003 | Chan et al. | 382/240 |
| 2003/0201994 A1 * | 10/2003 | Taylor et al. | 345/581 |
| 2004/0028171 A1 * | 2/2004 | Nicholls | 376/402 |
| 2004/0114817 A1 | 6/2004 | Jayant et al. | |
| 2004/0126035 A1 | 7/2004 | Kyo | |
| 2005/0041740 A1 * | 2/2005 | Sekiguchi | H04N 19/139 375/240.16 |
| 2005/0135486 A1 * | 6/2005 | Lee | 375/240.16 |
| 2005/0175099 A1 | 8/2005 | Sarkijarvi | |
| 2005/0190872 A1 * | 9/2005 | Seong | H04N 21/23608 375/354 |
| 2005/0201627 A1 * | 9/2005 | Liang et al. | 382/239 |
| 2005/0234731 A1 * | 10/2005 | Sirivara et al. | 704/500 |
| 2006/0088105 A1 * | 4/2006 | Shen et al. | 375/240.21 |
| 2006/0088191 A1 * | 4/2006 | Zhang et al. | 382/107 |
| 2006/0245497 A1 | 11/2006 | Tourapis | |
| 2007/0014365 A1 * | 1/2007 | MacInnis | 375/240.16 |
| 2007/0016427 A1 * | 1/2007 | Thumpudi et al. | 704/500 |
| 2007/0024473 A1 * | 2/2007 | Nagori | 341/50 |
| 2007/0030901 A1 * | 2/2007 | Joch et al. | 375/240.16 |
| 2007/0058718 A1 | 3/2007 | Shen | |
| 2007/0201554 A1 | 8/2007 | Sihn | |
| 2007/0230919 A1 | 10/2007 | Bourge et al. | |
| 2007/0285500 A1 | 12/2007 | Ma et al. | |
| 2008/0002770 A1 | 1/2008 | Ugur | |
| 2008/0019559 A1 | 1/2008 | Wang et al. | |
| 2008/0043831 A1 * | 2/2008 | Sethuraman et al. | 375/240 |
| 2008/0056354 A1 * | 3/2008 | Sun | H04N 19/176 375/240.12 |
| 2008/0084925 A1 * | 4/2008 | Rozen et al. | 375/240.01 |
| 2008/0117978 A1 * | 5/2008 | Kapasi et al. | 375/240.16 |
| 2008/0120676 A1 * | 5/2008 | Morad et al. | 725/127 |
| 2008/0151106 A1 | 6/2008 | Verburgh | |
| 2008/0152000 A1 | 6/2008 | Kaushik | |
| 2008/0152005 A1 | 6/2008 | Oguz | |
| 2008/0187046 A1 | 8/2008 | Joch et al. | |
| 2008/0205515 A1 | 8/2008 | Kalva et al. | |
| 2008/0247465 A1 * | 10/2008 | Xin et al. | 375/240.16 |
| 2009/0083524 A1 | 3/2009 | Van Wel | |
| 2009/0103622 A1 | 4/2009 | Tripathi et al. | |
| 2009/0110066 A1 | 4/2009 | Wang et al. | |
| 2009/0196344 A1 * | 8/2009 | Brown | H04N 21/234309 375/240.02 |
| 2009/0196345 A1 * | 8/2009 | Nair et al. | 375/240.02 |
| 2009/0207918 A1 * | 8/2009 | Fan et al. | 375/240.23 |
| 2009/0296816 A1 * | 12/2009 | Drezner et al. | 375/240.16 |
| 2010/0027662 A1 | 2/2010 | Pigeon | |
| 2010/0104022 A1 * | 4/2010 | Chatterjee | H04N 21/234336 375/240.24 |
| 2010/0118948 A1 * | 5/2010 | Chatterjee | H04N 19/70 375/240.12 |
| 2010/0135383 A1 * | 6/2010 | Zhao et al. | 375/240.02 |
| 2010/0150168 A1 * | 6/2010 | Chatterjee | H04N 21/2365 370/465 |
| 2010/0165077 A1 * | 7/2010 | Yin | H04N 19/597 348/42 |
| 2010/0195716 A1 | 8/2010 | Klein Gunnewiek et al. | |
| 2010/0296580 A1 * | 11/2010 | Metoevi | H04N 19/00472 375/240.16 |
| 2010/0296581 A1 * | 11/2010 | Metoevi | H04N 19/00472 375/240.16 |
| 2011/0075732 A1 | 3/2011 | Wada et al. | |
| 2011/0293009 A1 * | 12/2011 | Steinberg et al. | 375/240.16 |
| 2012/0027091 A1 * | 2/2012 | Hsu | 375/240.16 |
| 2012/0027092 A1 | 2/2012 | Matsui | |
| 2012/0134417 A1 * | 5/2012 | Layachi et al. | 375/240.16 |
| 2012/0315011 A1 * | 12/2012 | Messmer et al. | 386/230 |
| 2012/0321273 A1 * | 12/2012 | Messmer | 386/224 |
| 2014/0288940 A1 * | 9/2014 | Grant et al. | 704/500 |

FOREIGN PATENT DOCUMENTS

| | | |
|---|---|---|
| JP | H9-182077 | 7/1996 |
| JP | H11-239354 | 8/1999 |
| JP | 2004-129099 | 4/2004 |
| JP | 2004-199222 | 7/2004 |

OTHER PUBLICATIONS

Intel Integrated Performance Primitives 5.3—Code Samples. [Online]. http://software.intel.com/en-us/articles/intelintegrated-performance-primitives-code-samples/ (last accessed Sep. 2, 2008).

H.264/AVC reference software JM 15.1. [Online]. http://iphome.hhi.de/suehring/tml/ (last accessed Mar. 2, 2009).

J. Bialkowski, M. Menden, M. Barkowsky, K. Illgner, A. Kaup, "A fast H.263 to H.264 inter-frame transcoder with motion vector refinement," presented at the Picture Coding Symposium (PCS), San Francisco, Dec. 2004.

J. Bialkowski, M. Barkowsky, and A. Kaup, "Fast video transcoding from H.263 to H.264/MPEG-4 AVC," Multimedia Tools Appl. 35, 2 (Nov. 2007), pp. 127-146, 2007; doi:10.1007/s11042-007-0126-7.

Q. Tang, P. Nasiopoulos, R. Ward "Fast block size prediction for MPEG-2 to H.264/AVC transcoding," Acoustics, Speech and Signal Processing, 2008. ICASSP 2008. IEEE International Conference on , vol., No., pp. 1029-1032, Mar. 31, 2008-Apr. 4, 2008; doi: 10.1109/ICASSP.2008.4517788.

V. Bhaskaran, K. Konstantinides. Image and Video Compression Standards: Algorithms and Architectures (2nd ed.) (The Springer International Series in Engineering and Computer Science). Kluwer Academic Publishers, Norwell, MA, USA, Jun. 1997, 472 pages.

H.R Lindman Analysis of variance in complex experimental designs, W.H. Freeman &Co, Hillsdale, N J USA, 1974, pp. 21-50, pp. 88-136.

ISO/IEC 14496-5:2001, "Information technology—Coding of audio-visual objects—Part 5: Reference software", second edition, Feb. 2005.

3GPP2 C.S0045-A, "Multimedia Messaging Service (MMS) Media Format and Codecs for cdma2000 Spread Spectrum Systems", version 1.0, Mar. 2006.

ITU-T/SG16, "Video codec test model, TMN8," Portland, Jun. 1997.

Hur, Jae-Ho and Lee, Yung-Lyul Lee "H.264 to MPEG-4 Transcoding Using Block Type Information" TENCON 2005, Melbourne, pp. 1-6 Nov. 24, 2005.

Oh, Seung-Kyun et al. "Motion Vector Estimation and Adaptive Refinement for the MPEG-4 to H.264/AVC Video Transcoder" Dec. 4-7, 2006.

(56) References Cited

OTHER PUBLICATIONS

Nguyen et al. "Efficient Video Transcoding Between H.263 and H.264/AVC Standards" May 23-26, 2005.
Nguyen et al. "Efficient Video Transcoding from H.263 to H.264/AVC Standard with Enhanced Rate Control" Shcool of Electrical & Electronic Engineering, Mayang Technological University, Journal on Applied Signal Processing, vol. 2006, pp. 1-15, Feb. 18, 2006.
A. Vetro, C. Christopoulos, and H. Sun, "Video transcoding architectures and techniques: An overview," IEEE Signal Processing Magazine, vol. 20, pp. 18-29, 2003.
I. Ahmad, X. Wei, Y. Sun, and Y.-Q. Zhang, "Video transcoding: An overview of various techniques and research issues," IEEE Transactions on Multimedia, vol. 7, pp. 793-804, 2005.
J. Xin, C.-W. Lin, and M.-T. Sun, "Digital video transcoding," Proceedings of the IEEE, vol. 93, pp. 84-97, 2005.
T. Wiegand, H. Schwarz, A. Joch, F. Kossentini, and G. J. Sullivan, "Rate-constrained coder control and comparison of video coding standards," IEEE Transactions on Circuits and Systems for Video Technology, vol. 13, pp. 688-703, 2003.
ISO/IEC 14496-10 AVC and ITU-T rec. H.264, "Advanced video coding for generic audiovisual services," Mar. 2009.
ISO/IEC 14496-2, "Information technology—Coding of audio-visual objects—Part 2: Visual," second edition, Dec. 2001.
T. Shanableh and M. Ghanbari, "Heterogeneous video transcoding to lower spatio-temporal resolutions and different encoding formats," IEEE Transactions on Multimedia, vol. 2, pp. 101-110, 2000.
X. Jun, S. Ming-Ting, and C. Kangwook, "Motion Re-estimation for MPEG-2 to MPEG-4 Simple Profile Transcoding," in Int. Packet Video Workshop Pittsburgh, 2002.
Y. Jeongnam, S. Ming-Ting, and L. Chia-Wen, "Motion vector refinement for high-performance transcoding," IEEE Transactions on Multimedia, vol. 1, pp. 30-40, 1999.
H. Sun, W. Kwok, and J. W. Zdepski, "Architectures for MPEG compressed bitstream scaling," IEEE Transactions on Circuits and Systems for Video Technology, vol. 6, pp. 191-199, 1996.
P. A. A. Assuncao and M. Ghanbari, "Post-processing of MPEG2 coded video for transmission at lower bit rates," in Proceedings of the 1996 IEEE International Conference on Acoustics, Speech, and Signal Processing, ICASSP. Part 4 (of 6). vol. 4: IEEE, Piscataway, NJ, USA, 1996, pp. 1998-2001.
Z. Peng, H. Qing-Ming, and G. Wen, "Key techniques of bit rate reduction for H.264 streams," Berlin, Germany, 2004, pp. 985-992.
W. Zhu, K. H. Yang, and M. J. Beacken, "CIF-to-QCIF video bitstream down-conversion in the DCT domain," Bell Labs Technical Journal, vol. 3, pp. 21-29, 1998.
N. Bjork and C. Christopoulos, "Transcoder architectures for video coding," IEEE Transactions on Consumer Electronics, vol. 44, pp. 88-98, 1998.
K. Panusopone, X. Chen, and F. Ling, "Logo insertion in MPEG transcoder," in 2001 IEEE Interntional Conference on Acoustics, Speech, and Signal Processing. vol. 2: Institute of Electrical and Electronics Engineers Inc., 2001, pp. 981-984.
J. Youn, J. Xin, and M.-T. Sun, "Fast video transcoding architectures for networked multimedia applications," in Proceedings of the IEEE 2000 Internaitonal Symposium on Circuits and Systems. vol. 4: Institute of Electrical and Electronics Engineers Inc., Piscataway, NJ, USA, 2000, pp. 25-28.
N. Feamster and S. Wee, "An MPEG-2 to H.263 transcoder," in Multimedia Systems and Applications II. vol. 3845: SPIE-Int. Soc. Opt. Eng, 1999, pp. 164-175.
Y.-K. Lee and Y.-L. Lee, "MPEG-4 to H.264 transcoding," in TENCON 2005—2005 IEEE Region 10 Conference. vol. 2007: Institute of Electrical and Electronics Engineers Inc., Piscataway, NJ 08855-1331, United States, 2007, p. 4084891.
I. Metoevi and S. Coulombe, "Efficient MPEG-4 to H.264 transcoding exploiting MPEG-4 block modes, motion vectors, and residuals," 2009 9th International Symposium on Communications and Information Technology, ISCIT 2009, Icheon, Korea, Republic of, 2009, pp. 224-229.

J. Bialkowski, M. Barkowsky, and A. Kaup, "Overview of low-complexity video transcoding from H.263 to H.264," in 2006 IEEE International Conference on Multimedia and Expo, ICME 2006. vol. 2006: Institute of Electrical and Electronics Engineers Computer Society, 2006, pp. 49-52.
P. List, A. Joch, J. Lainema, G. Bjontegaard, and M. Karczewicz, "Adaptive deblocking filter," IEEE Transactions on Circuits and Systems for Video Technology, vol. 13, pp. 614-619, 2003.
L. Qiang, L. Xiaodong, and D. Qionghai, "Motion information exploitation in H.264 frame skipping transcoding," in 9th International Conference on Advanced Concepts for Intelligent Vision Systems, ACIVS 2007. vol. 4678 NCS: Springer Verlag, Heidelberg, D-69121, Germany, 2007, pp. 768-776.
L. Chih-Hung, W. Chung-Neng, and C. Tihao, "A fast downsizing video transcoder based on H.264/AVC standard," in Advances in Multimedia Information Processing—PCM 2004. 5th Pacific Rim Conference on Multimedia. Proceedings, Part III: Springer-Verlag, 2004, pp. 215-223.
X. Di and P. Nasiopoulos, "Logo insertion transcoding for H.264/AVC compressed video," Piscataway, NJ, USA, 2009, pp. 3693-3696.
J. Zhang and A. T. S. Ho, "Efficient video authentication for H.264/AVC," Los Alamitos, CA, USA, 2006, p. 4 pp.
J.-H. Hur and Y.-L. Lee, "H.264 to MPEG-4 transcoding using block type information," in TENCON 2005—2005 IEEE Region 10 Conference. vol. 2007: Institute of Electrical and Electronics Engineers Inc., Piscataway, NJ 08855-1331, United States, 2007, p. 4084887.
J.-H. Hur and Y.-L. Lee, "H.264 to MPEG-4 resolution reduction transcoding," in TENCON 2005—2005 IEEE Region 10 Conference. vol. 2007: Institute of Electrical and Electronics Engineers Inc., Piscataway, NJ 08855-1331, United States, 2007, p. 4084886.
Intel Integrated Performance Primitives 5.3—Code Samples. [Online]. http://software.intel.com/en-us/articles/intel-integrated-performanceprimitives-code-samples/.
H.264/AVC reference software JM 16.1. [Online]. http://iphome.hhi.de/suehring/tml/.
ISO/IEC 14496-5:2001, "Information technology—Coding of audiovisual objects—Part 5: Reference Software," second edition, Feb. 2005.
S.Borman, M. Robertson and R.L. Stevenson "Block-Matching Sub-Pixel Motion Estimation from Noisy, Under-Sampled Frames—An Empirical performance Evaluation" SPIE Visual Communications and Image Processing Conference 1999.
W. Li and E. Salari "Successive Elimination Algorithm for Motion Estimation", IEEE Transactions on Image Processing, vol. 4, Issue 1, Jan. 1995, pp. 105-107.
F. Tombari, S. Mattocia, L. Di Stefano, "Template Matching Based on Lp Norm Using Sufficient Conditions with Incremental Approximation", IEEE International Conference on Video and Signal Based Surveillance, Nov. 2006, p. 20.
U. Koc and K.J.R. Liu, "Interpolation-free Subpixel Motion Estimation Technique in DCT Domain", IEEE Transactions on Circuits and Systems for Video Technology, vol. 8, Issue 4, Aug. 1998, pp. 460-487.
S. Lee, S.-I Chae, "Motion Estimation Algorithm using Low Resolution Quantization", Electronic Letters, vol. 21. No. 7, Mar. 28, 1996, p. 647.
C.-K. Cheung, L.-M. Po, "A Hierarchical Block Motion Estimation Algorithm using Partial Distortion Measure" IEEE International Conference on Image Processing, vol. 3, Oct. 1997, pp. 606-609.
Y.-L. Chan, W.-C. Siu, "New Adaptive Pixel Decimation for Block Motion Vector Estimation", IEEE Transactions on Circuits and Systems for Video Technology, vol. 6, Issue 1, Feb. 1996, pp. 113-118.
S. Suthaharan, S.-W. Kim, and K.R. Rao "A new quality metric based on just-noticeable difference, perceptual regions, edge extraction, and human vision", Canadian Journal Electr. Comput. Eng., vol. 30, No. 2, Spring 2005.
T. Toivonen and J. Heikkila "Efficient Method for Half-Pixel Block Motion Estimation Using Block Differentials", Published by Springer-Verlag, International Workshop VLBV, Madrid, Spain, Sep. 18-19, 2003.

(56) References Cited

OTHER PUBLICATIONS

K.-C. Hui, W.-C. Siu, and Y.-L. Chan "New Adaptive Partial Distortion Search Using Clustered Pixel Matching Error Characteristic" IEEE Transactions on Image Processing, vol. 14, No. 5., May 2005 p. 597.
C. J. Duanmu, M. O. Ahmad "Fast Block Motion Estimation With 8-Bit Partial Sums Using SIMD Architectures" IEEE Transactions of Circuits and Systems for Video Technology, vol. 17, No. 8, Aug. 2007, p. 1041.
B. Liu, A. Zaccarin "New Fast Algorithms for the Estimation of Block Motion Vectors" IEEE Transactions on Circuits and Systems for Video technology, vol. 3, No. 2, Apr. 1993, p. 148.
Y.K. Lee et al., MPEG-4 to H.264 Transcoding, IEEE Tencon, Nov. 2005, P. 6, Ecole de Technologie Superieure.
ISO/IEC 14496-5:2001, Information Technology—Coding of Audio-Visual objects, Part 5: Reference Software, Second Edition, Feb. 2005.
ISO/IEC 14496-2, Information technology—Coding of audio-visual objects—Part 2: Visual, Second edition, Dec. 1, 2001, p. 536, ISO/IEC.
ISSO/IEC 14496-10 AVC and ITU-T rec. H.264, Advanced Video Coding for Generic Audiovisual Services,Series H: Audiovisual and Multimedia Systems,Infrastructure of Audiovisual Services—Coding of Moving Video, Mar. 2005, p. 343.
3GPP2 C.S0045-A, Multimedia Messaging Service (MMS) Media Format and Codecs for cdma2000 Spread Spectrum Systems, Version 1.0, Mar. 31, 2006, p. 22, 3GPP2.
3GPP, Technical Specification Group Services and System Aspects, Transparent end-to-end Packet-switched Streaming Service (PSS), Protocols and codecs (Release 7), Mar. 2009, p. 17, 3GPP.
3GPP, Technical Specification Group Services and System Aspects, Multimedia Messaging Service (MMS), Media formats and codecs (Release 7), Jun. 2007, p. 17, 3GPP.
3GPP2 C.S0046-0, 3G Multimedia Streaming Services, Version 1.0, Feb. 21, 2006, p. 59, 3GPP.
B. Shen, From 8-Tap DCT to 4-Tap Integer-Transform for MPEG to H.264/AVC Transcoding, IEEE International Conference on Image Processing (ICIP),vol. 1, pp. 115-118, Oct. 2004.
Y.K. Lee et al., MPEG-4 to H.264 Transcoding using Macroblock Statistics, IEEE International Conference on Multimedia and Expo, Jul. 2006, pp. 57-60.
Y. Liang et al., MPEG-4 to H.264/AVC Transcoding, The International Wireless Communications and Mobile Computing Conference, Aug. 2007, pp. 689-693.
T. N. Dinh et al., Reducing Spatial Resolution for MPGE-4 / H.264 Transcoding with Efficient Motion Reusing, The 7th International Conference on Computer and Information Technology, Oct. 2007, pp. 577-580.
S.E. Kim et al., Efficient Motion Estimation Algorithm for MPEG-4 to H.264 Transcoder, IEEE International Conference on Image Processing (ICIP),vol. 3, pp. 659-702, Sep. 2005.
T.D.Nguyen, G-S Lee J-Y Chang, H-J. Cho, Efficient MPEG-4 to H.264/AVC Transcoding with Spatial Downscaling, ETRI, vol. 29, Dec. 2007, pp. 826-828.
A. Vetro et al., Video Transcoding Architectures and Techniques: An Overview, IEEE Signal Processing Magazine, 20(2):18-29, Mar. 2003.
B.G. Kim et al., Enhanced Inter Mode Decision Based on Contextual Prediction for P-slices in H.264/AVC Video Coding, ETRI Journal, vol. 28, No. 4, Aug. 2006, pp. 425-434.

Intel(R) Integrated Performance Primitives 5.3—Code Samples (Online), p. 4, http://software.intel.com/en-us/articles/intel-integrated-performance-primitives-code-samples/.
H.264/AVC Reference software JM 15.01 (Online), p. 89, http://iphome.hhi.de/suehring/tml/.
A.M. Tourapis, Enhanced Predictive Zonal Search for Single and Multiple Frame Motion Estimation, Visual Communications and Image Processing, Jan. 2002, pp. 1069-1079.
J. Bialkowski et al., Overview of Low-Complexity Video Transcoding from H.263 to H.264, IEEE International Conference on Multimedia and Expo, Jul. 2006, pp. 49-52.
G. Sullivan, Draft Text of Recommendation H.263 Version 2 ("H.263+") for Decision, Sep. 25, 1997, ITU.
ITU-T Recommendation H.264, Series H: Audiovisual and Multimedia Systems Infrastructure of audiovisual services—Coding of moving video, Advanced video coding for generic audiovisual services, Mar. 2005.
M. Alberink et al., GigaCE/D1.11 project, Telematica Instituut, Enschede, The Netherlands, Jul. 21, 2001.
J. Bialkowski et al., A FAST H.263 to H.264 Inter-Frame Transcoder with Motion Vector Refinement, 2004, p. 6., Siemens AG, CT IC 2, Munich, Germany.
J. Bialkowski et al., Fast Video Transcoding from H.263 to H.264/MPEG-4 AVC, Business Media, LLC 2007, p. 20, Springer Science.
Q. Tang et al., Fast Block Size Prediction for MPEG-2 to H.264/AVC Transcoding, IEEE Xplore, 2008, p. 4, ICASSP.
V. Bhaskaran et al., Image and Video Compression Standards: Algorithms and Architectures, 2nd edition, 1997, p. 454, Kluwer Academic Publishers, Norwell, MA, USA.
S. Zhu et al., A New Diamond Search Algorithm for Fast Block-Matching Motion Estimation, IEEE Transactions on Image Processing, vol. 9, No. 2, Feb. 2000, pp. 287-290, IEEE.
Liu, B; Zaccarin A.: New fast algorithms for the estimation of block motion vectors,: IEEE Transactions on Circuits and Systems for Video Technology,, vol. 3, No. 2, pp. 148-157, Apr. 1993 doi: 10.1109/76.212720.
3GPP TS 26.234 v10.1.0, "Packet-switched Streaming Service (PSS); Protocols and codecs (Release 10)," Jun. 2011.
3GPP TS 26.140 v10.0.0, "Multimedia Messaging Service (MMS); Media formats and codecs (Release 10)," Mar. 2011.
3GPP2 C.S0045-A, "Multimedia Messaging Service (MMS) Media Format and Codecs for cdma2000 Spread Spectrum Systems," version 1.0, March.
I. Metoevi, S. Coulombe, "Efficient MPEG-4 to H.264 transcoding exploiting MPEG-4 block modes, motion vectors, and residuals," ISCIT (International Symposium on Communications and Information Technologies), Incheon, South Korea, Sep. 2009.
K.P. Lim, G. Sullivan and T. Wiegand, "Text Description of Joint Model Reference Encoding Methods and Decoding Concealment Methods," Joint Video Team Document JVT-O079, Apr. 2005.
H.R. Lindman, "Analysis of variance in complex experimental designs," W.H. Freeman & Co. Hillsdale, NJ USA, 1974.
J. R. Jain and A. K. Jain, "Displacement Measurement and its Application in Interframe Image Coding," IEEE Transactions on Communications, vol. COM-29, pp. 1709-1808, Dec. 1981.
A.M. Tourapis, O.C. Au and M.L. Liou, "Predictive Motion Vector Field Adaptive Search Technique (PMVFAST)—Enhancing Block Based Motion Estimation," Department of Electrical and Electronic Engineering, Hong Kong University of Science and Technology, Hong Kong, 2000.

* cited by examiner

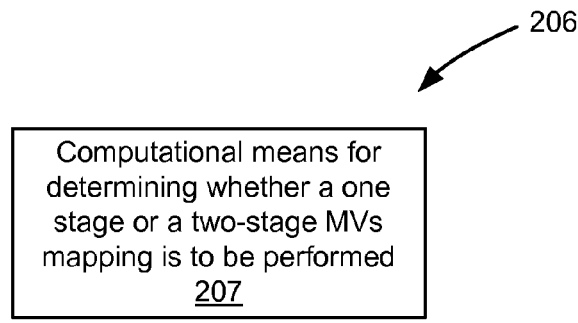
*Figure 2(a-1)*
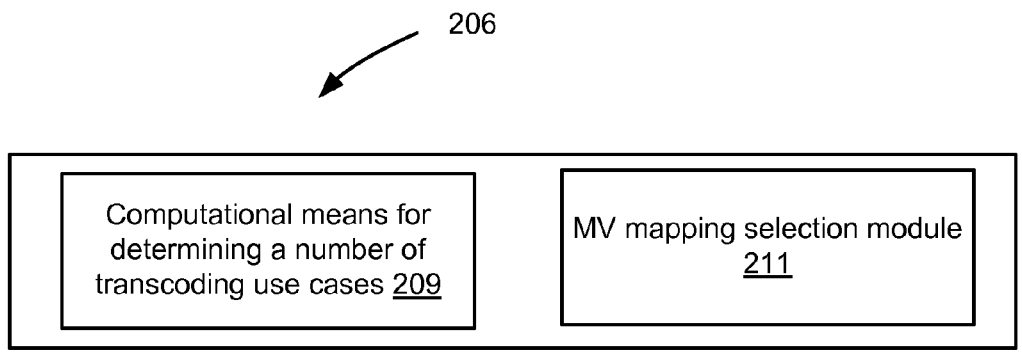
*Figure 2(a-2)*

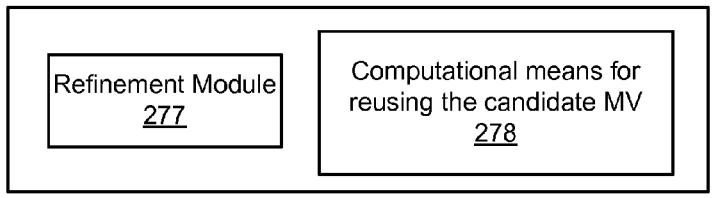
*Figure 2(b-1)*
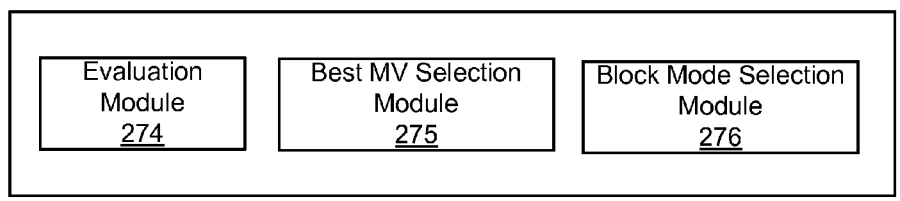
*Figure 2(b-2)*
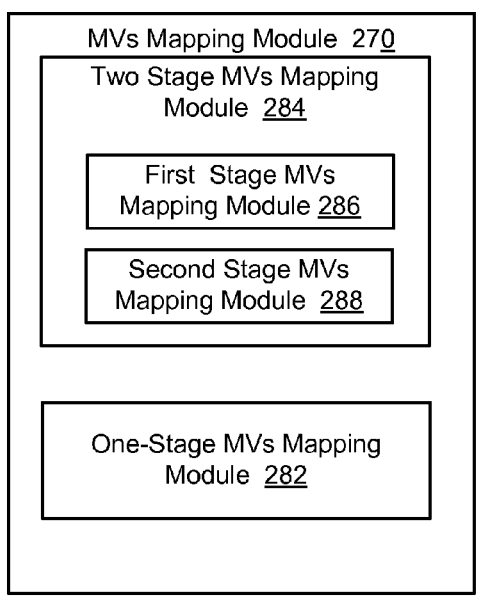 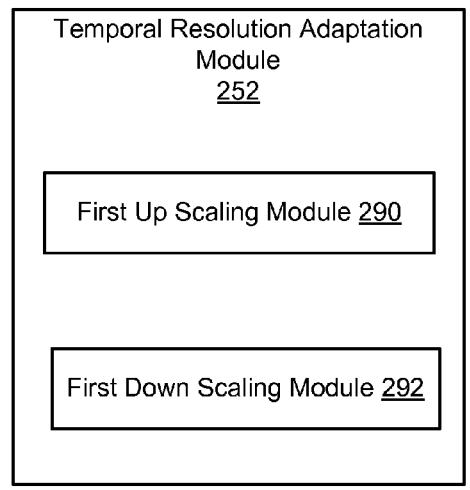
*Figure 2(c)*  *Figure 2(d)*

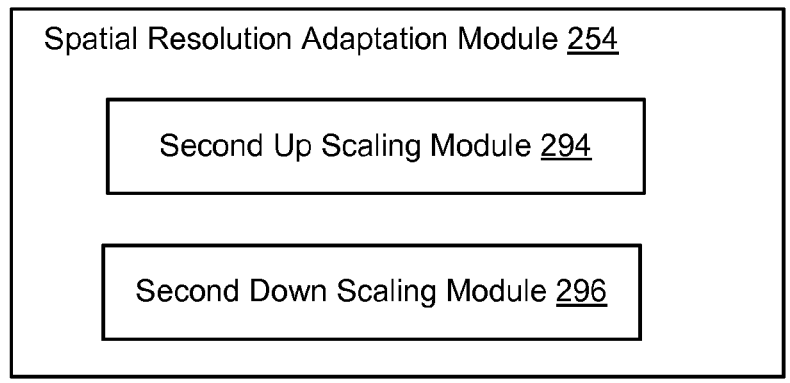
*Figure 2(e)*
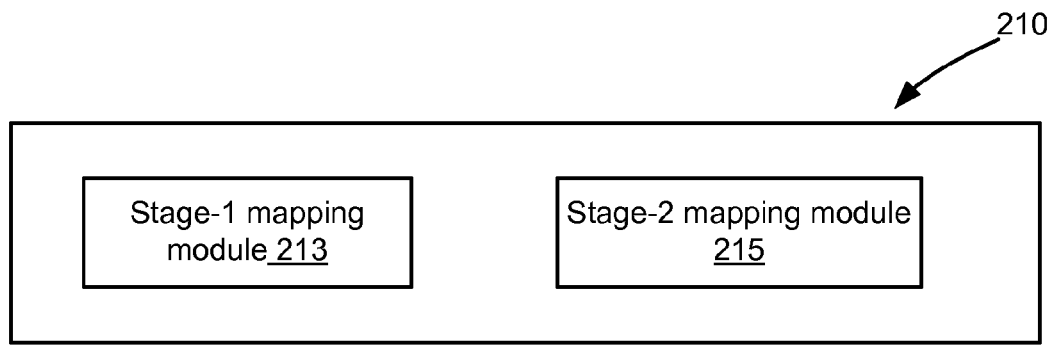
*Figure 2(e-1)*

TABLE 1

| | Input | Output |
|---|---|---|
| a | Skip | Check (Skip + P16x16) |
| b | P16x16 | Check (Skip + P16x16) |
| c | P16x8 | Check (Skip + P16x16 + P16x8) |
| d | P8x16 | Check (Skip + P16x16 + P8x16) |
| e | P8x8 | Check (Skip + P16x16 + P16x8 + P8x16 + P8x8) |
| f | I4x4 | Check (Skip + P16x16 + I16x16 + I4x4) |
| g | I16x16 | Check (Skip + P16x16 + I16x16) |

TABLE 2

|   | Input (4 MBs) | Output (1 MB) |
|---|---|---|
| a | 4 Skip | Check (Skip + P16x16) |
| b | 4 P16x16 | Check (Skip + P16x16) |
| c | 4 Inter (*heterogeneous inter modes except 4 Skip or 4 P16x16*) | Check (Skip + P16x16 + P16x8 + P8x16 + P8x8) |
| d | nb_mb_intra4x4 > 1 or nb_mb_intra16x16 > 1 | Check (Skip + P16x16 + P8x8+ I16x16 + I4x4) |

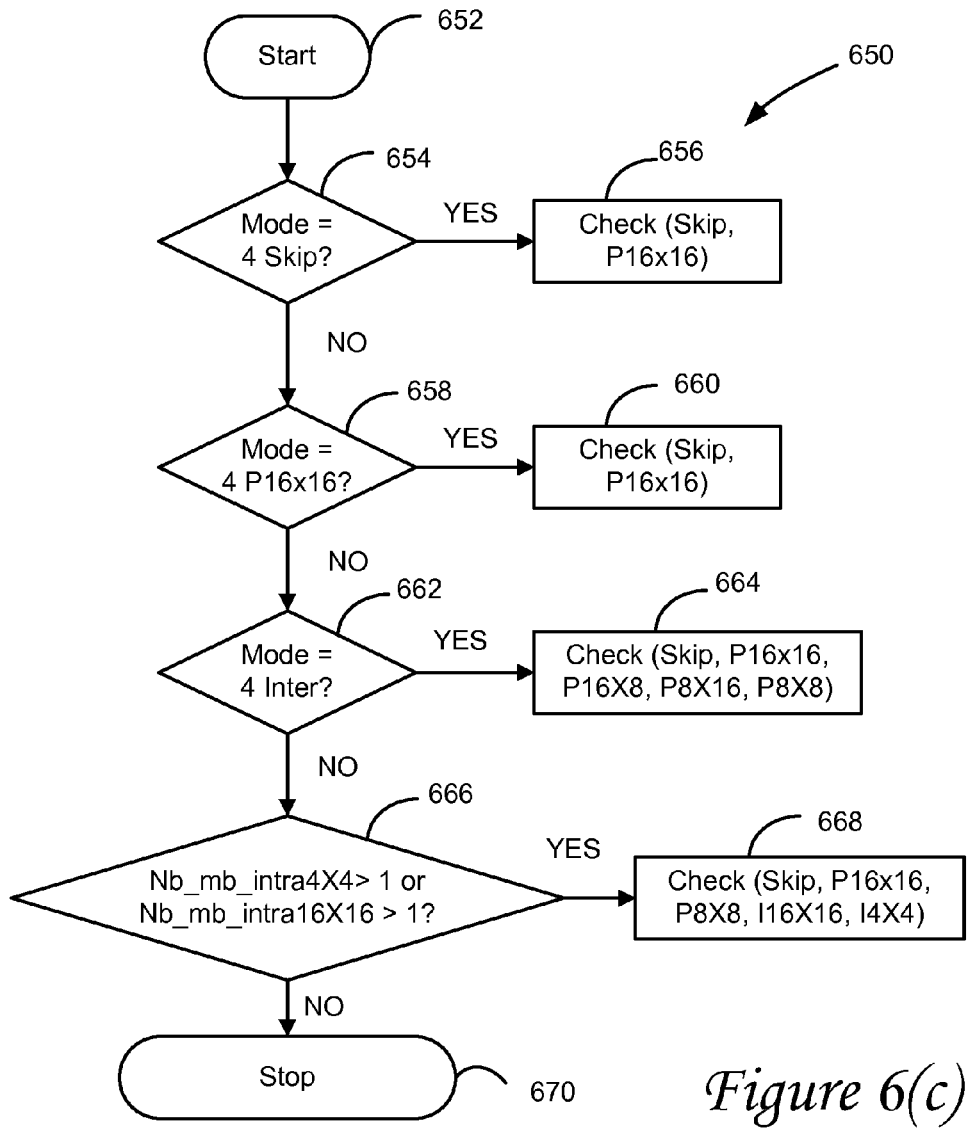

| CIF Videos | | 512 to 384 kbps | | | | 512 to 256 kbps | | | |
|---|---|---|---|---|---|---|---|---|---|
| | | Cas-cade | Stati-stics | Prop-osed | Cond. Ref. | Cas-cade | Stati-stics | Prop-osed | Cond. Ref. |
| container 300 frames | Speed-up | 1 | 1.6 | 1.87 | 1.99 | 1 | 1.53 | 1.81 | 1.82 |
| | PSNR (dB) | 41.71 | 0 | -0.16 | -0.15 | 38.35 | -0.02 | -0.17 | -0.19 |
| flower 250 frames | Speed-up | 1 | 1.59 | 2.4 | 2.55 | 1 | 1.73 | 2.37 | 2.7 |
| | PSNR (dB) | 30.7 | -0.09 | 0.01 | -0.08 | 27.7 | -0.04 | -0.14 | -0.15 |
| foreman 300 frames | Speed-up | 1 | 1.69 | 2.53 | 2.89 | 1 | 1.58 | 2.42 | 2.59 |
| | PSNR (dB) | 38.55 | -0.14 | 0.06 | 0.02 | 35.66 | -0.1 | -0.12 | -0.21 |
| mobile 300 frames | Speed-up | 1 | 1.74 | 2.61 | 2.77 | 1 | 1.71 | 2.55 | 2.85 |
| | PSNR (dB) | 30.81 | -0.08 | -0.2 | -0.24 | 27.71 | -0.05 | -0.15 | -0.24 |
| news 300 frames | Speed-up | 1 | 1.59 | 2.07 | 2.17 | 1 | 1.48 | 1.91 | 2.14 |
| | PSNR (dB) | 43.05 | 0.12 | -0.02 | -0.04 | 39.89 | -0.01 | 0 | -0.13 |
| silent 300 frames | Speed-up | 1 | 1.52 | 2.17 | 2.33 | 1 | 1.44 | 2.05 | 2.31 |
| | PSNR (dB) | 41.23 | -0.05 | -0.05 | -0.31 | 37.1 | -0.01 | -0.05 | -0.18 |
| stefan 90 frames | Speed-up | 1 | 1.67 | 2.56 | 2.82 | 1 | 1.72 | 2.47 | 2.52 |
| | PSNR (dB) | 34.12 | -0.1 | -0.08 | -0.11 | 30.85 | -0.09 | -0.22 | -0.28 |
| tempete 260 frames | Speed-up | 1 | 1.72 | 2.59 | 2.88 | 1 | 1.65 | 2.46 | 2.74 |
| | PSNR (dB) | 33.26 | -0.07 | 0 | -0.05 | 30.39 | -0.02 | -0.11 | -0.21 |
| waterfall 260 frames | Speed-up | 1 | 1.88 | 2.77 | 3 | 1 | 1.82 | 2.73 | 3.02 |
| | PSNR (dB) | 38.8 | -0.07 | -0.18 | -0.2 | 35.78 | -0.05 | -0.16 | -0.25 |
| Average (Speed-up) | | 1 | 1.66 | 2.39 | 2.6 | 1 | 1.62 | 2.3 | 2.52 |
| Average (PSNR) | | 36.91 | -0.05 | -0.06 | -0.12 | 33.71 | -0.04 | -0.12 | -0.2 |

*Figure 9*

| CIF Videos | | 256 to 192 kbps | | | | 256 to 128 kbps | | | |
|---|---|---|---|---|---|---|---|---|---|
| | | Cas-cade | Stati-stics | Prop-osed | Cond. Ref. | Cas-cade | Stati-stics | Prop-osed | Cond. Ref. |
| container | Speed-up | 1 | 1.43 | 1.75 | 1.79 | 1 | 1.47 | 1.8 | 1.76 |
| 300 frames | PSNR (dB) | 39.83 | 0.15 | -0.01 | -0.01 | 36.57 | -0.04 | -0.23 | -0.24 |
| flower | Speed-up | 1 | 1.7 | 2.31 | 2.65 | 1 | 1.65 | 2.41 | 2.68 |
| 250 frames | PSNR (dB) | 28.54 | -0.1 | -0.25 | -0.3 | 25.56 | -0.09 | -0.33 | -0.51 |
| foreman | Speed-up | 1 | 1.57 | 2.31 | 2.52 | 1 | 1.53 | 2.15 | 2.45 |
| 300 frames | PSNR (dB) | 35.76 | -0.19 | -0.04 | -0.11 | 32.56 | -0.08 | -0.29 | -0.48 |
| mobile | Speed-up | 1 | 1.63 | 2.34 | 2.5 | 1 | 1.61 | 2.26 | 2.48 |
| 300 frames | PSNR (dB) | 28.33 | 0.05 | -0.26 | -0.32 | 25.14 | -0.02 | -0.29 | -0.49 |
| news | Speed-up | 1 | 1.45 | 1.9 | 2.16 | 1 | 1.44 | 1.85 | 2.03 |
| 300 frames | PSNR (dB) | 39.68 | 0.21 | -0.02 | -0.04 | 36.25 | -0.11 | -0.26 | -0.45 |
| silent | Speed-up | 1 | 1.5 | 2.07 | 2.34 | 1 | 1.44 | 1.94 | 2.18 |
| 300 frames | PSNR (dB) | 38.21 | -0.01 | 0.19 | -0.08 | 34.36 | 0.02 | -0.21 | -0.29 |
| stefan | Speed-up | 1 | 1.63 | 2.1 | 2.45 | 1 | 1.42 | 2.04 | 2.13 |
| 90 frames | PSNR (dB) | 30.6 | -0.13 | -0.2 | -0.25 | 27.09 | 0.02 | -0.3 | -0.53 |
| tempete | Speed-up | 1 | 1.65 | 2.44 | 2.67 | 1 | 1.56 | 2.25 | 2.45 |
| 260 frames | PSNR (dB) | 30.86 | -0.06 | -0.16 | -0.31 | 27.95 | -0.01 | -0.32 | -0.56 |
| waterfall | Speed-up | 1 | 1.71 | 2.5 | 2.74 | 1 | 1.73 | 2.55 | 2.75 |
| 260 frames | PSNR (dB) | 35.81 | 0.01 | -0.35 | -0.39 | 32.73 | 0.14 | -0.26 | -0.39 |
| Average (Speed-up) | | 1 | 1.58 | 2.19 | 2.42 | 1 | 1.53 | 2.13 | 2.32 |
| Average (PSNR) | | 34.18 | 0 | -0.12 | -0.2 | 30.91 | -0.01 | -0.27 | -0.43 |

*Figure 10*

| QCIF Videos | | 256 to 192 kbps | | | | 256 to 128 kbps | | | |
|---|---|---|---|---|---|---|---|---|---|
| | | Cascade | Statistics | Proposed | Cond. Ref. | Cascade | Statistics | Proposed | Cond. Ref. |
| container | Speed-up | 1 | 1.62 | 1.84 | 1.79 | 1 | 1.66 | 1.89 | 1.91 |
| 300 frames | PSNR (dB) | 43.92 | -0.03 | -0.19 | -0.2 | 40.99 | -0.05 | -0.1 | -0.1 |
| foreman | Speed-up | 1 | 1.75 | 2.47 | 3.06 | 1 | 1.56 | 2.44 | 2.72 |
| 300 frames | PSNR (dB) | 39.82 | -0.21 | 0.07 | 0.07 | 36.8 | -0.16 | -0.09 | -0.16 |
| mobile | Speed-up | 1 | 1.85 | 2.71 | 2.86 | 1 | 1.73 | 2.53 | 2.77 |
| 300 frames | PSNR (dB) | 32.43 | -0.06 | -0.13 | -0.13 | 29.51 | -0.07 | -0.16 | -0.18 |
| news | Speed-up | 1 | 1.4 | 2 | 2.05 | 1 | 1.63 | 2.02 | 2.28 |
| 300 frames | PSNR (dB) | 43.73 | -0.13 | -0.15 | -0.12 | 40.39 | -0.04 | -0.15 | -0.11 |
| silent | Speed-up | 1 | 1.57 | 2.11 | 2.28 | 1 | 1.58 | 2.25 | 2.62 |
| 300 frames | PSNR (dB) | 42.78 | -0.07 | -0.21 | -0.08 | 38.86 | -0.14 | -0.16 | -0.19 |
| Average (Speed-up) | | 1 | 1.63 | 2.22 | 2.4 | 1 | 1.63 | 2.22 | 2.46 |
| Average (PSNR) | | 40.53 | -0.1 | -0.12 | -0.09 | 37.31 | -0.09 | -0.13 | -0.14 |

Figure 11

| QCIF Videos | | 128 to 96 kbps | | | | 128 to 64 kbps | | | |
|---|---|---|---|---|---|---|---|---|---|
| | | Cascade | Statistics | Proposed | Cond. Ref. | Cascade | Statistics | Proposed | Cond. Ref. |
| container | Speed-up | 1 | 1.31 | 1.66 | 1.54 | 1 | 1.46 | 1.69 | 1.55 |
| 300 frames | PSNR (dB) | 42.57 | -0.08 | -0.14 | -0.15 | 39.02 | -0.05 | -0.14 | -0.14 |
| foreman | Speed-up | 1 | 1.6 | 2.39 | 2.79 | 1 | 1.58 | 2.34 | 2.53 |
| 300 frames | PSNR (dB) | 36.63 | -0.17 | 0.05 | 0.01 | 33.46 | -0.11 | -0.21 | -0.32 |
| mobile | Speed-up | 1 | 1.68 | 2.27 | 2.64 | 1 | 1.63 | 2.41 | 2.48 |
| 300 frames | PSNR (dB) | 30.19 | 0 | -0.19 | -0.27 | 27.27 | -0.14 | -0.39 | -0.49 |
| news | Speed-up | 1 | 1.49 | 1.71 | 2.08 | 1 | 1.65 | 1.82 | 2.25 |
| 300 frames | PSNR (dB) | 40.42 | -0.12 | -0.06 | -0.06 | 36.73 | -0.14 | -0.22 | -0.21 |
| silent | Speed-up | 1 | 1.52 | 2.11 | 2.39 | 1 | 1.39 | 1.97 | 2.1 |
| 300 frames | PSNR (dB) | 39.37 | -0.2 | -0.24 | -0.11 | 35.44 | -0.02 | -0.11 | -0.16 |
| Average (Speed-up) | | 1 | 1.52 | 2.02 | 2.28 | 1 | 1.54 | 2.04 | 2.18 |
| Average (PSNR) | | 37.83 | -0.11 | -0.11 | -0.11 | 34.38 | -0.09 | -0.21 | -0.26 |

Figure 12

| CIF Videos | | 512 to 256 kbps | | | | |
|---|---|---|---|---|---|---|
| | | Cascade | Statistics | Proposed | Cond. Ref. | No Ref. |
| container 300 frames | Speed-up | 1 | 1.18 | 1.29 | 1.43 | 1.56 |
| | PSNR (dB) | 40.41 | -0.14 | -0.19 | -0.35 | -0.66 |
| flower 250 frames | Speed-up | 1 | 1.19 | 1.54 | 1.93 | 2.24 |
| | PSNR (dB) | 26.79 | -0.15 | -0.2 | -0.44 | -0.79 |
| foreman 300 frames | Speed-up | 1 | 1.32 | 1.81 | 2.33 | 2.74 |
| | PSNR (dB) | 35.17 | -0.3 | -0.64 | -1 | -1.23 |
| mobile 300 frames | Speed-up | 1 | 1.17 | 1.68 | 2.1 | 2.28 |
| | PSNR (dB) | 24.2 | -0.07 | -0.15 | -0.44 | -1.06 |
| news 300 frames | Speed-up | 1 | 1.21 | 1.47 | 1.64 | 1.72 |
| | PSNR (dB) | 42.8 | -0.41 | -0.68 | -0.9 | -1.12 |
| silent 300 frames | Speed-up | 1 | 1.36 | 1.71 | 1.91 | 2.22 |
| | PSNR (dB) | 40.64 | -0.53 | -0.61 | -0.85 | -1.04 |
| stefan 90 frames | Speed-up | 1 | 1.28 | 1.66 | 2.06 | 2.11 |
| | PSNR (dB) | 28.96 | -0.12 | -0.26 | -0.55 | -0.93 |
| tempete 260 frames | Speed-up | 1 | 1.2 | 1.65 | 1.98 | 2.28 |
| | PSNR (dB) | 29.12 | -0.09 | -0.1 | -0.31 | -0.71 |
| waterfall 260 frames | Speed-up | 1 | 1.17 | 1.59 | 1.81 | 2.19 |
| | PSNR (dB) | 33.42 | -0.06 | -0.07 | -0.34 | -1.05 |
| Average (Speed-up) | | 1 | 1.23 | 1.6 | 1.91 | 2.14 |
| Average (PSNR) | | 33.5 | -0.2 | -0.32 | -0.57 | -0.95 |

*Figure 13*

| CIF Videos | | 256 to 128 kbps | | | |
|---|---|---|---|---|---|
| | | Cas-cade | Stati-stics | Prop-osed | Cond. Ref. |
| container | Speed-up | 1 | 1.14 | 1.25 | 1.32 |
| 300 frames | PSNR (dB) | 37.47 | -0.08 | -0.27 | -0.44 |
| flower | Speed-up | 1 | 1.19 | 1.52 | 1.83 |
| 250 frames | PSNR (dB) | 24.85 | -0.13 | -0.24 | -0.6 |
| foreman | Speed-up | 1 | 1.21 | 1.8 | 2.22 |
| 300 frames | PSNR (dB) | 32.98 | -0.27 | -0.56 | -0.97 |
| mobile | Speed-up | 1 | 1.09 | 1.58 | 1.79 |
| 300 frames | PSNR (dB) | 22.81 | -0.04 | -0.14 | -0.51 |
| news | Speed-up | 1 | 1.18 | 1.39 | 1.65 |
| 300 frames | PSNR (dB) | 38.07 | -0.38 | -0.65 | -0.91 |
| silent | Speed-up | 1 | 1.21 | 1.55 | 1.79 |
| 300 frames | PSNR (dB) | 36.73 | -0.32 | -0.41 | -0.71 |
| stefan | Speed-up | 1 | 1.06 | 1.6 | 1.89 |
| 90 frames | PSNR (dB) | 26.34 | -0.2 | -0.34 | -0.7 |
| tempete | Speed-up | 1 | 1.1 | 1.53 | 1.81 |
| 260 frames | PSNR (dB) | 27.45 | -0.02 | -0.04 | -0.32 |
| waterfall | Speed-up | 1 | 1.09 | 1.5 | 1.77 |
| 260 frames | PSNR (dB) | 31.8 | -0.06 | -0.12 | -0.44 |
| Average (Speed-up) | | 1 | 1.14 | 1.52 | 1.78 |
| Average (PSNR) | | 30.94 | -0.16 | -0.3 | -0.62 |

*Figure 14*

| CIF Videos | | 512 to 512 kbps | | | | 512 to 256 kbps | | | |
|---|---|---|---|---|---|---|---|---|---|
| | | Cas-cade | Stati-stics | Prop-osed | Cond. Ref. | Cas-cade | Stati-stics | Prop-osed | Cond. Ref. |
| container 300 frames | Speed-up | 1 | 1.52 | 1.96 | 1.95 | 1 | 1.37 | 1.74 | 1.91 |
| | PSNR (dB) | 39.49 | 0.02 | -0.23 | -1.28 | 35.81 | -0.04 | -0.22 | -1.89 |
| flower 250 frames | Speed-up | 1 | 1.25 | 1.47 | 1.78 | 1 | 1.36 | 1.74 | 1.79 |
| | PSNR (dB) | 28.95 | -0.24 | -1.49 | -2.06 | 25.92 | -0.12 | -1.09 | -1.59 |
| foreman 300 frames | Speed-up | 1 | 1.34 | 1.84 | 1.97 | 1 | 1.2 | 1.48 | 1.76 |
| | PSNR (dB) | 37.17 | -0.26 | -1.79 | -2.22 | 33.77 | -0.19 | -1.77 | -2.29 |
| mobile 300 frames | Speed-up | 1 | 1.53 | 2.08 | 2.1 | 1 | 1.34 | 1.84 | 1.94 |
| | PSNR (dB) | 26.99 | -0.1 | -0.91 | -1.29 | 24.34 | -0.06 | -0.58 | -0.84 |
| news 300 frames | Speed-up | 1 | 1.33 | 1.65 | 1.78 | 1 | 1.25 | 1.64 | 1.67 |
| | PSNR (dB) | 42.07 | -0.18 | -1.66 | -1.83 | 37.57 | -0.12 | -1.78 | -2.03 |
| silent 300 frames | Speed-up | 1 | 1.52 | 2.11 | 2.25 | 1 | 1.38 | 1.97 | 2.12 |
| | PSNR (dB) | 39.89 | -0.19 | -1.35 | -1.24 | 35.59 | -0.08 | -1.16 | -1.01 |
| stefan 90 frames | Speed-up | 1 | 1.28 | 1.5 | 1.57 | 1 | 1.32 | 1.55 | 1.63 |
| | PSNR (dB) | 32.32 | -0.18 | -1.53 | -1.91 | 28.56 | -0.12 | -1.34 | -1.88 |
| tempete 260 frames | Speed-up | 1 | 1.48 | 1.87 | 1.99 | 1 | 1.32 | 1.64 | 1.71 |
| | PSNR (dB) | 31.36 | -0.08 | -0.82 | -1.2 | 28.46 | -0.03 | -0.61 | -1.07 |
| waterfall 260 frames | Speed-up | 1 | 1.63 | 2.08 | 2.19 | 1 | 1.4 | 1.77 | 1.87 |
| | PSNR (dB) | 35.21 | -0.11 | -0.48 | -1.69 | 32.36 | -0.11 | -0.43 | -1.65 |
| Average (Speed-up) | | 1 | 1.43 | 1.84 | 1.95 | 1 | 1.32 | 1.7 | 1.82 |
| Average (PSNR) | | 34.82 | -0.14 | -1.14 | -1.63 | 31.37 | -0.09 | -0.99 | -1.58 |

*Figure 15*

| CIF Videos | | 256 to 256 kbps | | | | 256 to 128 kbps | | | |
|---|---|---|---|---|---|---|---|---|---|
| | | Cascade | Statistics | Proposed | Cond. Ref. | Cascade | Statistics | Proposed | Cond. Ref. |
| container | Speed-up | 1 | 1.37 | 1.64 | 1.95 | 1 | 1.29 | 1.62 | 1.65 |
| 300 frames | PSNR (dB) | 36.87 | -0.07 | -0.25 | -1.97 | 33.54 | -0.05 | -0.36 | -2.54 |
| flower | Speed-up | 1 | 1.44 | 1.84 | 1.89 | 1 | 1.44 | 1.83 | 2 |
| 250 frames | PSNR (dB) | 27.29 | -0.22 | -0.71 | -1.62 | 24.94 | -0.02 | -0.17 | -0.51 |
| foreman | Speed-up | 1 | 1.12 | 1.59 | 1.7 | 1 | 1.1 | 1.52 | 1.5 |
| 300 frames | PSNR (dB) | 34.95 | -0.25 | -1.29 | -2.07 | 31.12 | -0.14 | -1.12 | -1.78 |
| mobile | Speed-up | 1 | 1.43 | 1.9 | 2 | 1 | 1.28 | 1.46 | 1.72 |
| 300 frames | PSNR (dB) | 25.35 | -0.06 | -0.48 | -1.05 | 24.15 | 0 | -0.1 | -0.32 |
| news | Speed-up | 1 | 1.18 | 1.49 | 1.75 | 1 | 1.15 | 1.46 | 1.8 |
| 300 frames | PSNR (dB) | 38.36 | -0.18 | -1.67 | -1.95 | 34.12 | -0.18 | -1.42 | -1.98 |
| silent | Speed-up | 1 | 1.26 | 1.77 | 1.91 | 1 | 1.11 | 1.54 | 1.8 |
| 300 frames | PSNR (dB) | 36.92 | -0.19 | -1.19 | -1.3 | 32.95 | -0.09 | -0.8 | -1.04 |
| stefan | Speed-up | 1 | 1.3 | 1.5 | 1.46 | 1 | 1.34 | 1.6 | 1.51 |
| 90 frames | PSNR (dB) | 29.41 | -0.2 | -0.83 | -1.73 | 26.05 | -0.06 | -0.28 | -0.71 |
| tempete | Speed-up | 1 | 1.27 | 1.62 | 1.65 | 1 | 1.17 | 1.47 | 1.69 |
| 260 frames | PSNR (dB) | 29.7 | -0.07 | -0.41 | -1.19 | 26.89 | -0.02 | -0.32 | -0.73 |
| waterfall | Speed-up | 1 | 1.34 | 1.66 | 1.83 | 1 | 1.12 | 1.38 | 1.65 |
| 260 frames | PSNR (dB) | 33.16 | -0.1 | -0.28 | -1.67 | 30.36 | -0.05 | -0.21 | -1.54 |
| Average (Speed-up) | | 1 | 1.3 | 1.66 | 1.79 | 1 | 1.22 | 1.54 | 1.7 |
| Average (PSNR) | | 32.44 | -0.14 | -0.79 | -1.61 | 29.34 | -0.06 | -0.53 | -1.23 |

*Figure 16*

| QCIF Videos | | 256 to 256 kbps | | | | 256 to 128 kbps | | | |
|---|---|---|---|---|---|---|---|---|---|
| | | Cas-cade | Stati-stics | Prop-osed | Cond. Ref. | Cas-cade | Stati-stics | Prop-osed | Cond. Ref. |
| container | Speed-up | 1 | 1.38 | 1.56 | 1.44 | 1 | 1.24 | 1.32 | 1.54 |
| 300 frames | PSNR (dB) | 42.9 | -0.31 | -0.45 | -0.5 | 38.93 | -0.14 | -0.45 | -0.76 |
| foreman | Speed-up | 1 | 1.32 | 1.46 | 1.56 | 1 | 1.24 | 1.54 | 1.44 |
| 300 frames | PSNR (dB) | 37.85 | -0.3 | -1.98 | -2.21 | 34.42 | -0.24 | -2.03 | -2.42 |
| mobile | Speed-up | 1 | 1.36 | 1.63 | 1.54 | 1 | 1.31 | 1.61 | 1.74 |
| 300 frames | PSNR (dB) | 28.65 | -0.08 | -0.8 | -1.21 | 25.76 | -0.05 | -0.66 | -1.17 |
| news | Speed-up | 1 | 1.21 | 1.39 | 1.24 | 1 | 1.23 | 1.25 | 1.3 |
| 300 frames | PSNR (dB) | 42.59 | -0.15 | -1.21 | -1.3 | 38.18 | -0.16 | -1.33 | -1.56 |
| silent | Speed-up | 1 | 1.31 | 1.43 | 1.64 | 1 | 1.31 | 1.38 | 1.45 |
| 300 frames | PSNR (dB) | 41.95 | -0.24 | -1.21 | -1.15 | 37.94 | -0.09 | -1.35 | -1.31 |
| Average (Speed-up) | | 1 | 1.31 | 1.49 | 1.48 | 1 | 1.26 | 1.42 | 1.49 |
| Average (PSNR) | | 38.78 | -0.21 | -1.13 | -1.27 | 35.04 | -0.13 | -1.16 | -1.44 |

*Figure 17*

| QCIF Videos | | 128 to 128 kbps | | | | 128 to 64 kbps | | | |
|---|---|---|---|---|---|---|---|---|---|
| | | Cas-cade | Stati-stics | Prop-osed | Cond. Ref. | Cas-cade | Stati-stics | Prop-osed | Cond. Ref. |
| container | Speed-up | 1 | 1.25 | 1.44 | 1.58 | 1 | 1.16 | 1.31 | 1.31 |
| 300 frames | PSNR (dB) | 40.31 | -0.34 | -0.57 | -1.21 | 35.92 | -0.17 | -0.44 | -1.52 |
| foreman | Speed-up | 1 | 1.48 | 1.64 | 1.57 | 1 | 1.07 | 1.15 | 1.2 |
| 300 frames | PSNR (dB) | 35.28 | -0.29 | -1.57 | -2.18 | 31.68 | -0.2 | -1.39 | -2.02 |
| mobile | Speed-up | 1 | 1.26 | 1.43 | 1.59 | 1 | 1.25 | 1.47 | 1.5 |
| 300 frames | PSNR (dB) | 26.75 | -0.08 | -0.53 | -1.18 | 24.24 | -0.03 | -0.38 | -0.91 |
| news | Speed-up | 1 | 1.19 | 1.44 | 1.4 | 1 | 1.15 | 1.34 | 1.43 |
| 300 frames | PSNR (dB) | 38.82 | -0.22 | -1.15 | -1.39 | 34.3 | -0.28 | -1.07 | -1.53 |
| silent | Speed-up | 1 | 1.33 | 1.63 | 1.66 | 1 | 1.21 | 1.44 | 1.51 |
| 300 frames | PSNR (dB) | 38.56 | -0.21 | -0.92 | -1.28 | 34.21 | -0.22 | -0.96 | -1.17 |
| Average (Speed-up) | | 1 | 1.3 | 1.51 | 1.56 | 1 | 1.16 | 1.34 | 1.39 |
| Average (PSNR) | | 35.94 | -0.22 | -0.94 | -1.44 | 32.07 | -0.18 | -0.84 | -1.43 |

*Figure 18*

| CIF Videos | | 512 to 256 kbps | | | 512 to 128 kbps | | |
|---|---|---|---|---|---|---|---|
| | | Cascade | Statistics | Proposed | Cascade | Statistics | Proposed |
| container | Speed-up | 1 | 0.88 | 1.25 | 1 | 1.03 | 1.23 |
| 300 frames | PSNR (dB) | 38.79 | -0.04 | -1.93 | 34.96 | -0.12 | -1.9 |
| flower | Speed-up | 1 | 1 | 1.23 | 1 | 0.93 | 1.03 |
| 250 frames | PSNR (dB) | 25.98 | 0 | -3.02 | 23.15 | -0.01 | -1.57 |
| foreman | Speed-up | 1 | 1.01 | 1.28 | 1 | 1.09 | 1.29 |
| 300 frames | PSNR (dB) | 33.5 | -0.01 | -2.52 | 30.76 | 0 | -2.07 |
| mobile | Speed-up | 1 | 1.05 | 1.33 | 1 | 1 | 1.28 |
| 300 frames | PSNR (dB) | 22.63 | -0.01 | -1.07 | 20.63 | 0.01 | -0.17 |
| news | Speed-up | 1 | 1.16 | 1.3 | 1 | 0.99 | 1.21 |
| 300 frames | PSNR (dB) | 39.5 | -0.06 | -1.95 | 35.1 | 0.01 | -1.92 |
| silent | Speed-up | 1 | 1.11 | 1.25 | 1 | 1.05 | 1.12 |
| 300 frames | PSNR (dB) | 38.67 | 0 | -2.01 | 34.69 | -0.14 | -1.65 |
| stefan | Speed-up | 1 | 0.97 | 1.15 | 1 | 1.05 | 1.17 |
| 90 frames | PSNR (dB) | 28.6 | -0.01 | -2.2 | 25.37 | -0.01 | -1.86 |
| tempete | Speed-up | 1 | 1.02 | 1.13 | 1 | 1.01 | 1.24 |
| 260 frames | PSNR (dB) | 28.09 | -0.01 | -1.72 | 25.66 | 0 | -0.99 |
| waterfall | Speed-up | 1 | 1.02 | 1.26 | 1 | 1.11 | 1.4 |
| 260 frames | PSNR (dB) | 31.74 | -0.02 | -2.19 | 29.58 | 0 | -2 |
| Average (Speed-up) | | 1 | 1.02 | 1.24 | 1 | 1.02 | 1.21 |
| Average (PSNR) | | 31.94 | -0.01 | -2.06 | 28.87 | -0.02 | -1.57 |

*Figure 19*

| CIF Videos | | 256 to 128 kbps | | | 256 to 64 kbps | | |
|---|---|---|---|---|---|---|---|
| | | Cascade | Statistics | Proposed | Cascade | Statistics | Proposed |
| container | Speed-up | 1 | 0.88 | 1.08 | 1 | 1.15 | 1.28 |
| 300 frames | PSNR (dB) | 35.85 | -0.03 | -1.79 | 31.73 | -0.03 | -1.49 |
| flower | Speed-up | 1 | 1 | 1.22 | 1 | 1 | 1.2 |
| 250 frames | PSNR (dB) | 24.05 | 0 | -2.05 | 22.38 | 0 | -0.61 |
| foreman | Speed-up | 1 | 0.92 | 1.14 | 1 | 1 | 1.27 |
| 300 frames | PSNR (dB) | 31.51 | 0 | -2.14 | 28.88 | -0.02 | -1.4 |
| mobile | Speed-up | 1 | 1 | 1.29 | 1 | 1.05 | 1.31 |
| 300 frames | PSNR (dB) | 21.29 | -0.01 | -0.45 | 20.83 | -0.01 | -0.14 |
| news | Speed-up | 1 | 0.94 | 1.18 | 1 | 1.01 | 1.23 |
| 300 frames | PSNR (dB) | 35.48 | 0.01 | -1.68 | 31.53 | -0.04 | -1.31 |
| silent | Speed-up | 1 | 1.01 | 1.17 | 1 | 1.09 | 1.31 |
| 300 frames | PSNR (dB) | 35.19 | 0.06 | -1.45 | 31.58 | 0 | -1.07 |
| stefan | Speed-up | 1 | 0.97 | 1.05 | 1 | 0.9 | 1.07 |
| 90 frames | PSNR (dB) | 26.03 | -0.01 | -1.78 | 23.5 | 0 | -0.84 |
| tempete | Speed-up | 1 | 1 | 1.26 | 1 | 1.09 | 1.22 |
| 260 frames | PSNR (dB) | 26.46 | -0.02 | -1.21 | 24.59 | -0.01 | -0.47 |
| waterfall | Speed-up | 1 | 1.07 | 1.29 | 1 | 1.02 | 1.27 |
| 260 frames | PSNR (dB) | 30.17 | -0.01 | -2.04 | 28.45 | 0 | -1.63 |
| Average (Speed-up) | | 1 | 0.97 | 1.18 | 1 | 1.03 | 1.24 |
| Average (PSNR) | | 29.55 | 0 | -1.62 | 27.05 | -0.01 | -0.99 |

*Figure 20*

METHOD AND SYSTEM FOR SELECTIVELY PERFORMING MULTIPLE VIDEO TRANSCODING OPERATIONS

RELATED APPLICATIONS

This application is a Continuation of U.S. application Ser. No. 13/226,332 filed Sep. 6, 2011, now issued on Jun. 17, 2014 under U.S. Pat. No. 8,755,438, which claimed priority from U.S. provisional application 61/417,721 filed on Nov. 29, 2010 for "A Unified Video Transcoding System for Selectively Performing Multiple Video Transcoding Operations", entire contents of which are incorporated herein by reference.

FIELD OF THE INVENTION

The invention relates to the field of video transcoding, and in particular, to an efficient method and system for performing multiple transcoding operations on images contained in a multimedia video stream.

BACKGROUND OF THE INVENTION

Multimedia containing various types of content including text, audio and video, provides an outstanding business and revenue opportunity for network operators. The ready availability of high speed networks and the use of packet-switched Internet Protocol (IP) technology have made it possible to transmit richer content that include various combinations of text, voice, still and animated graphics, photos, video clips, and music. For exploiting this market, network operators must meet customers' expectations regarding quality and reliability. Transcoding of media at the server level is crucial for rendering multimedia applications in today's heterogeneous networks composed of mobile terminals, cell phones, computers and other electronic devices. The adaptation and transcoding of media must be performed at the service provider level because individual devices are often resource constrained and are therefore not capable of adapting the media on their own. This is an important problem for service providers, as they will have to face a very steep traffic growth in the next few years; growth that far exceeds the speed up one can obtain from new hardware alone.

As discussed by A. Vetro, C. Christopoulos, and H. Sun, in Video transcoding architectures and techniques: An overview, *IEEE Signal Processing Magazine*, vol. 20, pp. 18-29, 2003, multimedia bit-streams often need to be converted from one form to another. Transcoding is the operation of modifying and adapting the content of a pre-compressed bit-stream into another video bit-stream. Each bit-stream is characterized by a group of properties: the bit rate, the spatial resolution, the frame rate, and the compression format used to encode the video bit-stream. A group of video properties represent a video format. The role of the transcoder is becoming important in our daily life for maintaining a high level interoperability in multimedia systems where each component might have its own features and capabilities. For examples, the final user appliances include a diversity of devices such as PDA, mobile, PCs, laptops and TVs. Moreover, the networks that connect those devices are heterogeneous and can be wired or wireless with different channel characteristics. Finally, there is a huge number of video services that have been used since a couple of years such as broadcasting, video streaming, TV on demand, Blu-ray DVD. Thus, transcoding is a key technology to provide universal multimedia access (UMA).

In the past few decades, many video standards have been developed especially by International Organization for Standardization (ISO) (MPEG-1/2 and MPEG-4) and the International Telecommunication Unit (ITU-T) (H.261/H.263). ISO/IEC and ITU-T VCEG have jointly developed H.264/AVC, the recent codec that aims to achieve very high rates of compression while preserving the same visual quality compared to the predecessor standards providing similar rates. This is described by T. Wiegand, H. Schwarz, A. Joch, F. Kossentini, and G. J. Sullivan, Rate-constrained coder control and comparison of video coding standards, *IEEE Transactions on Circuits and Systems for Video Technology*, vol. 13, pp. 688-703, 2003. Even though a great number of compression formats have been standardized to target different video applications and services, video standards have a large number of properties in common as described in the publication by Schwartz, Kossentini and Sullivan. They all use block-based motion estimation/motion compensation (ME/MC) where the basic unit is a macroblock (MB) of 16×16 pixels. In addition, they share approximately the same operation building blocks: variable length decoding (VLD), variable length encoding (VLE), quantization (Q), inverse quantization (IQ), transforms such as discrete cosine transform (DCT) or its enhanced successor for the H.264/AVC, integer discrete cosine transform, inverse transform (IDCT), motion estimation (ME) and motion compensation (MC). Moreover, they all employ the concept of profiles and levels to target different classes of applications.

It is possible to use the cascaded architecture available in the prior art to perform bit rate reduction, temporal resolution adaptation (up scaling or down scaling), spatial resolution adaptation with compression format changing, logo insertion with spatial resolution adaptation, etc. The cascaded architecture allows calculating the best MVs and MB modes for the generated stream as it performs a new motion estimation (ME) using the modified sequence of images in the pixel-domain. Unfortunately, since the computationally intensive ME must be redone, the cascaded architecture is quite expensive in terms of computational complexity and is thus undesirable for real-time applications and commercial software.

To address this problem, novel video transcoding architectures have been proposed in the pixel domain (spatial domain) or DCT domain (frequency domain) to reduce this computational complexity while maintaining the highest possible quality of the re-encoded video and is described for example in the paper by A. Vetro, C. Christopoulos, and H. Sun. These architectures exploit, at the encoding stage, the information obtained at the decoding stage (MB modes, MVs, etc.) to perform bit rate adaptation; spatial resolution adaptation; frame rate adaptation; logo insertion and compression format changing. Nevertheless, the majority of these transcoders are standalone and address the implementation of a single use case that is characterized by a set of transcoding operations and specifies the type of adaptation to be performed on the input image. Some existing works including the publication by H. Sun, W. Kwok, and J. W. Zdepski, Architectures for MPEG compressed bitstream scaling, *IEEE Transactions on Circuits and Systems for Video Technology*, vol. 6, pp. 191-199, 1996 have implemented the bit rate reduction. The motion vectors (MVs) and mode mapping in these works were the major problems addressed in their works. The spatial resolution adaptation was presented in the publication by Vetro, Christopoulos and Sun where re-sampling, MVs and modes mapping were the main issues that have been addressed. The process of deriving MVs for the new generated frames was discussed by Y. Jeongnam, S. Ming-Ting, and L. Chia-Wen, in Motion vector refinement for high-performance transcoding, *IEEE Transactions on Multimedia*, vol. 1, pp. 30-40, 1999 to adapt the frame rate to the desired temporal resolution. For the watermark/logo insertion, works such as the one presented by K. Panusopone, X. Chen, and F. Ling, in Logo insertion in MPEG transcoder, 2001 *IEEE International Conference on Acoustics, Speech, and Signal Processing*. vol. 2: Institute of Electrical and Electronics Engineers Inc., 2001, pp. 981-984 have considered the issues of minimal changes in the macroblocks (MBs) where the logo is inserted (logo-MBs) while reusing the same motion vectors for the non modified MBs. The transcoding from one compression format to another compression format has been implemented in a number of works including the research by T. Shanableh and M. Ghanbari, in Heterogeneous video transcoding to lower spatio-temporal resolutions and different compression formats, *IEEE Transactions on Multimedia*, vol. 2, pp. 101-110, 2000. These works have tried to address the issues of modes and MVs mapping as well as syntax conversion.

Despite the fact that many video transcoding architectures and algorithms have been proposed, only few of the existing works have investigated the possibility to integrate the majority of the transcoding use cases in the same transcoder. N. Feamster and S. Wee in An MPEG-2 to H.263 transcoder, *Multimedia Systems and Applications II*. vol. 3845: SPIE-Int. Soc. Opt. Eng, 1999, pp. 164-75. have presented a transcoder for compression format changing from MPEG-2 to H.263 with a possibility of performing spatio-temporal resolution reduction. However, the authors have used a simple algorithm for temporal resolution reduction by dropping the B-frames of the input MPEG-2 stream. In the paper by Shanableh and Ghanbari, the authors have implemented a heterogeneous transcoder for compression format changing of MPEG-1/2 to lower bit rate H.261/H.263. Even though the algorithm of each use case was fairly detailed, a procedure to perform a combination of multiple use cases was missing. In the paper by X. Jun, S. Ming-Ting, and C. Kangwook, Motion Re-estimation for MPEG-2 to MPEG-4 Simple Profile Transcoding, *Int. Packet Video Workshop Pittsburgh*, 2002, the authors have proposed an architecture to perform transcoding from interlaced MPEG-2 to MPEG-4 simple profile with spatio-temporal resolution reduction. However, the work has reported only a limited set of experimental results for validating the proposed transcoder. Unfortunately, these few transcoders available in prior art were limited to perform a specific group of use cases (spatio-temporal resolution reduction with compression format conversion) where the compression format conversion was performed between two specific standards (MPEG-2 to H.263 or MPEG-2 to MPEG-4). In addition, they lack flexibility: they can only perform the proposed group of use cases.

These proposed architectures from prior art typically comprises units for decoding the compressed video stream, performing manipulations in the pixel domain including scaling, logo insertion and re-encoding to meet the output requirements. This is the most straightforward approach to perform any video transcoding use case or set of use cases. The operations of such an architecture are explained with the help of FIG. 1(*a*). A flowchart for a typical method deployed in such an architecture is presented in FIG. 1(*b*). The input sequence of images coded in an input format characterized by a predefined standard bit rate BR1, spatial resolution SR1 temporal resolution TR1 and compression format CF1 is presented to the input of decoder 102 that performs a full decoding in the pixel domain. The MB modes and MVs are stored. The output of the decoder 102 comprises frames, MB modes and MVs. The MVs and MB modes are fed to the input of the motion vector mapping and refinement unit 104 whereas the frames and MB modes are applied to the input of the spatio-temporal resolution adaptation unit 106 that produces frames and MB modes adapted to the desired spatio-temporal resolution. The MV mapping is done for spatio-temporal resolution reduction with compression format adaptation. The MVs are mapped in the output format to match the new spatio-temporal resolution and then, they are refined. The spatio-temporal resolution adaptation unit 106 reduces the frame rate to the predefined temporal resolution for the output format that corresponds to the sequence of output images. The frame's resolution is downscaled to the new resolution (often, the frame is downscaled by a factor of 2). The MVs produced as an output of the motion vector mapping and refinement unit 104 as well as the output of the spatio-temporal resolution adaptation unit 106 are presented to the input of the re-encoding unit 108 where the final MB modes are determined and a new residue is calculated. The residue is the difference between the original (input) MB and the predicted MB. It is computed as: $R(x, y)=I(x, y)-P(x, y)$, $0 \le x, y \le 15$, where $I(x, y)$ and $P(x, y)$ represent the pixel value at position (x,y) within the original and predicted MBs respectively. Typically, an encoder will select a set of MB mode(s) and MV(s) leading to a predicted MB minimizing a certain rate-distortion cost function.

The re-encoding unit 108 produces the output video encoded in an output format characterized by a predefined standard bit rate BR2, spatial resolution SR2, temporal resolution TR2 and compression format CF2.

A typical method used in prior art for performing a transcoding use case is explained with the help of flowchart 150 presented in FIG. 1(*b*). Upon start (box 152), procedure 150 inputs the compressed video presented in the form of a sequence of input images (box 154). Each image is then decoded in the next step (box 156). The MVs and MB modes obtained after the decoding are stored (box 158). The procedure 150 then performs the mapping of the MVs and the MB modes for the predefined set of operations corresponding to a set of one or more use cases to be performed (box 160).

For each output MB, all candidate MVs are checked (box 162). In the next step, the procedure 150 re-encodes the image (box 164). After the re-encoding operation the procedure checks whether more images need to be processed (box 166). If so, the procedure exits 'YES' from box 166, gets the next image (box 168) and loops back to the input of box 154. Otherwise the procedure exits 'NO' from box 166, produces the sequence of output images that correspond to the output video (box 170) and exits (box 172). Note that this procedure used in prior art can perform only a single predefined set of operations and does not have the flexibility to handle any arbitrary combination of transcoding use cases.

Even though these transcoding architectures from prior art exploit, at the encoding stage, the information obtained at the decoding stage (modes, MVs, etc.), most of these proposed transcoding architectures address a single use case. However, for real-life systems, it is highly undesirable to have a customized transcoding system for each transcoding use case. Such an approach would lead to a prohibitively high software development and maintenance costs.

Therefore, there is a strong requirement for developing an architecture supporting several arbitrary transcoding use cases in the same computationally efficient transcoder.

SUMMARY OF THE INVENTION

Therefore it is an objective of the present invention to provide an improved method and system selectively performing multiple transcoding operations that mitigate the limitations of the prior art.

According to one aspect of the invention, there is provided a computerized method for transcoding a sequence of input images, each input image comprising one or more input macroblocks (MB) of pixels encoded in a first format, into a sequence of output images, each output image comprising one or more output macroblocks of pixels encoded in a second format, the method comprising:
in a computer having a processor configured for:
- (a1) reading a set of one or more transcoding use cases, each transcoding use case characterized by a respective type of adaptation to be performed on the input image;
- (b1) decoding the input image into a decoded input image, including:
  decoding each input MB, comprising extracting metadata comprising an encoding block mode for said each input MB, indicating size of partitions within said each input MB, and respective motion vectors (MVs) associated with partitions within said each input MB;
- (c1) determining a number of stages of MVs mapping to be performed based on the set of one or more transcoding use cases;
- (d1) by using the metadata, performing a block of operations, corresponding to the set of one or more transcoding use cases, on the decoded input image, including mapping MVs and mapping MB modes to generate an adapted input image, each operation corresponding to a transcoding use case in the set of one or more transcoding use cases; and
- (e1) re-encoding the adapted input image to generate the output image.

The step (d1) further comprises:
performing a first stage mapping, including one-to-one mapping of the MB modes and the MVs for a temporal resolution adaptation provided the set of one or more transcoding use cases comprises the temporal resolution adaptation; and
performing a second stage mapping, including one-to-many mapping of the MB modes and the MVs for remaining transcoding use cases in the set of said one or more transcoding use cases.

The step (a1) further comprises:
reading:
a set of policies, each policy characterized by a quality level and a respective type of MV refinement to be used; and
a quality level for the output image.

The method further comprises a step of determining whether a conditional refinement of MVs is to be performed by using the quality level for the output image and the set of policies.

The step (b1) further comprises storing the metadata extracted in the step (b1) in a computer memory.

The step (c1) further comprises determining whether a one-stage or a two-stage MVs mapping is to be performed based on types of transcoding use cases.

The step (c1) further comprises:
(a3a) determining a number of transcoding use cases in the set of one or more transcoding use cases; and
(b3a) determining whether a one-stage or a two-stage MVs mapping is to be performed based on the number of transcoding use cases.

The step (c1) comprises:
(a3b) determining a number of transcoding use cases in the set of one or more transcoding use cases; and
(b3b) determining whether a one-stage or a two-stage MVs mapping is to be performed based on the number and types of transcoding use cases The step (b3a) further comprises choosing the one-stage MVs mapping provided the number of transcoding use cases is one.

The method further comprises using characteristics of the input image and the output image in addition to the set of policies for determining whether the conditional refinement is to be performed.

In the method described above, the characteristics of the input image comprise one or more of the following: a first bit rate; a first spatial resolution; a first temporal resolution; a first compression format of the input image; and the characteristics of the output image comprises one or more of the following: a second bit rate; a second spatial resolution; a second temporal resolution; and a second compression format.

The characteristics of the input image and the output image comprise the first format and the second format respectively.

In the method described above, the step (d1) comprises:
(a5) mapping said each input MB into a corresponding output MB;
(b5) generating a MV for said each output MB; and
(c5) performing a conditional refinement of the MV generated in the step (b5).

The step (e1) further comprises performing rate control for the sequence of output images.

The method as described above, further comprising one or more of the following:
(a7) performing a temporal resolution adaptation of the input image;
(b7) performing a spatial resolution adaptation of the input image;
(c7) performing a bit rate adaptation of the input image;
(d7) performing a compression format adaptation of the input image; and
(e7) inserting a logo/watermark in the input image.

In the method described above, performing a conditional refinement in the step (c5) comprises increasing accuracy of the MV using a predetermined set of conditions.

In more detail, the step (a5) comprises:
(a9) based on the set of one or more transcoding use cases, generating a set of candidate block modes for the output MB, each candidate block mode having a respective set of candidate MVs including a predicted MV; and
(b9) choosing a block mode from the set of candidate block modes that minimizes a cost-quality metric for the output MB, the cost-quality metric capturing a tradeoff between cost of encoding and quality of the output image.

The predetermined set of conditions includes a condition that the candidate MV for the candidate block mode chosen in the step (b9) is same as the predicted motion vector.

The step (b9) comprises:
(a9b) evaluating the cost-quality metric for the set of candidate MVs including the predicted MV for said each candidate block mode;
(b9b) selecting the candidate MV producing a minimum value for the cost-quality metric as a best MV; and
(c9b) selecting the candidate block mode corresponding to the best MV.

The step (c5) comprises:
(a9c) performing refinement of the best MV provided the best MV is the predicted MV; and
(b9c) reusing the candidate MV for the candidate block mode provided the best MV is the candidate MV for the candidate block mode selected in the step (c9b).

The step (b3b) further comprises:
(a10) determining types of adaptation to be performed on the input image for the set of one or more transcoding use cases, the types of adaptation comprising a bit rate adaptation, a temporal resolution adaptation, a spatial resolution adaptation, a compression format adaptation and a logo/watermark insertion; and (b10) determining whether the one-stage or the two-stage MVs mapping is to be performed based on the types of adaptation to be performed on the input image, provided the number of transcoding use cases is more than one.

The step (b10) further comprises choosing the two-stage MVs mapping provided the types of adaptation to be performed on the input image include the temporal resolution adaption, and the first stage of MVs mapping corresponds to the temporal resolution adaptation.

The step (a7) comprises one of up scaling and down scaling of temporal resolution for the input image. The step (b7) comprises one of up scaling and down scaling of spatial resolution of the input image.

The step (a5) comprises performing a one-stage or a two-stage MVs mapping.

The two-stage MVs mapping comprises:

(a14) performing a one-to-one mapping of block modes and the MVs in a first stage of MVs mapping, generating a single candidate block mode having respective candidate MV, for the output MB; and (b14) performing a one-to-many mapping of the block modes and the MVs in a second stage of MVs mapping, generating multiple candidate block modes, each having said respective candidate MV, for the output MB.

According to another aspect of the invention, there is provided a non-transitory computer readable storage medium, having a computer readable program code instructions stored thereon, which, when executed by a processor, perform the following:

(a15) reading a set of one or more transcoding use cases, each transcoding use case characterized by a respective type of adaptation to be performed on the input image;

(b15) decoding the input image into a decoded input image, including:
  decoding each input MB, comprising extracting metadata comprising an encoding block mode for said each input MB, indicating size of partitions within said each input MB, and respective motion vectors (MVs) associated with partitions within said each input MB;

(c15) determining a number of stages of MVs mapping to be performed based on the set of one or more transcoding use cases;

(d15) by using the metadata, performing a block of operations, corresponding to the set of one or more transcoding use cases, on the decoded input image, including mapping MVs and mapping MB modes to generate an adapted input image, each operation corresponding to a transcoding use case in the set of one or more transcoding use cases; and (e15) re-encoding the adapted input image to generate the output image.

According to yet another aspect of the invention, there is provided a computerized system for transcoding a sequence of input images, each input image comprising one or more input macroblocks (MB) of pixels encoded in a first format, into a sequence of output images, each output image comprising one or more output macroblocks of pixels encoded in a second format, the system comprising:

a processor, and a non-transitory computer readable storage medium having computer readable instructions stored thereon for execution by the processor, forming:

(a16) a reader module reading a set of one or more transcoding use cases, each transcoding use case characterized by a respective type of adaptation to be performed on the input image;

(b16) a decoder unit decoding the input image into a decoded input image, including:
  decoding each input MB, comprising extracting metadata comprising an encoding block mode for said each input MB, indicating size of partitions within said each input MB, and respective motion vectors (MVs) associated with partitions within said each input MB;

(c16) an MVs and modes mapping decision module determining a number of stages of MVs mapping to be performed based on the set of one or more transcoding use cases;

(d16) an operations block unit performing a block of operations corresponding to the set of one or more transcoding use cases, on the decoded input image, including mapping MVs and mapping MB modes to generate an adapted input image, each operation corresponding to a transcoding use case in the set of one or more transcoding use cases; and (e16) an encoder unit re-encoding the adapted input image to generate the output image.

The operations block unit (d16) further comprises:

a stage-1 mapping module performing a first stage mapping, including one-to-one mapping of the MB modes and the MVs for a temporal resolution adaptation provided the set of one or more transcoding use cases comprises the temporal resolution adaptation; and a stage-2 mapping module performing a second stage mapping, including one-to-many mapping of the MB modes and the MVs for remaining transcoding use cases in the set of said one or more transcoding use cases.

The reader module (a16) further comprises an input module reading:

a set of policies, each policy characterized by a quality level and a respective type of MV refinement to be used; and a quality level for the output image.

The system further comprises a conditional refinement decision module determining whether a conditional refinement of MVs is to be performed by using the quality level for the output image and the set of policies.

The decoder unit (b16) comprises a metadata storage module storing the metadata extracted in the step (b16) in a computer memory.

The MVs and modes mapping decision module (c16) further comprises computational means for determining whether a one-stage or a two-stage MVs mapping is to be performed based on types of transcoding use cases.

The MVs and modes mapping decision module (c16) comprises:

(a18a) a number of transcoding use cases determination module determining a number of transcoding use cases in the set of one or more transcoding use cases; and (b18a) a MV mapping type determination module determining whether a one-stage or a two-stage MVs mapping is to be performed based on the number of transcoding use cases.

The MVs and modes mapping decision module (c16) further comprises:

(a18b) computational means for determining a number of transcoding use cases in the set of one or more transcoding use cases; and (b18b) a MV mapping selection module determining whether a one-stage or a two-stage MVs mapping is to be performed based on the number and types of transcoding use cases.

The MV mapping type determination module (b18a) further comprises computational means for choosing the one-stage MVs mapping provided the number of transcoding use cases is one.

The conditional refinement decision module further comprises computational means for using characteristics of the input image and the output image in addition to the set of policies for determining whether the conditional refinement is to be performed.

In the system described above, the characteristics of the input image comprise one or more of the following: a first bit rate; a first spatial resolution; a first temporal resolution; a first compression format of the input image; and the characteristics of the output image comprises one or more of the following: a second bit rate; a second spatial resolution; a second temporal resolution; and a second compression format.

The characteristics of the input image and the output image comprise the first format and the second format respectively.

The operations block unit (d16) comprises:
(a20) a mapping module mapping said each input MB into a corresponding output MB;
(b20) a MV generation module generating a MV for said each output MB; and
(c20) a conditional refinement module performing a conditional refinement of the MV generated by the MV generation module (b20).

The encoder unit (e16) further comprises a rate control module performing rate control for the sequence of output images.

The system further comprises one or more of the following:
(a22) a temporal resolution adaptation module performing temporal resolution adaptation of the input image;
(b22) a spatial resolution adaptation module performing a spatial resolution adaptation of the input image;
(c22) a bit rate adaptation module performing a bit rate adaptation of the input image;
(d22) a compression format adaptation module performing a compression format adaptation of the input image; and
(e22) a logo/watermark insertion module inserting a logo/watermark in the input image.

The conditional refinement module (c20) comprises computational means for increasing accuracy of the MV using a predetermined set of conditions.

The mapping module (a20) comprises:
(a24) a candidate block mode generation module generating a set of candidate block modes for the output MB based on the set of one or more transcoding use cases, each candidate block mode having a respective set of candidate MVs including the predicted MV; and
(b24) a selection module choosing a block mode from the set of candidate block modes that minimizes a cost-quality metric for the output MB, the cost-quality metric capturing a tradeoff between cost of encoding and quality of the output image.

In the system described above, the predetermined set of conditions includes a condition that the candidate MV for the candidate block mode chosen by the selection module (b24) is same as the predicted motion vector.

The selection module (b24) comprises:
(a24b) an evaluation module evaluating the cost-quality metric for the set of candidate MVs including the predicted MV for said each candidate block mode;
(b24b) a best MV selection module selecting the candidate MV producing a minimum value for the cost-quality metric as a best MV; and
(c24b) a block mode selection module selecting the candidate block mode corresponding to the best MV.

The conditional refinement module (c20) comprises:
(a24c) a refinement module performing refinement of the best MV provided the best MV is the predicted MV;
(b24c) computational means for reusing the candidate MV for the candidate block mode provided the best MV is the candidate MV for the candidate block mode selected by the block mode selection module (c24b).

The MV mapping selection module (b18b) further comprises:
(a25) an adaptation type determination module determining types of adaptation to be performed on the input image for the set of one or more trancoding use cases, the types of adaptation comprising a bit rate adaptation, a temporal resolution adaptation, a spatial resolution adaptation, a compression format adaptation and a logo/watermark insertion; and
(b25) a number of stages determination module determining whether the one-stage or the two-stage MVs mapping is to be performed using the types of adaptation to be performed on the input image, provided the number of transcoding use cases is more than one.

The number of stages determination module (b25) further comprises computational means for choosing the two-stage MVs mapping provided the types of adaptation to be performed on the input image include the temporal resolution adaption.

In the system described above, the first stage of MVs mapping corresponds to the temporal resolution adaptation.

The temporal resolution adaptation module (a22) comprises one of a first up scaling module up scaling the temporal resolution for the input image and a first down scaling module down scaling the temporal resolution for the input image.

The spatial resolution adaptation module (b22) comprises one of a second up scaling module up scaling the spatial resolution for the input image and a second down scaling module down scaling the spatial resolution for the input image.

The mapping module (a20) comprises a MVs mapping module performing a one-stage or a two-stage MVs mapping.

The MVs mapping module further comprises:
(a29) a one-stage MVs mapping module performing the one-stage MVs mapping; and
(b29) a two-stage MVs mapping module performing the two-stage MVs mapping.

The two-stage MVs mapping module (b29) comprises:
(a30) a first stage MVs mapping module performing a one-to-one mapping of block modes and the MVs in the first stage MVs mapping, generating a single candidate block mode having respective candidate MV, for the output MB; and
(b30) a second stage MVs mapping module performing a one-to-many mapping of the block modes and the MVs in the second stage of MVs mapping, generating multiple candidate block modes each having said respective candidate MV, for the output MB.

Thus, an efficient method and system for performing multiple transcoding operations on images contained in a multimedia video stream have been provided.

BRIEF DESCRIPTION OF THE DRAWINGS

Further features and advantages of the invention will be apparent from the following description of the embodiment, which is described by way of example only and with reference to the accompanying drawings, in which:

FIG. 2a-1) illustrates the MVs and Modes Mapping Decision Module 206 of FIG. 2(a) for another embodiment in more detail;

FIG. 2(b-1) illustrates the conditional refinement module 264 of FIG. 2(b) for another embodiment in more detail;

Figure 2A:
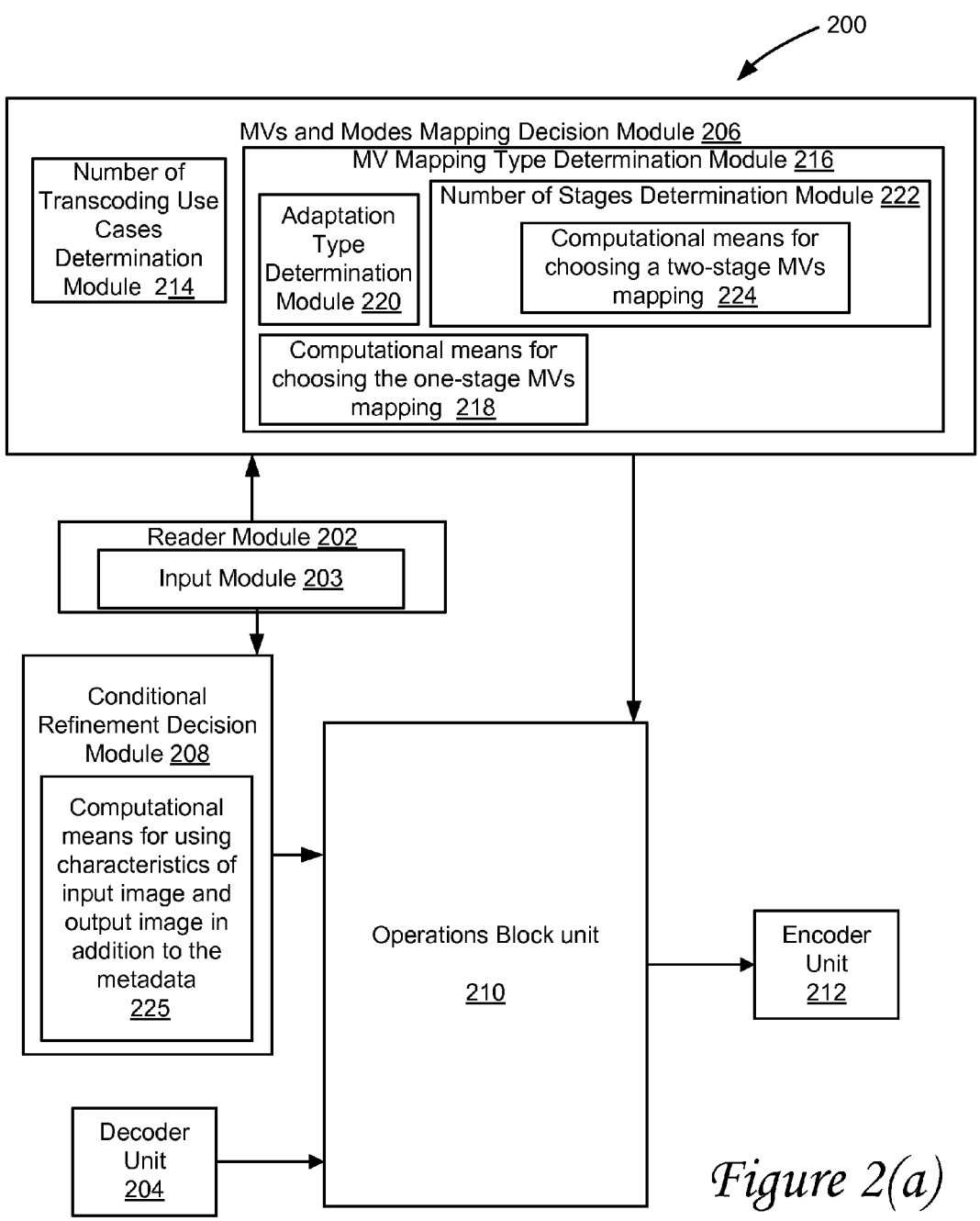
FIG. 2(a) presents system 200 of the embodiment of the invention.
Figure 2B:
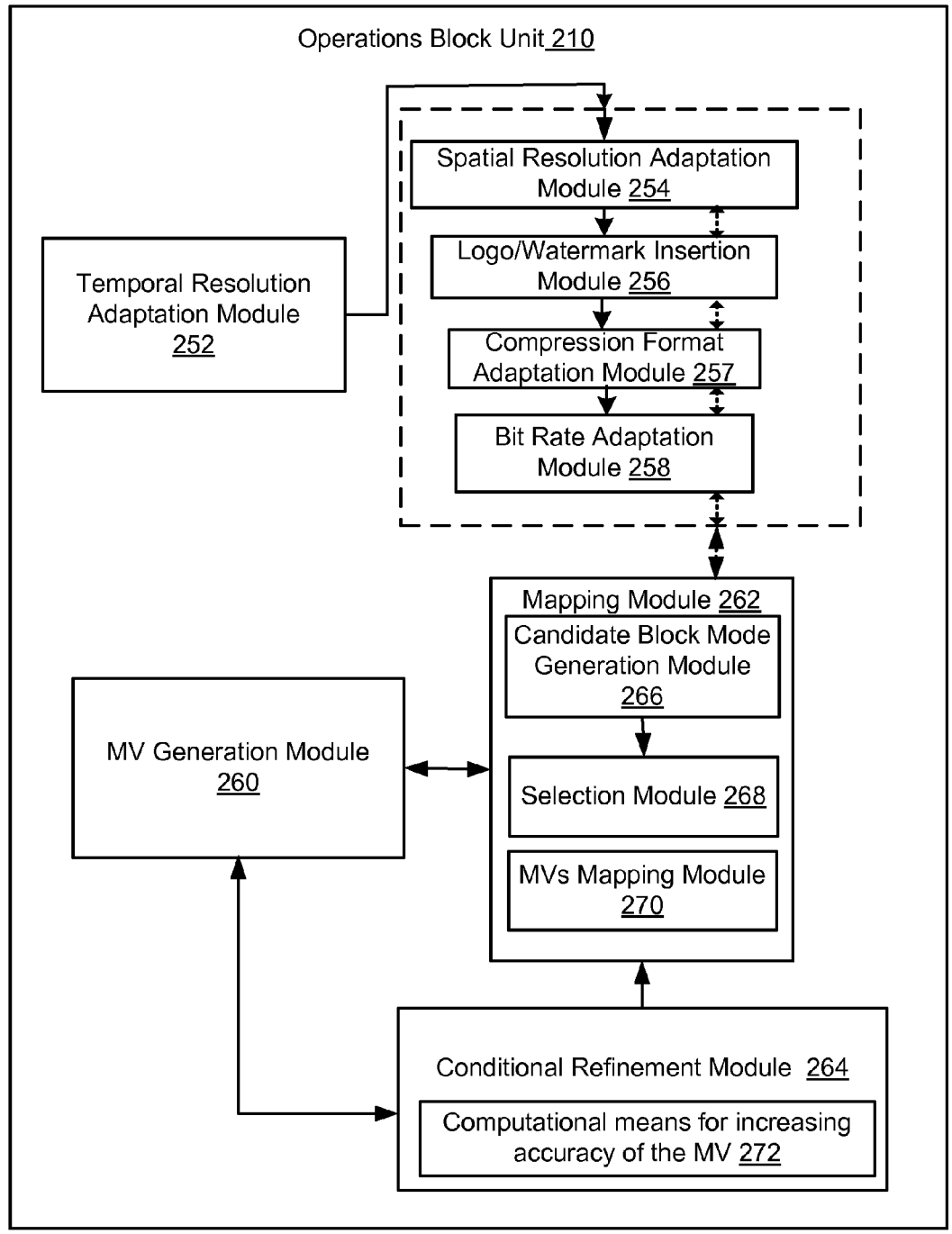
FIG. 2(b) illustrates the operations block unit 210 of FIG. 2(a) in more detail.
Figure 2F:
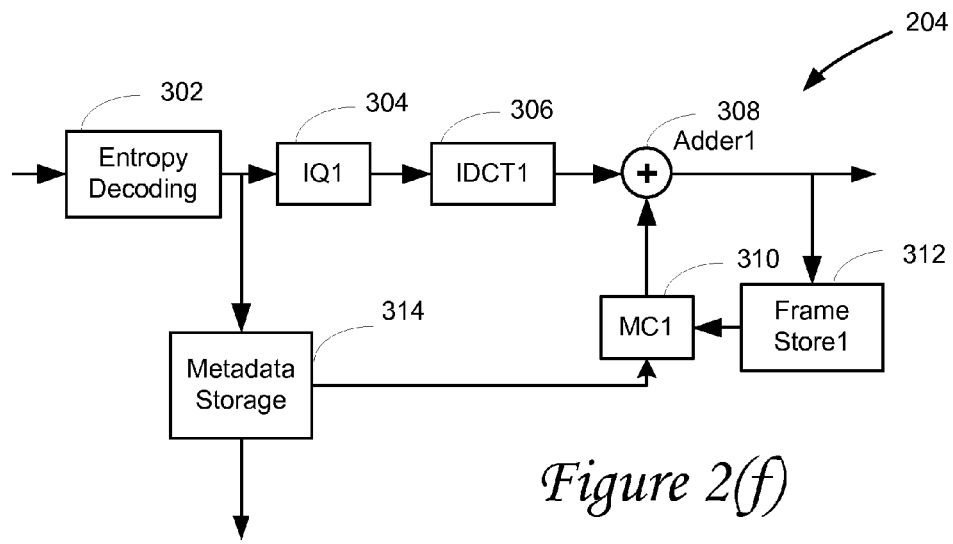
FIG. 2(a-2) illustrates the MVs and Modes Mapping Decision Module 206 of FIG. 2(a) for yet another embodiment in more detail.
Figure 2G:
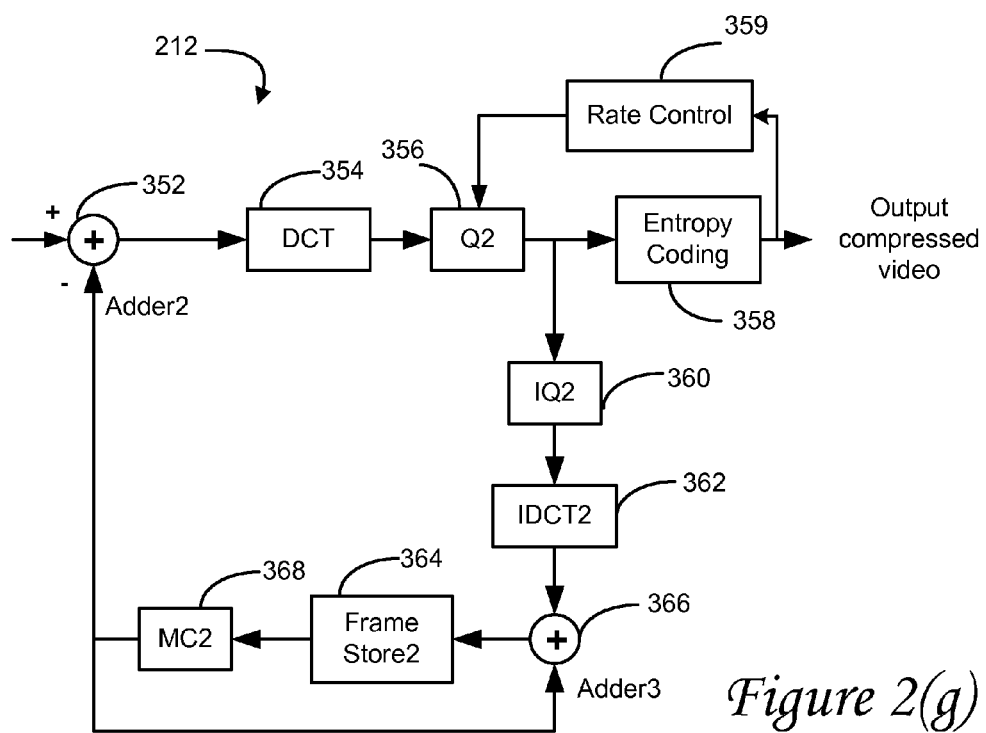
Figure 3:
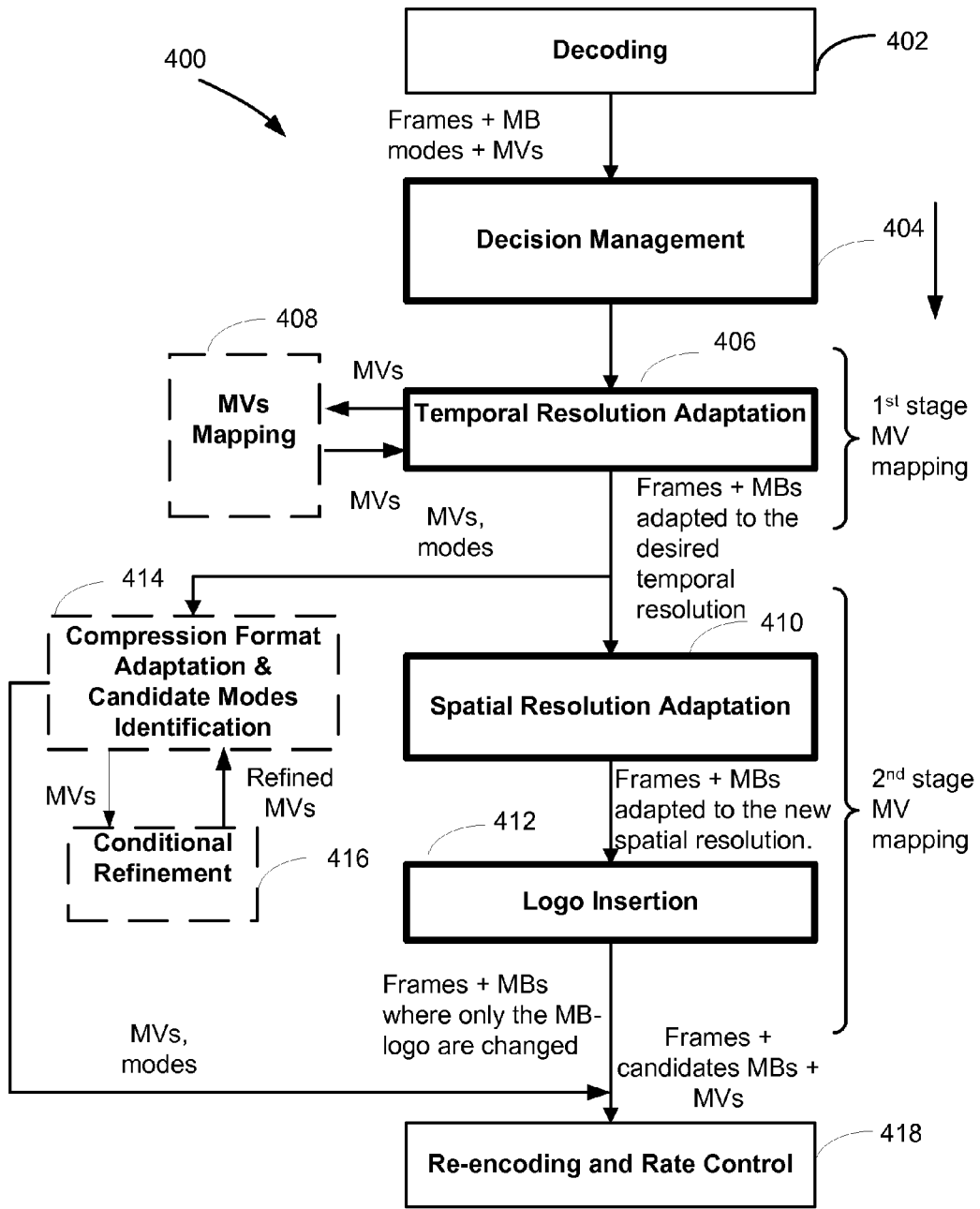
Figure 4A:
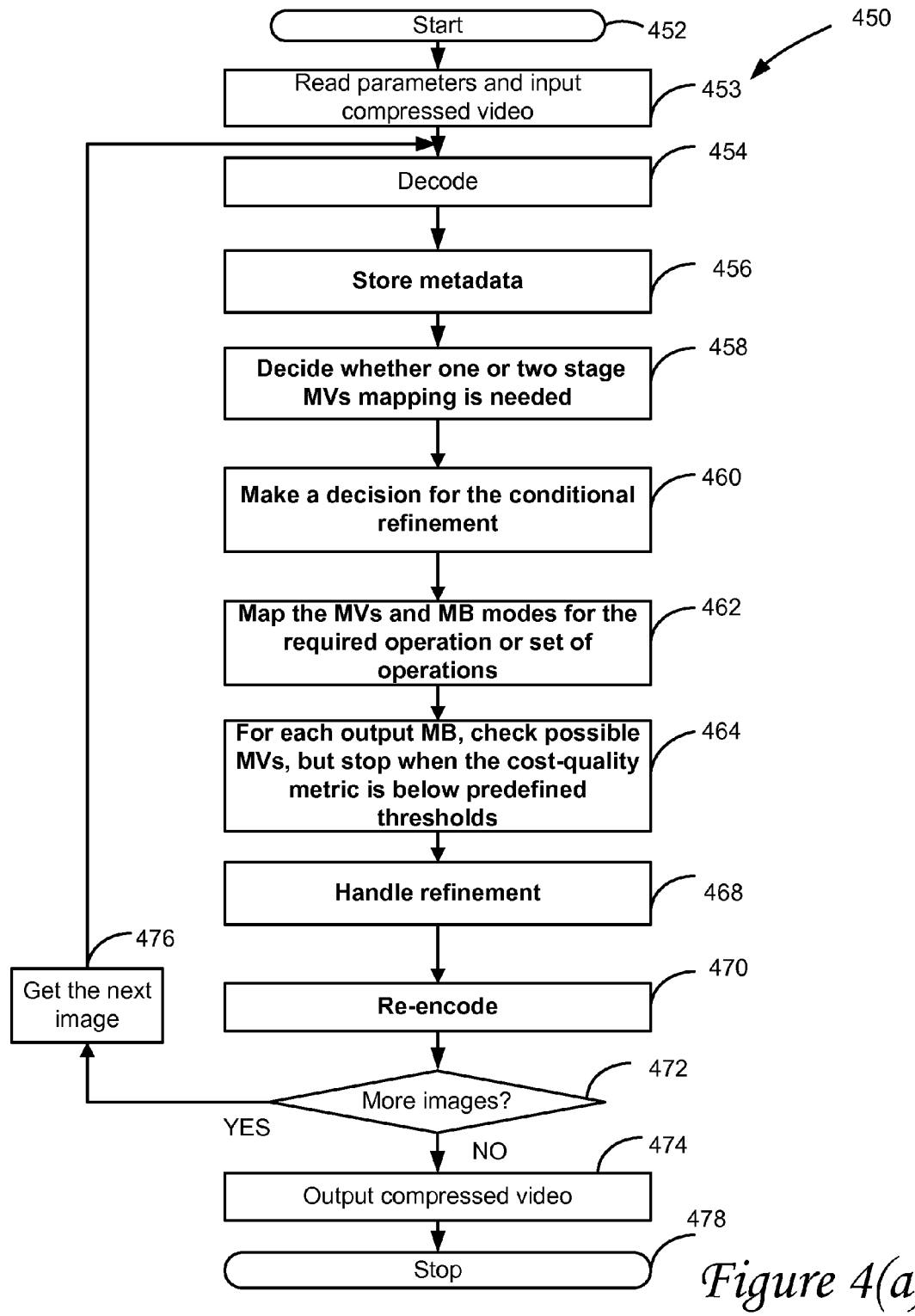
Figure 4B:
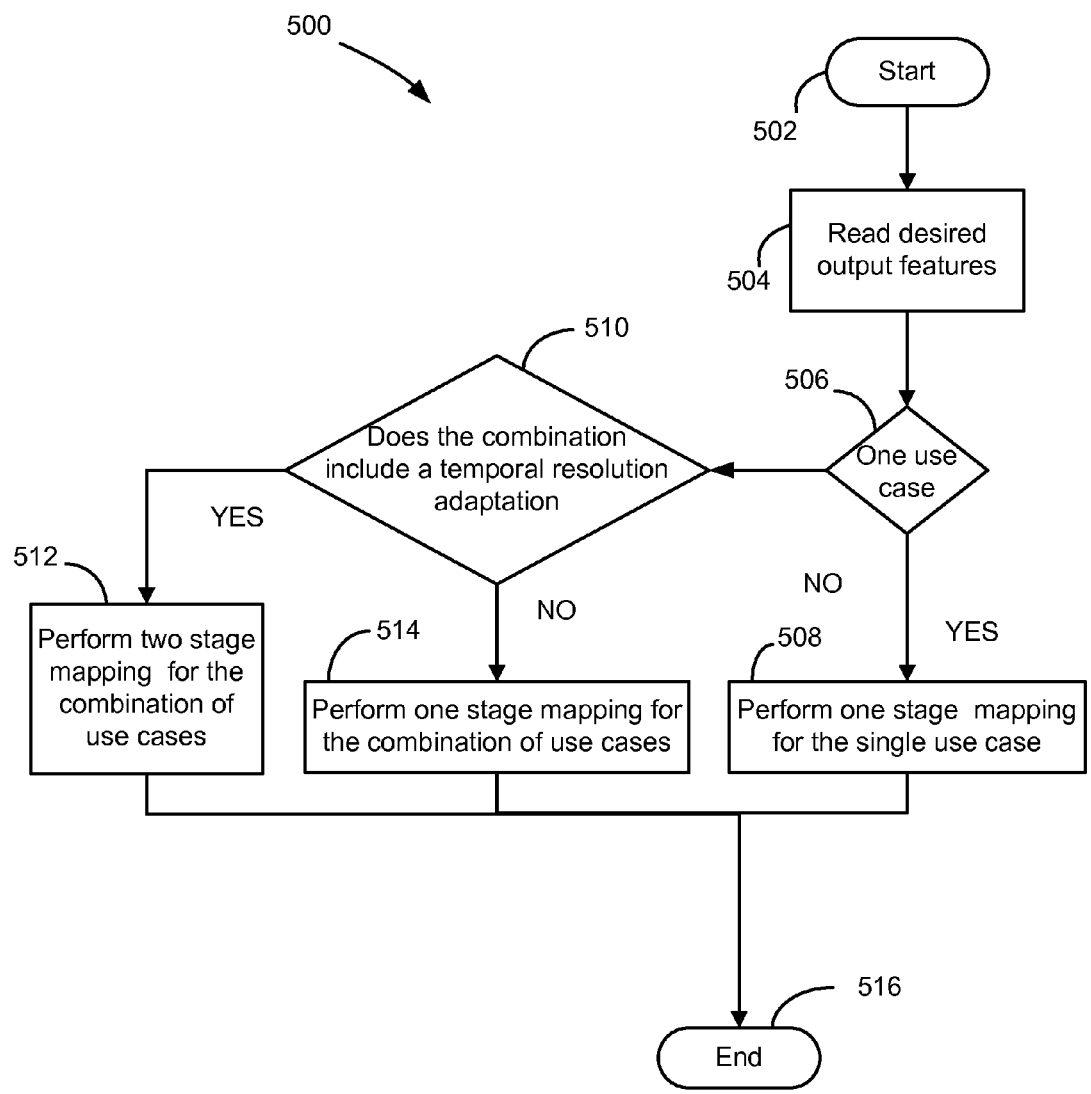
Figure 4C:
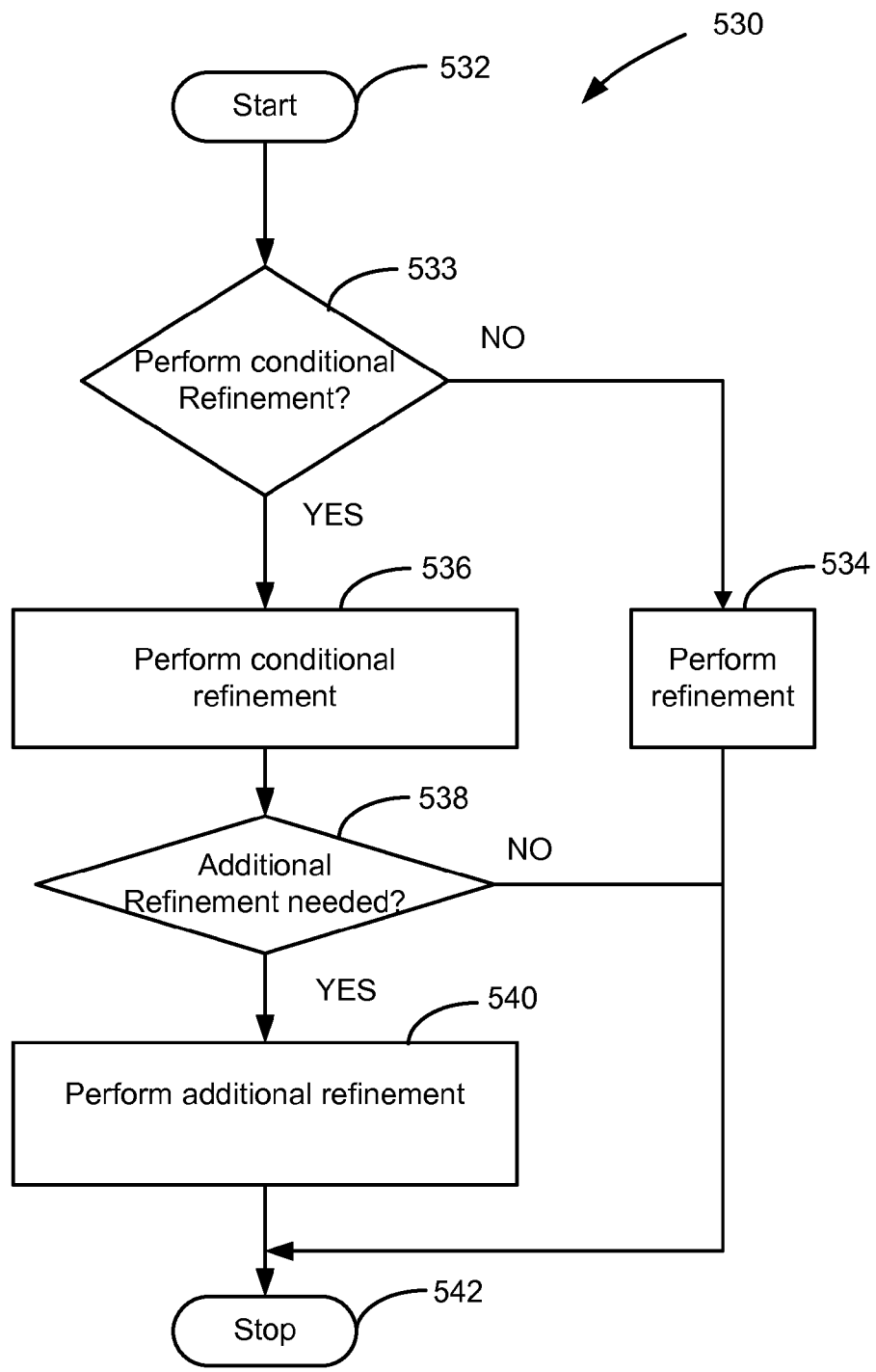
Figures 5A, 5B:
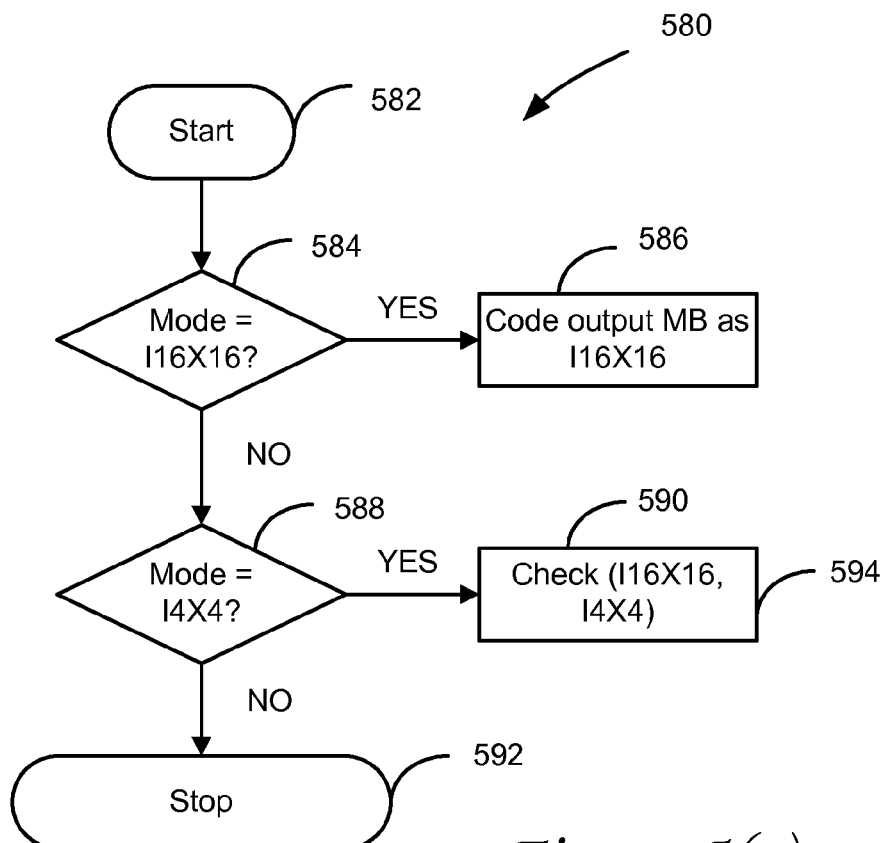
Figure 5C:
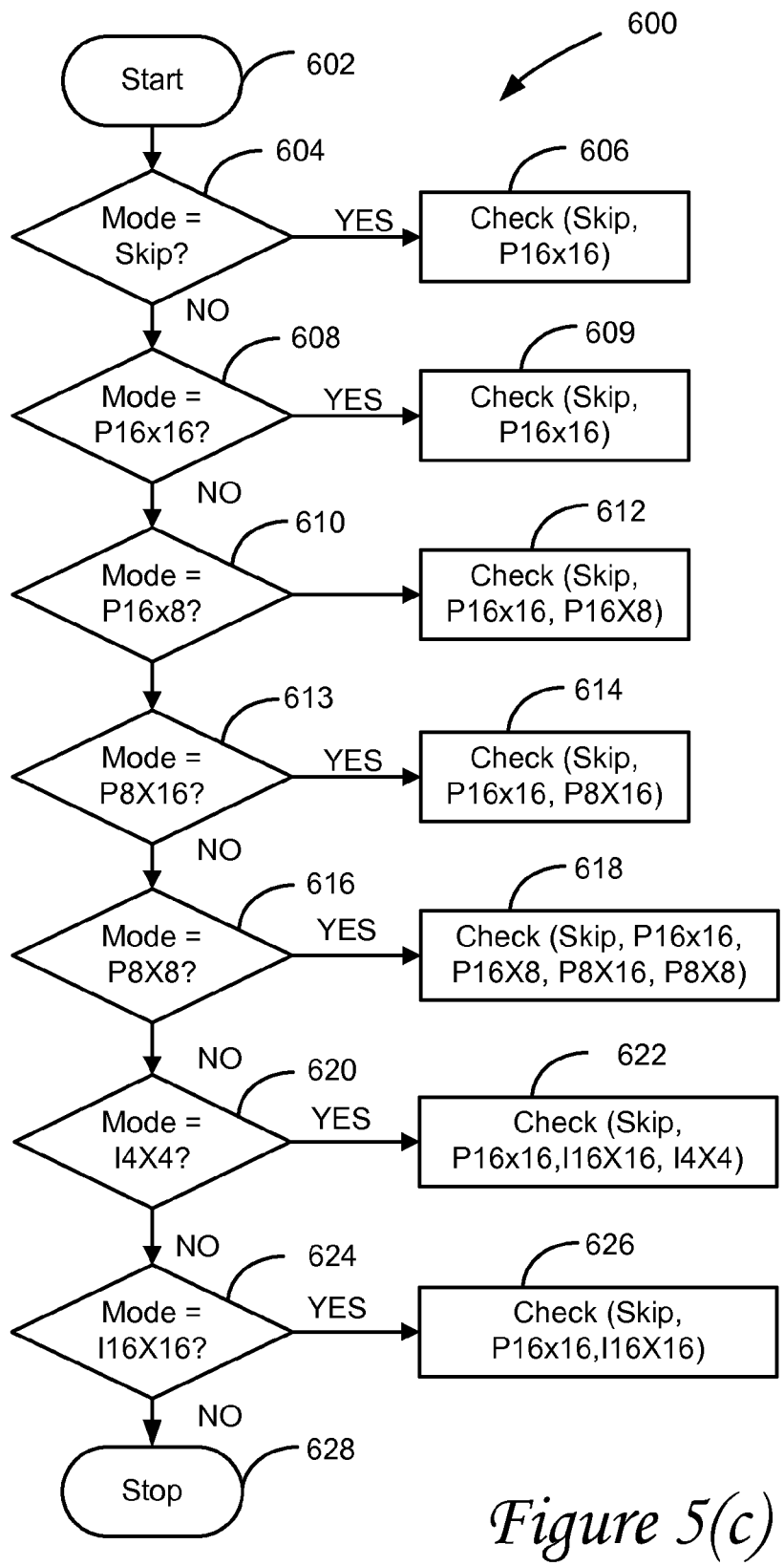
Figures 6A, 6B:
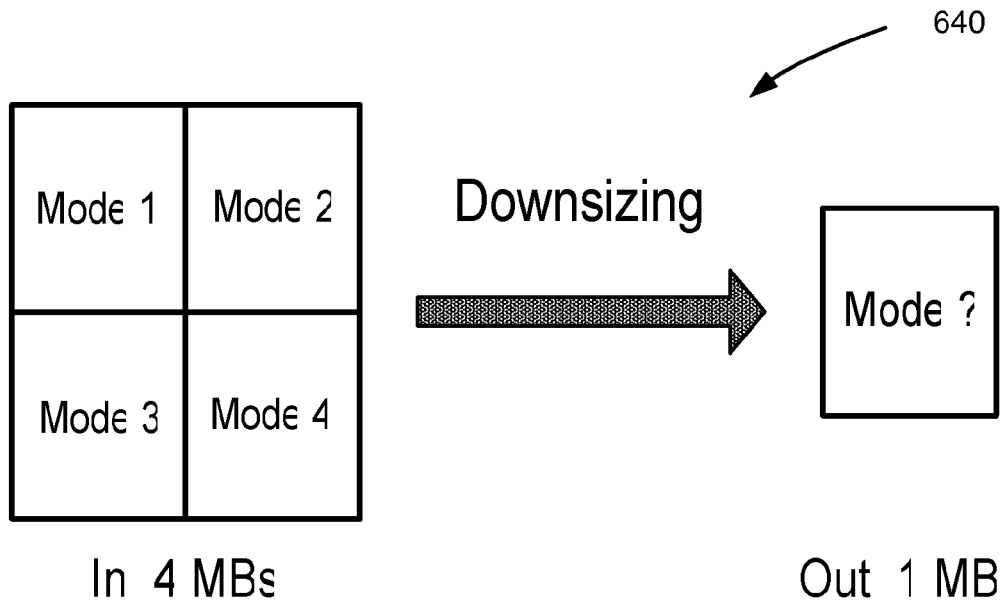
Figure 7B:
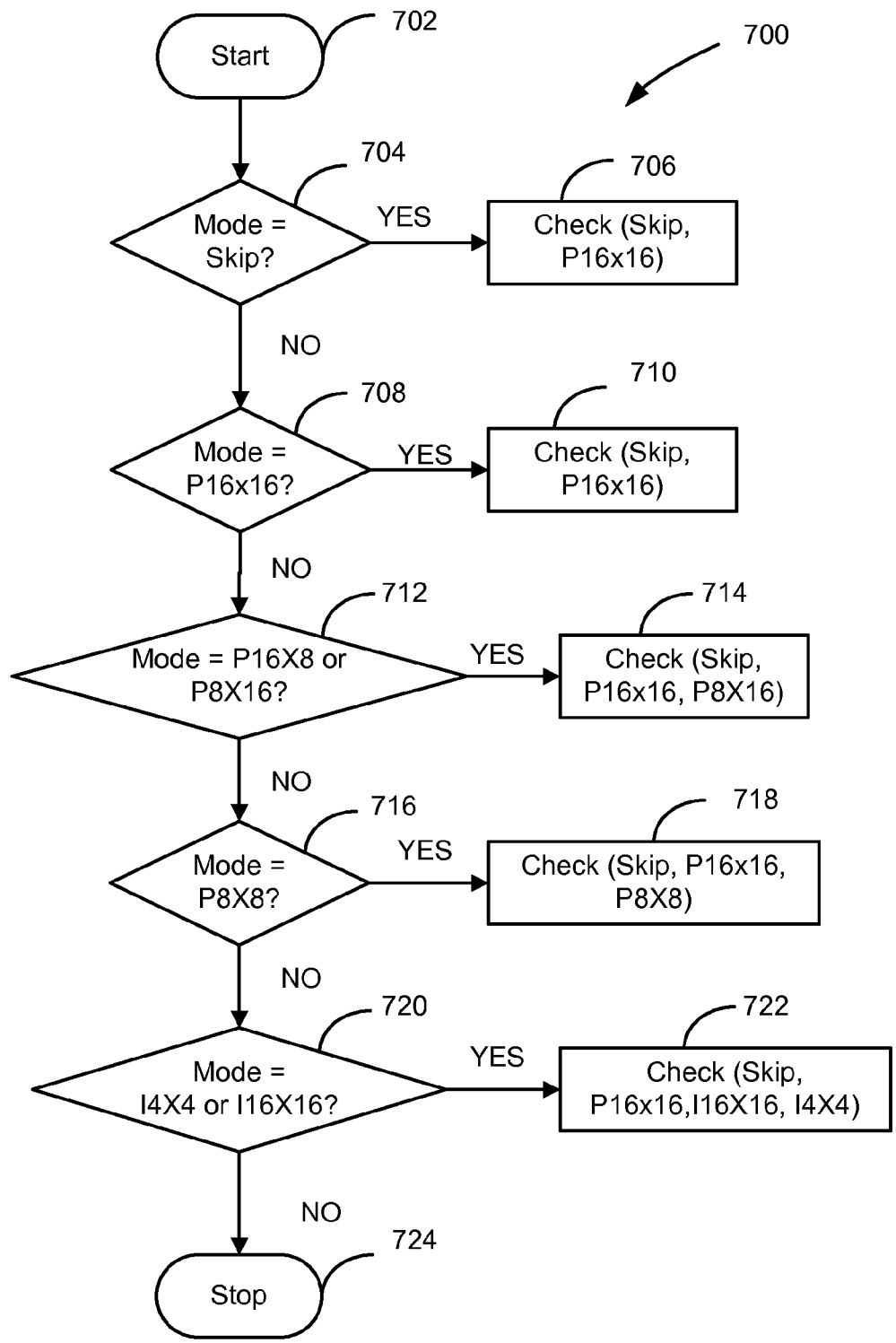
Figures 8A, 8B:
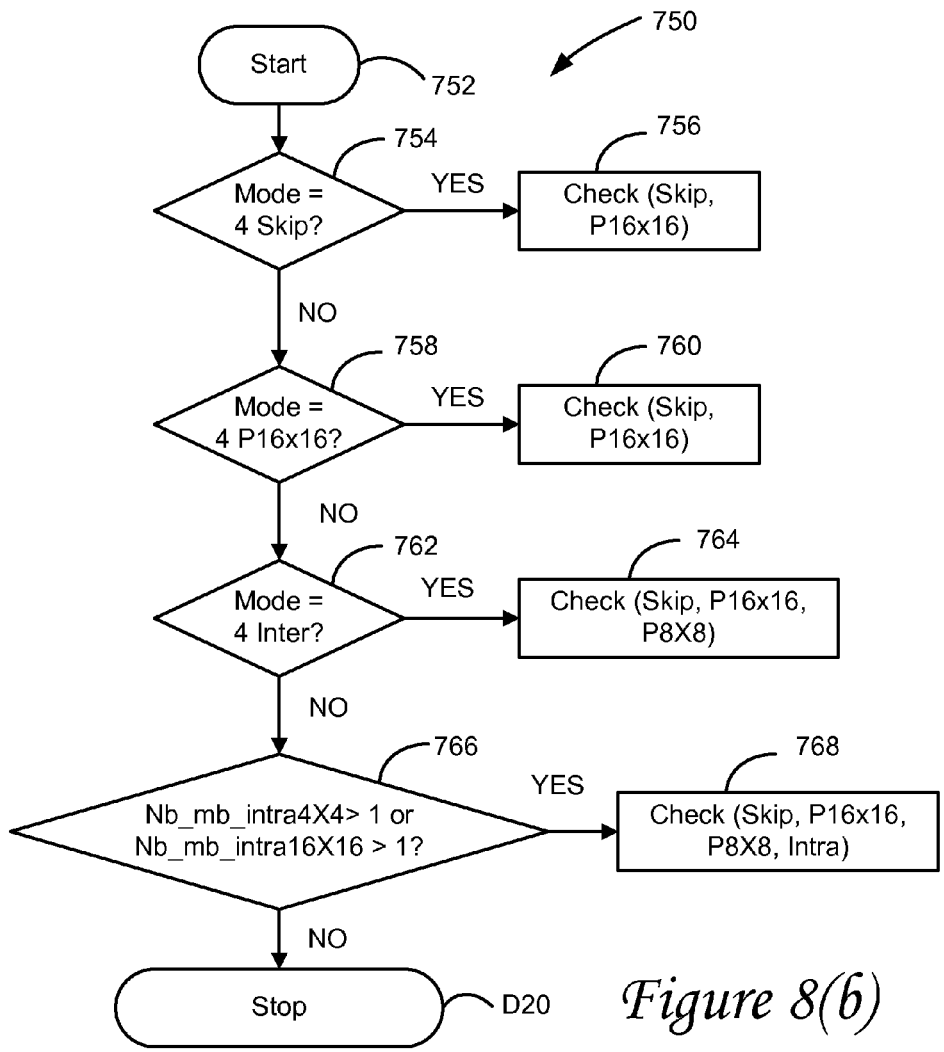

FIG. (2b-2) illustrates the selection module 268 of FIG. 2(b) in more detail;

FIG. 2(c) the MVs mapping module 270 of FIG. 2(b) in more detail;

FIG. 2(d) illustrates the temporal resolution adaptation module 252 of FIG. 2(b) in more detail;

FIG. 2(e) illustrates the spatial resolution adaptation module 254 of FIG. 2(b) in more detail;

FIG. 2(e-1) illustrates the operations block unit 210 of FIG. 2(a) for another embodiment in more detail;

FIG. 2(f) illustrates the decoder unit 204 of FIG. 2(a) in more detail;

FIG. 2(g) illustrates the encoder unit 212 of FIG. 2(a) in more detail;

FIG. 3 illustrates the flow of operations of the system 200 presented in FIG. 2(a);

FIG. 4(a) presents the steps of the method of the embodiment of the invention;

FIG. 4(b) presents the operations performed in box 458 of FIG. 4(a) in more detail;

FIG. 4(c) presents the operations performed in box 468 of FIG. 4(a) in more detail;

FIG. 5(a) illustrates the details of the candidates mapping method used by box 462 of FIG. 4(a) for intra input frames;

FIG. 5(b) presents Table 1 that captures the mapping between block mode of an input MB mode and that of an output MB used by the candidate mapping method of FIG. 5(a);

FIG. 5(c) illustrates the details of the candidates mapping method used by box 462 of FIG. 4(a) for inter input frames;

FIG. 6(a) illustrates the spatial resolution reduction problem;

FIG. 6(b) presents Table 2 that captures the mapping of the block modes for the candidates mapping method used for spatial resolution adaption;

FIG. 6(c) illustrates the details of the candidates mapping executed during the processing of box 462 of FIG. 4(a) for spatial resolution adaptation;

FIG. 7(a) presents Table 3 that captures the MVs and block mode mappings for P frames for compression format adaptation and compression format adaptation with bit rate reduction;

FIG. 7(b) illustrates the details of the candidates mapping method executed during the processing of box 462 of FIG. 4(a) when handling P frames during compression format adaptation;

FIG. 8(a) presents Table 4 that captures the block mode mappings used for inter frames during compression format adaptation with spatial resolution adaptation;

FIG. 8(b) illustrates the details of the candidates mapping method executed during the processing of box 462 of FIG. 4(a) when handling for inter frames during compression format adaptation with spatial resolution adaptation;

FIG. 9 presents the performance results for bitrate reduction CIF 512 kbps to 384 and 256 kbps;

FIG. 10 presents the performance results for bitrate reduction CIF 256 kbps to 192 and 128 kbps;

FIG. 11 presents the performance results for bitrate reduction QCIF 256 kbps to 192 and 128 kbps; and FIG. 12 presents the performance results for bitrate reduction QCIF 128 kbps to 96 and 64 kbps.

FIG. 13 presents the performance results for spatial resolution reduction CIF to QCIF, 512 kbps to 256 kbps;

FIG. 14 presents the performance results for spatial resolution reduction CIF to QCIF, 256 kbps to 128 kbps FIG. 15 presents the performance results for compression format conversion from H.264 BP to MPEG-4 VSP using CIF sequences from 512 kbps to 512 and 256 kbps;

FIG. 16 presents the performance results for compression format conversion from H.264 BP to MPEG-4 VSP using CIF sequences from 256 kbps to 256 and 128 kbps;

FIG. 17 presents the performance results for compression format conversion from H.264 BP to MPEG-4 VSP using QCIF sequences from 256 kbps to 256 and 128 kbps;

FIG. 18 presents the performance results for compression format conversion from H.264 BP to MPEG-4 VSP using QCIF sequences from 128 kbps to 128 and 64 kbps;

FIG. 19 presents the performance results for compression format conversion with spatial resolution reduction: CIF to QCIF from 512 kbps to 256 and 128 kbps; and FIG. 20 presents the performance results for compression format conversion with spatial resolution reduction: CIF to QCIF from 256 kbps to 128 and 64 kbps.

DESCRIPTION OF THE EMBODIMENTS OF THE INVENTION

The embodiments of the present invention present a novel method and system for performing one or more transcoding use cases for converting a sequence of input images provided in a first format to a corresponding sequence of output images in a second format. The first format is characterized by a bit rate BR1, a spatial resolution SRL a temporal resolution TR1 and a compression format CF1. The second format is characterized by a bit rate BR2, a spatial resolution SR2, a temporal resolution TR2 and a compression format CF2. The transcoding operations are achieved with a lower computational complexity while maintaining a comparable image quality as the prior art. Each transcoding use case describes the process or transformation used by a user of the system to achieve her/his transcoding goal. Typical transcoding use cases include a bit rate adaptation use case, a spatial resolution adaptation use case, a temporal resolution adaptation use case, a logo/watermark insertion use case and a compression format adaptation use case. In the bit rate adaptation use case the bit rate for the input image is adapted to a bit rate corresponding to the second format. Spatial resolution of an image reflects image clarity and how closely lines can be resolved in an image. Spatial resolution adaptation requires altering the number of pixels of the input image to meet the requirements of the second format used for the output image. Temporal resolution concerns the resolution of images at different points in time and is often measured in frames per second. Temporal resolution adaptation requires changing the resolution of the input image to the temporal resolution specifications for the output format. In case of the logo/watermark insertion use case, a given logo and/or watermark is inserted at a specific position in the output image. In the compression format adaptation use case, the coding standard for the input image is adapted to a coding standard corresponding to the second format.

Each transcoding use case is characterized by a type of adaptation to be performed on the input image and typically requires multiple operations to achieve its goals. The embodiments of the present invention are capable of effectively performing one or many combination of transcoding use cases.

The system of the embodiments of the present invention is presented in FIG. 2(a). The system of the embodiments of the invention shown in FIG. 2(a) includes a general purpose or specialized computer having a CPU and a computer readable medium, for example, memory, DVD, CD-ROM, floppy disk, flash memory, magnetic tape or other storage medium, having computer readable instructions stored thereon for execution by the CPU. Alternatively, the system of FIG. 2(a) can be implemented in firmware, or combination of firmware and a specialized computer having a computer readable storage medium.

The system 200 presented in FIG. 2(a) transcodes a sequence of input images, each input image comprising one or more input macroblocks of pixels encoded in a first format, into a sequence of output images, each output image comprising one or more output macroblocks of pixels encoded in a second format. The system 200 comprises a reader module 202, a MVs and modes mapping decision module 206, a conditional refinement decision module 208, a decoder unit 204, an operations block unit 210 and an encoder unit 212. The reader module 202 reads a set of one or more transcoding use cases, each transcoding use case characterized by a respective type of adaptation to be performed on the input image, a set of policies, each policy characterized by a quality level and a respective type of MV refinement to be used and a quality level for the output image. This is discussed in more detail in a later section of this document. The reader module 202 further comprises an input module 203 for reading a set of policies, each policy characterized by a quality level and a respective type of MV refinement to be used; and a quality level for the output image. The output of the reader module 202 is connected to the input of the MVs mapping and decision module 206 and the conditional refinement decision module 208. The MVs mapping and decision module 206 determines a number of stages of MVs mapping to be performed based on the set of one or more transcoding use cases processed by the system whereas the conditional refinement decision module 208 determines whether a conditional refinement of MVs is to be performed by using the quality level for the output image and the set of policies and further comprises computational means for using characteristics of the input image and the output image in addition to the metadata 225 for determining whether the conditional refinement is to be performed. Please note that the metadata is extracted by the decoder module and is discussed in more detail later in this paragraph. The outputs of the MVs and modes mapping decision module 206 and the conditional refinement decision module 208 are connected to the input of the operations block unit 210. The decoder unit decodes the input image into a decoded input image, including decoding each input MB, comprising extracting metadata comprising an encoding block mode for said each input MB, indicating size of partitions within said each input MB, and respective motion vectors (MVs) associated with partitions within said each input MB. The output of the decoder unit 204 is processed by the operations block unit 210 that uses the metadata, generated by the decoder unit 204 and performs a block of operations, corresponding to the set of one or more transcoding use cases, on the decoded input image, including mapping MVs and mapping MB modes to generate an adapted input image. Each operation corresponds to a transcoding use case in the set of one or more transcoding use cases. The output of the operations block unit 210 is presented to the input of the encoder unit 212 that re-encodes the adapted input image to generate the output image in the second format. The MVs and modes mapping and decision module 206 in turn comprises a number of transcoding use cases determination module 214 determining a number of transcoding use cases in the set of one or more transcoding use cases and a MV mapping type determination module 216 determining whether a one-stage or a two-stage MVs mapping is to be performed. The following parameters can be used in MV mapping type determination: the number of transcoding cases, types of transcoding use cases, or both. In another embodiment presented in FIG. 2(a-1), the MVs and modes mapping and decision module 206 comprises computational means for determining whether a one-stage or a two-stage MVs mapping is to be performed 207 based on types of transcoding use cases. In yet another alternate embodiment the MVs and modes mapping and decision module 206 comprises computational means for determining a number of transcoding use cases 209 in the set of one or more transcoding use cases and a MV mapping selection module 211 determining whether a one-stage or a two-stage MVs mapping is to be performed based on the number and types of transcoding use cases (see FIG. 2(a-2). The MV mapping type determination module 216 in turn comprises computational means for choosing the one-stage MVs mapping 218 when the number of transcoding use cases is one, an adaptation type determination module 220 and a number of stages determination module 222. The adaptation type determination module 220 is responsible for determining types of adaptation to be performed on the input image for the set of one or more transcoding use cases, where the types of adaptation comprise a bit rate adaptation, a temporal resolution adaptation, a spatial resolution adaptation, a logo/watermark insertion and compression format adaptation. The number of stages determination module 222 determines whether the one-stage or the two-stage MVs mapping is to be performed. The number of stages determination module 222 in turn comprises computational means for choosing a two-stage MVs mapping 224 when the types of adaptation to be performed on the input image include the temporal resolution adaption.

As shown in FIG. 2(b) the operations block unit 210 comprises a temporal resolution adaptation module 252, performing temporal resolution adaptation of the input image, a spatial resolution adaptation module 254 performing spatial resolution adaptation of the input image, a logo/watermark insertion module 256 inserting a logo/watermark in the input image, a compression format adaptation module 257 performing a compression format adaptation of the input image and a bit rate adaptation module 258 performing bit rate adaptation of the input image, a MV generation module 260, a mapping module 262 and a conditional refinement module 264. In case multiple operations that include a temporal resolution adaptation are required, the temporal resolution adaptation is performed first followed by one or more of spatial resolution adaptation, logo/watermark insertion, compression format adaptation and bit rate adaptation. The spatial resolution adaptation unit 254 receives its input from the temporal resolution adaptation unit 252 and its output is connected to the input of the logo/watermark insertion module 256. The output of the logo/watermark insertion module 256 is connected to the input of the bit rate adaptation module 258. In case the set of transcoding use cases does not require the operations performed by a particular adaptation module, the module simply forwards its input to the next adaptation module in the chain. The operation blocks unit 210 further comprises a mapping module 262 mapping each input MB into a corresponding output MB, a MV generation module 260 generating a MV for each output MB, and a conditional refinement module 264 performing conditional refinement of the MV generated by the MV generation module 260 when the performing of the conditional refinement has been determined by the conditional refinement decision module 208. The MV generation module 260 communicates with both the mapping module 262 and the conditional refinement module 264. The conditional refinement module 264 in turn comprises computational means for increasing accuracy of the MV 272 using a predetermined set of conditions. In an alternate embodiment (shown in FIG. 2(*b*-1)), the conditional refinement module 264 comprises a refinement module 277 performing refinement of the best MV provided the best MV is the predicted MV and computational means for reusing the candidate MV 278 for the candidate block mode provided the best MV is a candidate MV different from the predicted MV for the candidate block mode selected by the block mode selection module 276 (discussed in the next paragraph).

The mapping module 262 further comprises a candidate block mode generation module 266, a selection module 268 and a MVs mapping module 270. The candidate block mode generation module 266 generates a set of candidate block modes for the output MB based on the set of one or more transcoding use cases, each candidate block mode having a respective set of candidate MVs whereas the selection module 268 is responsible for choosing a block mode from the set of candidate block modes that minimizes a cost-quality metric for the output MB, the cost-quality metric capturing a tradeoff between cost of encoding (in bits) and quality of the output image. As shown in FIG. 2(*b*-2), the selection module 268 further comprises an evaluation module 274, a best MV selection module 275 and a block mode selection module 276. The evaluation module 274 evaluates the cost-quality metric for the candidate MVs which typically include the predicted MV for each candidate block mode. Note that for every candidate block mode, we can have a single candidate MV or multiple candidate MVs and the predicted MV is typically included in the list of candidate MVs as is has good probability to be selected. The best MV selection module 275 selects the MV within candidate MVs producing a minimum value for the cost-quality metric, among all candidate block modes, as a best MV whereas the block mode selection module 276 selects the block mode corresponding to the best MV and producing a minimum value for the cost-quality metric among all candidate block modes. In other words, the combination of block mode and MVs, among candidate block modes, and candidate MVs, producing a minimum value for the cost-quality metric is selected in module 276 and 275 respectively.

The MVs mapping module 270 performs a one-stage or a two-stage MVs mapping based on results of operation performed by the MVs and mode mapping type determination module 206. The MVs mapping module 270 that is explained further in FIG. 2(*c*) in turn comprises a one-stage MVs mapping module 282 performing the one-stage MVs mapping and a two-stage MVs mapping module 284 performing the two-stage MVs mapping. The two-stage MVs mapping module 284 in turn comprises two components: a first stage MVs mapping module 286 performing a one-to-one mapping of block modes and the MVs in the first stage MVs mapping, generating a single candidate block mode having respective candidate MV, for the output MB and a second stage MVs mapping module 288 performing a one-to-many mapping of the block modes and the MVs in the second stage of MVs mapping, generating multiple candidate block modes each having a respective candidate MV, for the output MB. The embodiment of the invention can also handle a method that uses multiple candidate MBs for each candidate block mode and chooses the best candidate MV during the MVs mapping. By using such a method a higher accuracy is achieved at the cost of increased computational overhead.

As shown in FIG. 2(*d*), the temporal resolution adaptation module 252 further comprises a first up scaling module 290 up scaling the temporal resolution for the input image and a first down scaling module 292 down scaling the temporal resolution for the input image. FIG. 2(*e*) displays the components of the spatial resolution adaptation module 254 that include a second up scaling module 294 up scaling the spatial resolution for the input image and a second down scaling module 296 down scaling the spatial resolution for the input image. In an alternative embodiment the temporal resolution adaptation module 252 comprises only one of a first up scaling module and a first down scaling module. Similarly the spatial resolution adaptation module 254 comprises only one of a second up scaling module and a second down scaling module.

In an alternate embodiment the operations block unit 210 comprises two modules: a stage-1 mapping module 213 and a stage-2 mapping module 215 (shown in FIG. 2(*e*-1). The stage-1 mapping module 213 performs a first stage mapping, including one-to-one mapping of the MB modes and the MVs for a temporal resolution adaptation provided the set of one or more transcoding use cases comprises the temporal resolution adaptation. The stage-2 mapping module 215 performs a second stage mapping, including one-to-many mapping of the MB modes and the MVs for remaining transcoding use cases in the set of said one or more transcoding use cases.

The components of the decoder unit 204 are explained with the help of FIG. 2(*f*). Each box or circle in the figure is a module that is responsible for performing a specific operation. For avoiding cluttering of the diagram, the word "module" has been suppressed in the label for each box and circle in the figure. The input image is presented to the input of an entropy decoding module 302 the output of which is presented to the input of an IQ1 module 304 and the input of a metadata storage module 314. The output of the IQ1 module 304 is connected to the input of an IDCT1 module 306. The output of the IDCT1 module 306 is added with the output of an MC1 module 310 by using an adder1 module 308. The output of the adder1 module 308 is an adapted input image that is also stored in a frame store1 module 312 the output of which is connected to the input of the MC1 module 310. The output of the metadata storage module 314 and the output of the frame store1 module are presented to the input of the MC1 module 310. The operations performed by each of these modules are briefly discussed.

Entropy Decoding Module 302:

The input image is decoded using a Variable Length Decoding such as Huffman or arithmetic decoding.

IQ1 Module 304:

After the entropy decoding, in this module, coefficients are inverse quantized using the quantization parameter 1. The quantization parameter is used to control the target bit rate at the encoding stage and is sent in the bit-stream to be used in the IQ1 module.

IDCT1 Module 306:

The resulting coefficients from IQ1 are inverse transformed in this module by using Inverse Discrete Cosine Transform to form the reconstructed residual image that is an approximation of the difference between the original input image and a predicted image.

MC1 Module 310:

This module is responsible for performing motion compensation. Motion compensation allows reconstructing the predicted image using the last reconstructed image and the motion vectors.

Frame Store1 Module 312:

This module is used to store reconstructed input images.

Metadata Storage Module 314:

This module stores the metadata extracted by the entropy decoding module 302 for reuse during the transcoding use cases. The output of the metadata storage module is used for example by the operations block unit 210.

To transcode a video, the sequence of input images is completely decoded in the pixel domain and the necessary metadata are stored. This metadata includes:

Plane types (YUV, RGB, etc);
Frame types (I, P, B, etc) and slice types;
MB modes and sub-modes;
MVs—forward and/or backward MVs including the reference frame number;
Quantization parameters (QP);
Coded block patterns (CBP).

Adder1 Module 308:

This module is responsible for reconstructing the decoded image by adding the reconstructed residual image obtained from the IDCT1 module 306 and the predicted image obtained from the MC1 module 310. The encoder unit 212 comprises components that are explained with the help of FIG. 2(g). The adapted image from the operations block unit 210 is presented to the input of an adder2 module another input of which is also connected to the output of the MC2 module 368. The output of the adder module 352 is presented to the input of the DCT module 354 the output of which is connected to the input of the Q2 module 356. The output of the Q2 module 356 is connected to the input of the entropy coding module 358 and the input of the IQ2 module 360. The output of the IQ2 module 360 is connected to the input of the IDCT2 module 362 the output of which is connected to the input of an adder3 module 366. The other input of the adder3 module 366 is connected to the output of the MC2 module 368. The output of the adder3 module 366 is connected to the input of a frame store2 module 364 the output of which is connected to the input of the MC2 module 368. The output of the entropy coding module 358 is presented to the input of a rate control module 359 performing rate control for the sequence of output images. The output of the rate control module 359 is fed back to the input of the entropy coding module 356. The operations performed by each of these modules are briefly discussed.

Adder2 Module 352:

This module is responsible for creating the residual image by subtracting the predicted image obtained from module 368 from the adapted image obtained from block unit 210.

DCT Module 354:

This module performs a Discrete Cosine Transform (DCT) that is a mathematical process used to prepare a MB for a quantization process by isolating the high frequencies from low frequencies.

Q2 Module 356:

This module performs Quantization, a process used to reduce the amount of information especially in the high frequency coefficients after DCT and may use a different quantization parameter from the one used in the incoming sequence of images. The quantization parameter is used to control the target bit rate at the encoding stage. Low bit rate video is encoded using a large quantization parameter while high bit rate video is encoded using a small quantization parameter.

IQ2 Module 360:

After the processing performed by the Q2 module 356 the coefficients are inverse quantized using the quantization parameter 2.

IDCT2 Module 362:

This module inverse transforms the resulting coefficients from the IQ2 module 356 using Inverse Discrete Cosine Transform to form the reconstructed residual image.

Entropy Coding Module 358:

The final bit stream for the output image is encoded using a Variable Length Encoding.

Frame Store2 Module 364:

This module is used to store the reconstructed image after motion compensation (MC2) to be used as a reference for the next images to be encoded.

MC2 Module 368:

The operations of this module are similar to the ones performed by the MC1 module 310 used in the decoder unit 204.

Adder3 Module 366:

This module is responsible for reconstructing the decoded transcoded image by adding the reconstructed residual image obtained from the IDCT2 module 362 and the predicted image obtained from the MC2 module 368.

Rate Control Module 359:

This module performs rate control for the output image. This is performed by adjusting the Q2 parameter of the Q2 module 356.

All the components of the system 200 that include units 204, 210 and 212 and modules 202, 203, 206, 208, 211, 213, 214, 215, 220, 222, 252, 254, 256, 257, 258, 260, 262, 264, 266, 268, 270, 274, 275, 276, 277, 282, 284, 286, 288, 290, 292, 294, 296, 302, 304, 306, 308, 310, 312, 314, 352, 354, 356, 358, 359, 360, 362, 364, 366 and 368 include a firmware or, alternatively, computer readable instructions stored in a computer readable storage medium for execution by a processor. All the computational means including 207, 209, 218, 224, 225, 272 and 278 comprise computer readable code performing methods, procedures, functions or subroutines which are stored in a computer readable storage medium to be executed by a CPU.

Diagram 400 displayed in FIG. 3 illustrates the flow of operations of the system of the embodiment of the invention presented in FIG. 2(*a*). One can perform a single transcoding use case or a set of multiple transcoding use cases. In the first case, only the block required for the desired use case is invoked. In the second case, depending on the combination of transcoding use cases, each block may or may not be invoked. Operations represented by boxes using thicker lines and dotted lines characterize the operations that distinguish the present invention from prior art. The boxes using dotted lines correspond to the operations performed during coding parameters mapping and MV refinement.

Box 402 displays full decoding of the input sequence of images characterized by a given BR1, SR1, TR1, and CF1 performed in the pixel domain. The MB modes and MVs are stored. The frames, MB modes, and MVs resulting from this decoding operation are processed in box 404 during decisions management that decides on the number of stages of MVs mapping to be performed for generating the sequence of output images as well as whether or not conditional refinement needs to be performed. Temporal resolution adaptation shown in box 406 is performed next and the frame rate for the sequence of output images is mapped to a desired frame rate if temporal resolution is required in handling the set of one or more use cases. MVs mapping displayed in box 408 is for each MB in the input image. If required by a transcoding use case the MBs adapted to the desired temporal resolution are then subjected to spatial resolution adaptation (box 410) during which the MB modes are estimated for the new spatial resolution. The frame is down scaled or up scaled to the new resolution. The MVs and MB modes produced in box 406 are processed for compression format adaptation and candidate modes identification in box 414 during which the MVs are mapped in a single step for a single or a combination of operations. Thus, MVs and modes mapping are performed one shot in box 414 for all transcoding use cases in the set of one or more transcoding use cases except the temporal resolution adaptation use case. Refinement of MVs is performed when required during the conditional refinement operation captured in box 416. During conditional refinement, selected MVs received from box 414 are processed using a small window and the refined MVs are returned. Next, logo insertion (box 412) is performed if required by a transcoding use case and the given logo is inserted in the desired area. Box 412 displays the operations for producing frames and MBs where only the MB-logo are changed. The frames, candidate MBs and MVs obtained after logo insertion are then subjected to re-encoding and rate control performed during the operations represented by box 418. During this operation MB modes are re-estimated and a new residue is calculated. The residue is the difference between the original MB (the MB being currently processed) and the reference MB (predicted) found via the MV mapping process. The bit rate is also controlled to meet the output requirements captured in the second format. At the end of re-encoding and rate control the output compressed video containing the sequence of output images characterized by a given BR2, SR2, TR2 and CF2 is obtained.

Handling MVs and mode mapping for multiple transcoding use cases and multiple video standards in a single system is a hard problem that is effectively addressed by this invention. The ability of the system of the embodiments of the invention to handle various transcoding use cases is based on the one hand on the fact that it was designed from the beginning to support an unknown combination of transcoding use cases. All prior art architectures were designed around a specific and predefined transcoding use case or combination of transcoding use cases, which means that the MVs and modes mapping is pretty simple and fixed. On the second hand it is based on the exploitation of the same approach used in each transcoding use case: decoding, video adaptation and re-encoding and the same set of transcoding operations that include quantization, transform, entropy engine, MC/ME are performed. Thus, the system of the embodiments of the invention leads to a more efficient transcoding system development and maintenance along with improved extensibility. More specifically, the novel architecture used in the system of the embodiments of the invention achieves:

1. Supporting a single transcoding use case or a set of transcoding use cases in an efficient way while providing the best quality for the output image (ideally the same as the input). This is done by exploiting the metadata extracted from the decoder and reusing it for producing the output image. The system performs an intelligent reuse of the stored metadata to reduce the computational complexity by skipping the ME and utilizing a predetermined set of conditions to refine the final MVs.
2. Reducing the effort required for software development and maintenance by encapsulating several use cases in the same transcoder and improving software components reuse.
3. Being extensible by allowing easy addition of new transcoding operations and their combinations.

The architecture of the embodiment of the invention meets these objectives by utilizing the pixel domain that allows: 1) the avoidance of drift error and provides maximum flexibility of the re-encoder; 2) supporting all the codecs especially H.264 which cannot perform the deblocking filter in the DOT-domain and 3) integration of additional use cases that may be incorporated in the future.

Figure 1A:
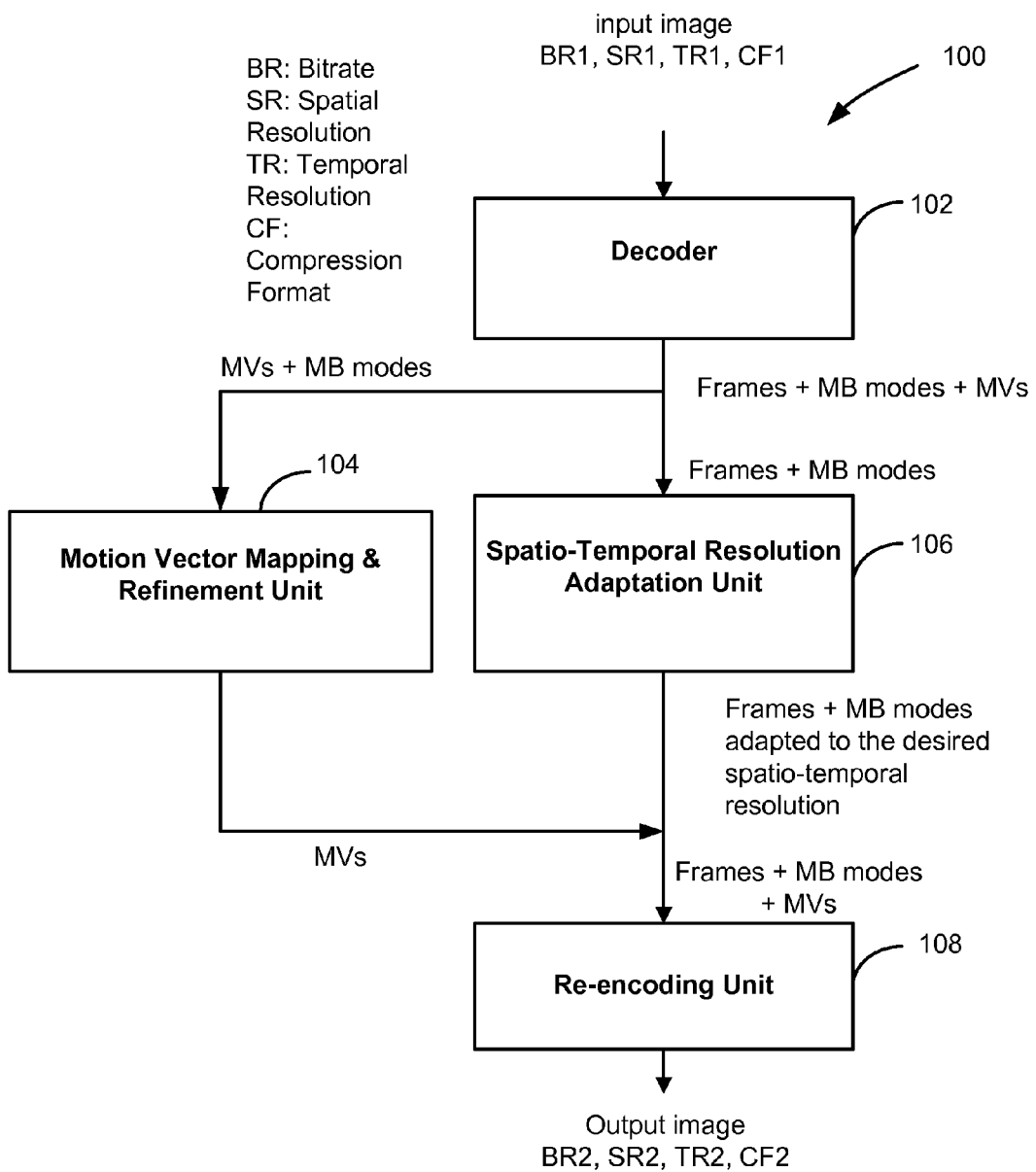
FIG. 1(a) presents a prior art system 100.
Figure 1B:
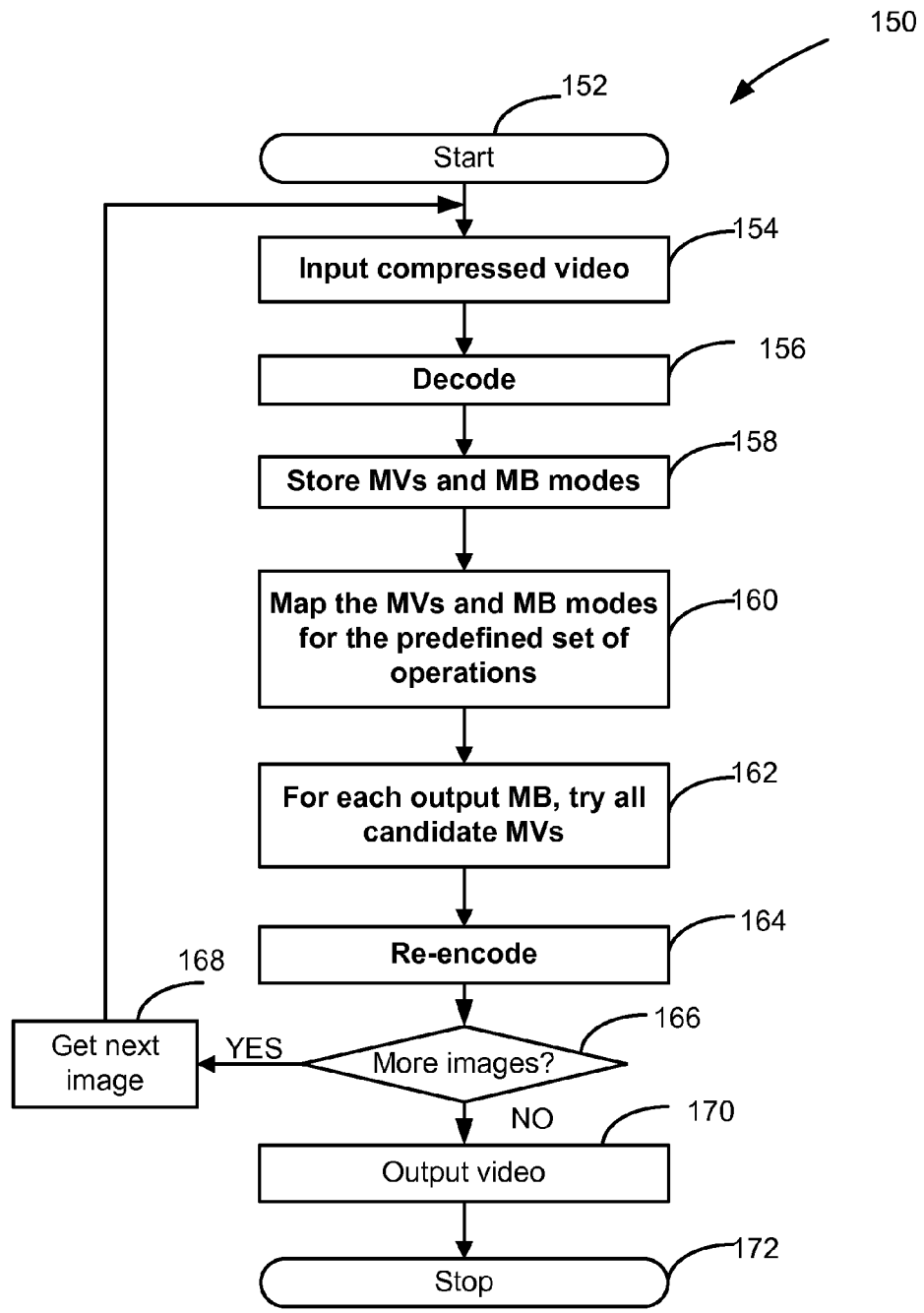
FIG. 1(b) presents a flowchart showing the steps of the method used in the system 100.

Prior art methods such as the one captured in diagram 100 presented in FIG. 1(*a*) do not provide any flexibility. A predefined combination of transcoding use cases is only realized. Moreover, the MVs mapping is not flexible. One cannot realize a stand-alone use case such as format adaptation—only the predefined set of operations is performed (due to the complexity to build the MVs and modes mapping in a flexible way for various unknown sets of operations).

The method of the embodiment of the invention that mitigates the shortcomings of the prior art is explained with the help of flowchart 450 displayed in FIG. 4(*a*). Upon start (box 452), procedure 450 performs input operations (box 453). It reads a number of parameters and inputs the compressed video containing the sequence of input images. The parameters read include a set of one or more transcoding use cases, each transcoding use case characterized by a respective type of adaptation to be performed on the input image, a set of policies, each policy characterized by a quality level and a respective type of MV refinement to be used and a quality level that is desirable for the output image. Decoding of input images in the sequence of input images is performed in the next step (box 454) producing a decoded input image for each input image. The decoding of each input image includes decoding each input MB in the input image, comprising extracting metadata comprising an encoding block mode for each input MB, indicating size of partitions within each input MB, and respective motion vectors (MVs) associated with partitions within each input MB. The metadata resulting from the decoding is stored (box 456). The procedure 450 then checks whether a one stage or a two stage MVs mapping is required (box 458) and makes a decision whether or not a conditional refinement is to be performed (box 460). The decision for performing conditional mapping is based on the set of policies and the quality level that are read in box 453. A policy includes two components, a quality level for the output image and a boolean variable. It relates the quality level with the boolean variable that indicates whether or not a conditional refinement is to be performed for achieving the specified quality level. If the quality level that is read in box 453 matches the quality level of one of the policies, the corresponding boolean variable in the matched policy is used to decide whether or not a conditional refinement is to be performed. In an alternate embodiment a cost of encoding is also included in the policy and a cost estimate is read along with the quality level in box 453. The selection of the policy is now based on both the quality level and cost estimate specified. The boolean variable of the selected policy is used to decide whether or not conditional refinement is to be performed. Refinement is a computationally expensive operation and refining MVs conditionally leads to a significant reduction in transcoding delay. After box 460 the procedure uses the metadata to perform a block of operations, corresponding to the set of one or more transcoding use cases, on the decoded input image, including mapping MVs and mapping MB modes to generate an adapted input image, each operation corresponding to a transcoding use case in the set of one or more transcoding use cases. In box 462 the procedure 450 performs the mapping of the MVs and the MB modes for the required set of one or more transcoding use cases. For each output MB, various possible MVs are checked stopping when the cost-quality metric is below predefined thresholds (box 464). Every MB mode is checked in a specific order (skip and then from larger to smaller partitions), and the checking is stopped when the cost-quality metric for a given MB mode is below a predefined threshold. In the next step, the procedure 450 handles refinement of MVs (box 468) that is explained later with the help of FIG. 4(*c*). After handling MV refinement the procedure performs re-encoding of the adapted image to generate the output image (box 470). In the next step the procedure 450 checks whether more images need to be processed (box 472). If so, the procedure gets the next image (box 476) and loops back to the input of box 454. Otherwise the procedure exits 'NO' from box 472, produces the output compressed video containing the sequence of output images image (box 474) and exits (box 478). Please note that the steps 462, 464 and 468 are responsible for performing a block of operations, corresponding to the set of one or more transcoding use cases, on the decoded input image, including mapping MVs and mapping MB modes to generate an adapted input image, each operation corresponding to a transcoding use case in the set of one or more transcoding use cases. This block of operations also includes a temporal resolution adaptation of the input image, a spatial resolution adaptation of the input image, a bit rate adaptation of the input image and insertion of a logo/watermark in the input image.

The operations performed in box 458 are explained further with the help of flowchart 500 presented in FIG. 4(*b*). Upon start (box 502), procedure 500 reads the desired features for the sequence of output images that include the type of adaptations (related to the type of transcoding use cases to be handled) that need to be performed on the sequence of input images. In the next step the procedure 500 checks whether or not operations for only one use case are to be performed (box 506). If so, the procedure 500 exits 'YES' from box 506, decides on performing a one-stage mapping for the given use case and exits (box 516). Otherwise, the procedure 500 exits 'NO' from box 506 and checks whether the combination of transcoding use cases in the set of one or more use cases includes a temporal resolution adaptation (box 510). If so, the procedure exits 'YES' from box 510 and decides on performing a two-stage mapping for the given combination of transcoding use cases (box 512) and exits (box 516). Otherwise, the procedure 500 exits 'NO' from box 510, decides on performing a one-stage mapping for the given combination of transcoding use cases (514) and exits (516). Please note that this procedure only makes a decision on whether a one-stage or two-stage mapping is to be performed whereas the actual mapping operations are carried out in box 462.

The operations performed in box 468 are explained with the help of FIG. 4(*c*). Upon start (box 532), the procedure 530 checks whether or not conditional refinement is to be performed (box 533). This is based on the decision made in box 460 by using the policies and the quality level required in the given set of one or more transcoding use cases. If conditional refinement is not needed the procedure 530 exits 'NO' from box 533, performs an unconditional refinement of the decoded input image (box 534) and exits (box 542). Otherwise, the procedure exits 'YES' from box 533, performs conditional refinement of the input image (box 536) and checks whether additional refinement is warranted (box 538). This decision may be based on a number of factors including the first and second format. If additional refinement is not required the procedure 530 exits 'NO' from box 538 and exits (box 542). Otherwise, the procedure 530 exits 'YES' from box 538, performs additional refinement (box 540) and exits (box 542). Conditional refinement comprises increasing accuracy of the MV using a predetermined set of conditions that includes a condition that the candidate MV for the candidate block mode chosen is same as a predicted motion vector. The predicted MV is calculated using the adjacent MBs because their MVs are often highly correlated and is used to decrease the complexity of the ME process by minimizing the number of search positions. The specific computation of the predicted MV may differ from one compression standard to another. Further details of conditional refinement are discussed in more detail in a later section of this document.

The following paragraphs use examples to explain the techniques used in the embodiments of the invention for realizing the two possible scenarios of video transcoding: single transcoding use case and a set of transcoding use cases. For the single use case an example of bit rate adaptation using one of the most complex video standards, H.264, and an example of spatial resolution adaptation also using H.264 are presented. For explaining how a set of multiple transcoding use cases is handled, an example of compression format adaptation with bit rate adaptation and an example of compression format adaptation with spatial resolution adaptation and bit rate adaptation are presented. The compression format is adapted from H.264 Baseline profile (BP) to MPEG-4 Visual Simple Profile (VSP). The methods are implemented using Intel Integrated Performance Primitives Code Samples version 5.3 that are discussed in Intel Integrated Performance Primitives 5.3—Code Samples, available online at http://software.intel.com/en-us/articles/intel-integrated-performanceprimitives-code-samples/. The proposed method and system can be applied easily for other combination of operations.

Bit Rate Adaptation

In all standards, the bit rate reduction relies on the MVs and mode mapping for conversion of the input image to the output image. The standard H.264/AVC has become the leading standard for different multimedia applications like video streaming, broadcasting, DVD and Blu-ray. Moreover, its predecessors are considered as subsets of this standard and thus any technique developed for H.264 could be adapted easily to any standard. For these reasons, the implementation discussed concerns bit rate adaptation in H.264 and the described method can be adapted to VC-1, MPEG-4, etc. A series of experimentation have been performed by the inventors to determine the most probable mode(s) for each input mode.

Compared to the state-of-the-art methods one of the methods of the embodiments of the invention, named candidates mapping, does not test 8×8 sub-partitions (inter8×4, inter4×8 and inter4×4) because their use is computationally high without considerable quality gain at lower bit rates. In addition, due to the use of Intel IPP which employs predefined thresholds for mode selection, not all output modes are checked (Rate Distortion Optimization (RDO) is not used). Moreover, in an alternate embodiment a second method called candidates mapping with conditional refinement that further exploits the input sub-pixel precision is used. In video, the images forming the video are called frames. Various types of frames are used in a video. The candidates mapping method for intra and inter frames is described by using Table I.

For intra input frames, if the input MB was coded as intra16×16 (I16×16), the output MB is coded also as I16×16. If the input MB was coded as intra4×4 (I4×4), both I16×16 and I4×4 are checked. Checking in this discussion refers to the comparison of a cost-quality metric for each of the candidate block modes. The candidate block mode producing the best value of the cost-performance metric is selected at the end of this checking operation. This metric is a function of both cost (number of bits used in encoding) and quality (as captured in rate distortion for example) of the output image and reflects the optimization of image quality that is traded off against cost. The cost-quality metric is computed as follows.

$$J_m = D + \lambda_m R$$

where, D is the distortion, $\lambda_m$ the coding mode Lagrangian multiplier, and R the bits needed to send the coding mode information. Typically, the Lagrangian multiplier is set to $$0.85 \times 2^{\frac{QP-12}{3}}$$

The candidate block mode that minimizes the cost-performance metric is chosen as the block mode for the output image. The candidates mapping method used by box 462 for intra input frames is explained with the help of flowchart 580 displayed in FIG. 5(*a*). Upon start (box 582), procedure 580 tests (box 584) whether on not the block mode of the input MB is I16×16. If so, the procedure exits 'YES' from box 584 and codes the output MB as I16=×16. (box 586). Otherwise the procedure 580 exits 'NO' from box 584 and tests whether the block mode of the input MB is I4×4 (box 588). If so, the procedure exits 'YES' from box 588 and checks the I16×16 and the I4×4 block modes (box 590). Otherwise the procedure 580 exits 'NO' from box 588 and exits (box 592).

The operation of the candidates mapping method for inter input frames is explained with the help of Table 1 presented in FIG. 5(*b*) that captures the mapping between block mode of an input MB mode and that of an output MB. Each of the steps such as 1a and 1b described refers to a particular row such as a and b in Table 1.

1a. If the input MB was coded as skip, checking is performed for the skip block mode and inter16×16 (P16× 16). The latter is checked using the skipped MV (the skipped MV is zero for standards such as MPEG-4 and is the predicted MV for H.264). The skip block mode is tested always for this bit rate adaptation method using the predicted MV. The predicted MV is calculated using the median of the MVs of the neighboring MBs or blocks, on the left, top and top-right.

1b. If the input MB was coded as P16×16, checking is performed for P16×16 using the input MV and skip.

1c. If the input MB was coded as inter16×8 (P16×8), checking is performed for P16×8, P16×16 and skip. The P16×16 MV is obtained as the mean of the two P16×8 MVs.

1d. If the input MB was coded as inter8×16 (P8×16), checking is performed for P8×16, P16×16 and skip. The P16×16 MV is obtained as the mean of the two P8×16 MVs.

1e. If the input MB was coded as inter8×8 (P8×8), checking is performed for P8×8, P16×8, P8×16, P16×16 and skip. First, all 8×8 sub-partitions (8×4, 4×8 or 4×4), if any, are combined to form an 8×8 block using the mean of the 8×8 sub-partitions (i.e. the resulting partition's MV is obtained by averaging the sub-partitions' MVs) The P16×16 MV is obtained as the mean of the four P8×8 MVs. The P16×8 and P8×16 MVs are obtained using the mean of the corresponding 8×8 blocks –{0,1},{2,3} for P16×8 and {0,2},{1,3} for P8×16. Please note that 8×8 sub-partitions are not used because the H.264 encoder uses less subdivided partitions at lower bit rates and their use increases computational complexity without significant quality benefits. But this invention could be extended to take them into account if quality is of prime importance.

1f. If the input MB was coded as I4×4, checking is performed for the skip block mode and P16×16 using the (0,0) MV (and optionally the predicted MV as well). I16×16 is included in the checking only if the best SAD of tested inter block modes is above a certain threshold predefined by the codec Intel IPP. Again, I4×4 is included in the checking only if I16×16 SAD is above a predefined threshold.

1g. If the input MB was coded as I16×16, checking is performed for skip and P16×16 using the (0,0) MV (and optionally a predicted MV as well). I16×16 is included in the checking only if the best Sum of Absolute Difference (SAD) of tested inter block modes (skip and P16× 16) is above a certain threshold predefined by the Intel IPP codec.

Please note that in 1f) and 1g), re-encoding the intra MBs directly as intra MBs led to degraded quality.

The logical flow for the steps of the procedure for candidates mapping for inter input frames executed during the processing of box 462 in flowchart 450 are explained with the help of flowchart 600 presented in FIG. 5(*c*). For sake of clarity, only the various checks that influence the logical flow are described. The details of all the operations performed in boxes 606, 609, 611, 614, 618, 622 and 626 were described earlier in steps 1a, 1b, 1c, 1d, 1e, 1f and 1g respectively. Please note that procedure 600 is used for inter input frames. Upon start (box 602), procedure 600 tests (box 604) whether or not the mode of the input MB is skip. If so, the procedure exits 'YES' from box 604 and checks the skip and the P16×16 block modes (box 606). Otherwise the procedure 600 exits 'NO' from box 604 and tests whether the block mode of the input MB is P16×16 (box 608). If so, the procedure exits 'YES' from box 608 and checks the skip and the P16×16 block modes (box 609). Otherwise the procedure 600 exits 'NO' from box 608 and tests whether the block mode of the input MB is P16×8 (box 610). If so, it exits 'YES' from box 610 and checks the skip, the P16×16 and the P16×8 block modes (box 612). Otherwise, the procedure 600 exits 'NO' from box 610 and tests whether the block mode of the input MB is P8×16 (box 613). If so, the procedure exits 'YES' from box 613 and checks the skip, the P16×16 and the P8×16 block modes (box 614). Otherwise the procedure 600 exits 'NO' from box 613 and tests whether the block mode of the input MB is P8×8 (box 616). If so, the procedure exits 'YES' from box 616 and checks the skip, the P16×16, the P16×8, P8×16 and the P8×8 block modes (box 618). Otherwise the procedure 600 exits 'NO' from box 616 and tests whether the block mode of the input MB is I4×4 (box 620). If so, the procedure exits 'YES' from box 620 and checks the skip, the P16×16, the I16×16 and the 14×4 block modes (box 622). Otherwise the procedure 600 exits 'NO' from box 620 and tests whether the block mode of the input MB is I16×16 (box 624). If so, the procedure exits 'YES' from box 624 and checks the skip, the P16×16 and the I16×16 block modes (box 626). Otherwise the procedure 600 exits 'NO' from box 624 and exits (box 628).

Please note that for sub-pixel refinement, two techniques are employed. In the first one used with candidates mapping, a ±1 search window (at the highest pixel precision allowed by the output compression format, which is quarter-pel precision in the case of H.264) is tested for the final MVs in 1a), 1b), 1c), 1d) and 1e) of Table 1. For the second one used with candidates mapping with conditional refinement (the operation captured in box 536 of flowchart 530), if the best MV (at integer pixel) is selected from the candidates MVs, then this candidate MV is reused (at the highest pixel precision allowed by the output compression format). That is, the same quarter pixel precision as used with the input MV is reused in the case of H.264 bitrate adaptation. However, when the chosen MV (best MV at integer pel) equals the predicted MV, then the chosen MV is refined using a ±1 window (at the highest pixel precision allowed by the output compression format, which is quarter-pel precision for H.264). The precision used is therefore dependent on the output compression format. This conditional refinement produces a remarkable increase in the speed-up of the proposed transcoder while maintaining the same quality as the candidates mapping. A search window larger than ±1 can be used to increase the quality at the cost of higher computational complexity.

Spatial Resolution Adaptation

The spatial resolution adaptation transcoding use case is discussed next. Diagram 640 displayed in FIG. 6(*a*) illustrates the spatial resolution reduction problem when downsizing by an integer factor of 2. As shown in this figure, the output MB mode and its associated MVs are obtained from the four corresponding input MBs. The procedure used by the embodiments of the invention is implemented using H.264 and can be adapted easily to VC-1, MPEG-4, etc, as they are considered a subset of H.264. The filter utilized for pixels sub-sampling is an integrated filter in Intel IPP.

Compared to the state-of-the-art algorithms the candidates mapping method deployed in the embodiments of the present invention uses a direct mapping when the input four MBs are either four skip or four P16×16 and does not check 8×8 sub-partitions because they lead to higher complexity without significant quality benefits. Furthermore, not all output block modes are checked (RDO is not used) due to the use of Intel IPP Code Sample which employs predefined thresholds for block mode selection. Moreover, two additional methods called candidates mapping with conditional refinement and candidates mapping with no refinement that further exploit the input sub-pixel precision are used in the two further embodiments of the invention. The mapping of the block modes for the candidates mapping method used for spatial resolution adaption is shown in Table 2 that is based on the statistics of several sequences and is described next.

For intra frames in the input image, both I16×16 and I4×4 are checked.

The procedure used for inter frames in the input image is explained with the help of Table 2 presented in FIG. 6(*b*). Each of the steps such as 2a and 2b refers to a particular row such as a and b in Table 2.

2a. If the all the input MBs were coded as skip, checking is performed for skip and inter16×16. The skip block mode is checked using the predicted MV and the P16×16 block mode using the mean of the four skipped MVs (again either the zero MVs or the predicted MVs associated with each skipped MB depending on the compression standard).

2b. If all the pre-encoded MBs were coded as P16×16, checking is performed for skip and P16×16 using the mean of the four MVs.

2c. If all the input MBs were coded as inter but not four skip or four P16×16, checking is performed for all block modes: P16×16, skip, P16×8, P8×16 and P8×8. First, each 8×8 sub-partition is transformed to an 8×8 block. That is, 8×4, 4×8 and 4×4 sub-partitions are merged to an 8×8 block via MV averaging of sub-partitions. Then, each MB: MB1, MB2, MB3 and MB4 is changed to P16×16. This is done by merging two P16×8 or P8×16 using MV averaging or four P8×8 using MV averaging;

or taking the skipped MV (if the MB was skip) or the P16×16. Thus, the output MVs are generated as follows:

For the P16×16, the final MV is generated as the mean of the resulted 16×16 MVs. Also, the four MVs are checked. This can result in a better image quality but the operation is higher in computational complexity. For the skip block mode, the predicted MV is checked.

For the P16×8 block mode, the average of MB1 and MB2 is used to generate the final MV for the top block and the average of MB3 and MB4 to generate the final MV for the bottom block. The two corresponding MVs for each part can be checked but this solution is higher in computational complexity.

For the P8×16 block mode, the left block MV is generated using the MB1 and MB3. For the right MV, the MB2 and the MB4 are used. The two corresponding MVs for each part can be checked but this solution is higher in computational complexity.

For the P8×8 block mode, each 8×8 MV is chosen from the corresponding MB. For example, for top-left 8×8 block, the MV of the MB1 is checked. Sub-partition blocks are not used because for lower bit rate the encoder rarely uses smaller partitions (i.e. 8×4, 4×8 and 4×4 partitions).

2d. If at least one MB was coded using I16×16 (nb_mb_intra16×16>=1) or I4×4 (nb_mb_intra4×4>=1) checking is performed for P16×16, skip, P8×8, I16×16 and I4×4. Please note that nb_mb refers to the number of MBs and the suffix e.g. intra 16×16 refers to the type of MBs. First, 8×8 sub-partitions are changed to an 8×8 block. After that, all MBs are transformed to inter16×16 MBs. I16×16 and I4×4 MBs are mapped using the (0,0) MV. P16×8 and P8×16 are altered using the average of the two MVs and the skip block mode is transformed using the skipped MV.

For P16×16, the final MV is generated via the mean of the resulted 16×16 MVs.

For the skip block mode, the predicted MV is tested.

For P16×8 or inter8×16, the final MVs for each partition, partition 0 and partition 1, are generated using the corresponding MBs.

For P8×8, each 8×8 MV is chosen from the corresponding MB.

For I16×16 and I4×4, no mapping is used as these MB modes don't need any MV. Instead, they are predicted using adjacent blocks/MBs.

Please note that all final MVs in 2a), 2b), 2c) and 2d) are downsized by half (divided by 2).

The logical flow for the steps of the procedure for candidates mapping executed during the processing of box 462 in flowchart 450 for the spatial resolution adaptation are explained with the help of flowchart 650 presented in FIG. 6(*c*). For sake of clarity, only the various checks that influence the logical flow are described. The details of all the operations performed in boxes 656, 660, 664, and 668 were described earlier in steps 2a, 2b, 2c and 2d respectively. Please note that procedure 650 is used for inter input frames. Upon start (box 652), procedure 650 tests (box 654) whether or not the block mode of the input MB is 4 skip. If so, the procedure exits 'YES' from box 654 and checks the skip and the P16×16 block modes (box 656). Otherwise the procedure 650 exits 'NO' from box 654 and tests whether the block mode of the input MB is 4 P16×16 (box 658). If so, the procedure exits 'YES' from box 658 and checks the skip and the P16×16 block modes (box 660). Otherwise the procedure 650 exits 'NO' from box 658 and tests whether the block mode of the input MB is 4 Inter (box 662). If so, the procedure exits 'YES' from box 662 and checks the skip, the P16×16, P16×8, the P8×16 and the P8×8 block modes (box 664). Otherwise the procedure 650 exits 'NO' from box 662 and tests whether Nb_mb_intra4×4>=1 (i.e. there is at least one MB coded as Intra 4×4) or Nb_mb_intra16×16>=1 (i.e. there is at least one MB coded as Intra 16×16) (box 666). If so, the procedure exits 'YES' from box 666 and checks the skip, the P16×16, the I16×16, and the I4×4 block modes (box 668). Otherwise the procedure 650 exits 'NO' from box 666 and exits (box 670).

For spatial resolution adaptation, three techniques are employed for the subpel refinement. In the first technique used with candidates mapping, a ±1 search window (at the highest pixel precision allowed by the output compression format, which is quarter-pel precision in the case of H.264) is tested for the final MVs in 2a), 2b), 2c) and 2d). For the second technique used with the candidates mapping with conditional refinement (the operation captured in box 468 of flowchart 450), if the best MV (at integer pixel) is selected from the candidates MVs, this candidate MV is reused (at the highest pixel precision allowed by the output compression format, which is quarter-pel precision in the case of H.264). However, when the chosen MV (best MV at integer pel) equals the predicted MV, then the chosen MV is refined using a ±1 window (at the highest pixel precision allowed by the output compression format, e.g. at quarter-pel precision for H.264). For the third technique, used with the candidates mapping with no refinement, the best MV (at the highest pixel precision allowed by the output compression format) is selected from the candidate MVs (evaluated at integer precision and not comprising the predicted MV). In an alternate embodiment, the method adds the predicted MV to the list of candidates (at the highest pixel precision allowed by the output compression format). As before, the precision used is dependent on the output compression format. A search window larger than ±1 can be used to increase the quality at the cost of higher computational complexity.

The candidates mapping, the candidates mapping with conditional refinement and the candidates mapping with no refinement procedures not only can be used for a single spatial resolution reduction but also in the spatial resolution reduction combined with bit rate reduction. Experimental results for such a case are presented in a later part of this document.

Compression Format Adaptation and Compression Format Adaptation with Bit Rate Adaptation A combination of two transcoding use cases one with compression format adaptation and the other with bit rate adaptation is discussed next. The embodiments of the invention use a novel technique for adaptation of format from H.264 BP to MPEG-4 VSP. MPEG-4 VSP has a limited number of features compared to H.264. For inter MBs, only 16×16 and 8×8 partitions are supported with limited skip block mode to the zero MV (MV with coordinates (0,0)). For intra MBs, only intra16×16 is supported. In addition, MPEG-4 adopts a half pixel MV precision. So, first, the input quarter-pel MVs to be converted to half-pel MVs.

Compared to the state of the art algorithms, the method used in the embodiments, candidates mapping, does not use RDO (not all output block modes are checked) due to the use of Intel IPP which employs predefined thresholds for block mode selection. Moreover, a second procedure called candidates mapping with conditional refinement that further exploits the input half-pixel precision is also available. The candidates mapping algorithm for compression format adaptation is described next.

For I frames, I16×16 and I4×4 are mapped to the intra block mode.

For P frames, MVs and block modes mapping are performed in accordance with the block mode mappings captured in Table 3 presented in FIG. 7(*a*). Each of the steps such as 3a and 3b refers to a particular row such as a and b in Table 3.

3a. If the input MB was coded using skip then it is converted to P16×16. Then checking is performed for skip using the zero MV and P16×16 using the zero MV and the predicted MV.

3b. If the input MB was coded using P16×16, checking is performed for skip and P16×16 using the input MV and the predicted MV.

3c. If the input MB was coded using P16×8 and P8×16 it is converted to P16×16 by merging the two input MVs using the average of the two P16×8 MVs or P8×16 MVs. The procedure checks the resulting MB using the P16×16 MV computed by the averaging, the predicted MV and the skip block mode.

3d. If the input MB was coded using P8×8, first the subpartition parts are converted to 8×8 blocks. Then, checking is performed for P16×16, skip and P8×8. For P16×16, the four 8×8 MVs are converted to a 16×16 MV using the mean. Also, the predicted MV is tested. For the skip block mode, the zero MV is utilized. For P8×8, each input 8×8 MV is used as a candidate for the corresponding block in the output MB.

3e. If the input MB was coded using I16×16 or I4×4, checking is performed for skip, P16×16 and Intra. The zero MV is utilized for the skip block mode. For P16×16, the zero and predicted MV are tested. After that, the intra block mode is checked.

Please note that for the half-pel refinement, two techniques are employed. In the first one used with candidates mapping, a ±1 search window (at the highest pixel precision allowed by the output compression format, which is, half-pel precision in the case of MPEG-4) is tested for the final MVs in 3a), 3b), 3c) and 3d) of Table 3. For the second one used with candidates mapping with conditional refinement (the operation captured in box 536 of flowchart 530), the procedure reuses the half pixel precision of the input MVs (after alteration from quarter to half-pel) except for the case in which the chosen MV equals the predicted MV. In this case, the half pixel MV is refined using ±1 window. A search window larger than ±1 can be used to increase the quality at the cost of higher computational complexity.

The candidates mapping and the candidates mapping with conditional refinement methods can be used for compression format adaptation from H.264 to MPEG-4, for example, while maintaining the initial bit rate or with bit rate reduction.

The logical flow for the steps of the procedure for candidates mapping executed during the processing of box 462 in flowchart 450 for handling P frames during format adaption are explained with the help of flowchart 700 presented in FIG. 7(*b*). For sake of clarity, only the various checks that influence the logical flow are described. The details of all the operations performed in boxes 706, 710, 714, 718 and 722 were described earlier in steps 3a, 3b, 3c, 3d and 3e respectively. Upon start (box 702), procedure 700 tests (box 704) whether or not the block mode of the input MB is skip. If so, the procedure exits 'YES' from box 704 and checks the skip and the P16×16 block modes (box 706). Otherwise the procedure 700 exits 'NO' from box 704 and tests whether the block mode of the input MB is P16×16 (box 708). If so, the procedure exits 'YES' from box 708 and checks the skip and the P16×16 block modes (box 710). Otherwise the procedure 700 exits 'NO' from box 708 and tests whether the block mode of the input MB is P16×8 or P8×16 (box 712). If so, the procedure exits 'YES' from box 712 and checks the skip, the P16×16, and the P8×16 block modes (box 714). Otherwise the procedure 700 exits 'NO' from box 712 and tests whether the block mode of the input MB is P8×8 (box 716). If so, the procedure exits 'YES' from box 716 and checks the skip, the P16×16, and the P8×8 block modes (box 718). Otherwise the procedure 700 exits 'NO' from box 716 and checks whether the block mode of the input MB is I4×4 or I16×16 (box 720). If so, the procedure exits 'YES' from box 720 and checks the skip, the P16×16, the I16×16 and the I4×4 block modes (box 722). Otherwise the procedure 700 exits (box 724).

Note that the desired output bit rate will affect rate-distortion cost function to optimize and will therefore affect the selected MB modes and MVs. For instance, smaller bit rates will tend to favour larger MB modes partitions.

It should be noted that for the half-pel refinement, once again two techniques are employed. In the first one, candidates mapping, a ±1 search window (at the highest pixel precision allowed by the output compression format, which is, which half-pel precision in the case of MPEG-4) is used in the testing for the final MVs in a), b), c) and d) of Table 3. For the second one, candidates mapping with conditional refinement, if the best MV (at integer pixel) is selected from the candidates MVs, this candidate MV is reused (at the highest pixel precision allowed by the output compression format, which is half-pel precision in the case of MPEG-4). However, when the chosen MV (best MV at integer pel) equals the predicted MV, then the chosen MV is refined using a ±1 window (at the highest pixel precision allowed by the output compression format, which is, half-pel precision in the case of MPEG-4). As before, the precision used is dependent on the output compression format. A search window larger than ±1 can be used to increase the quality at the cost of higher computational complexity.

The candidates mapping and the candidates mapping with conditional refinement methods can be used for format adaptation form an input compression standard of H.264 to an output compression standard of MPEG-4 while maintaining the initial bit rate or with bit rate reduction.

Compression Format Adaptation with Spatial Resolution and Bit Rate Adaptation

Performing the combination of transcoding use cases compression format adaptation with spatial resolution adaptation is discussed next. A candidates mapping used in this combination of transcoding use cases is described. Compared to the state-of-the-art algorithms, the candidates mapping method used in the embodiments of the present invention, does not use RDO (not all output block modes are checked) due to the use of Intel IPP which employs predefined thresholds for block mode selection. The candidates mapping method used for this combination of transcoding use cases is described next.

First, the input quarter-pel MVs are changed to a half-pel MVs.

For intra frames, I16×16 and I4×4 are converted to intra, as it is the only intra block mode supported in MPEG-4.

The procedure used for inter frames in the input image is explained with the help of the block mode mappings captured in Table 4 presented in FIG. 8(*a*). Each of the steps such as 4a and 4b refers to a particular row such as a and b in Table 4.

4a. If all the input MBs were coded using skip, checking is performed the skip block mode using the zero MV (always) and P16×16 using the predicted MV and the four input MVs.

4b. If all the input MBs are coded using P16×16, checking is performed for skip block mode using the zero MV and P16×16 using the predicted MV and the four input MVs.

4c. If all the input MBs are inter MBs but not four skip or four P16×16, checking is performed for all block modes: P16×16, skip and P8×8. First, each 8×8 sub-partition is transformed to an 8×8 block. Then, each MB is transformed to P16×16. For P16×16, the resulting four P16×16 MVs and the predicted MV are tested. For the skip block mode, the zero MV is tested. And for P8×8, each 8×8 MV is chosen from the corresponding MB. For example, for top left 8×8 block, the MV of the MB1 is tested. The predicted MV is also tested. It should be noted that heterogeneous inter modes means that the four MBs are inter but they have different modes (at least two modes).

4d. If at least one MB is coded using I16×16 or I4×4 checking is performed for P16×16, skip, P8×8 and intra. As in 4c), each 8×8 sub-partition is altered to an 8×8 block. Then, each MB is altered to P16×16. I16×16 and I4×4 MBs are altered using the zero MV. P16×16, skip and inter8×8 MVs are generated in the same manner. For intra block mode, no mapping is used.

It should be noted that in the candidates mapping method, the final MVs in 4a), 4b), 4c) and 4d) are downsized by half (divided by 2) and refined to a half pixel precision using a small search window of ±1 (at half-pel precision).

The logical flow for the steps of the procedure for candidates mapping executed during the processing of box 462 in flowchart 450 are explained with the help of flowchart 750 presented in FIG. 8(*b*). For sake of clarity, only the various checks that influence the logical flow are described. The details of all the operations performed in boxes 756, 760, 764, and 768 were described earlier in steps 4a, 4b, 4c and 4d respectively. Please note that procedure 750 is used for inter input frames. It should be noted that Nb_mb_intra4×4>=1 means that the number of I4×4 MBs is at least 1. Similarly, Nb_mb_intra16×16>=1 means that number of I16×16 MBs is at least 1.

Upon start (box 752), procedure 750 tests (box 754) whether on not the mode of the input MB is 4 skip. If so, the procedure exits 'YES' from box 754 and checks the skip and the P16×16 block modes (box 756). Otherwise the procedure 750 exits 'NO' from box 754 and tests whether the mode of the input MB is 4 P16×16 (box 758). If so, the procedure exits 'YES' from box 758 and checks the skip and the P16×16 block modes (box 760). Otherwise the procedure 750 exits 'NO' from box 758 and tests whether the mode of the input MB is 4 Inter (box 762). If so, the procedure exits 'YES' from box 762 and checks the skip, the P16×16 and the P8×8 block modes (box 764). Otherwise the procedure 750 exits 'NO' from box 762 and tests whether Nb_mb_intra4×4>1 or Nb_mb_intra16×16>1 (box 766). If so, the procedure exits 'YES' from box 766 and checks the skip, the P16×16, the P8×8, and the Intra block modes (box 768). Otherwise the procedure 750 exits 'NO' from box 766 and exits (box 770).

Experimental Results

In order to evaluate the video transcoding system and methods, experiments were performed for various transcoding use cases, including bit rate adaptation, spatial resolution adaptation, compression format adaptation and compression format adaptation with spatial resolution adaptation using Intel® Performance Primitives (Intel® IPP) Code Samples that support H.264 Baseline Profile discussed in ISO/IEC 14496-10 AVC and ITU-T rec. H.264, Advanced video coding for generic audiovisual services, March 2009 and MPEG-4 Visual Simple Profile discussed in ISO/IEC 14496-

2, Information technology—Coding of audio-visual objects—Part 2: Visual, second edition, December 2001. Unlike the reference software JM discussed in H.264/AVC reference software JM 16.1 available online at http://iphome-.hhi.de/suehring/tml/. and MoMuSys (described in ISO/IEC 14496-5:2001, "Information technology—Coding of audio-visual objects—Part 5: Reference Software," second edition, February 2005) that employs a rate-distortion optimization loop to get the best quality and the lowest bit rate possible for each MB, which is computationally expensive, real-time and commercial software uses faster predictive algorithms to determine the MB mode using the SAD/SATD or other metrics (IPP uses SATD). This allows one to have a clear picture of the benefit that can be achieved by the architecture and methods of the embodiments of the present invention in the context if real-time transcoders. A total of 9 Common Intermediate Format (CIF) sequences and 5 Common Intermediate Format (QCIF) sequences with low, medium and high motion and different frame rates ranging from 90 to 300 frames were tested. Only one reference frame was used in the simulations. IPP proposes several ME algorithms for each video codec. In the scope of this application, the Enhanced Predictive Zonal Search (EPZS) algorithm (number 3) was used for H.264 and the Logarithmic algorithm (number 4) was used for MPEG-4. Full search motion estimation was not used. The obtained speed-up and quality degradation are given for each method compared with the cascaded method. This latter does not use RDO but uses a predictive algorithm based on predefined thresholds for inter or intra block modes.

FIG. 9 to FIG. 12 present the experimental results of the bit rate reduction for H.264. Three methods were compared: the statistics, the candidates mapping and the candidates mapping with conditional refinement. In the statistics method, only the mode decision is transmitted to the encoder. The candidates mapping method sends modes, MVs and the rest of the metadata to the encoder as described earlier in this document. The chosen MVs are refined using a small search window ±1. The candidates mapping with conditional refinement method is derived from the candidates mapping method where the chosen MVs, for each candidate mode, are refined only if the MV tested currently is different from the predicted MV. For the cascaded approach, the Peak Signal to Noise Ratio (PSNR) is computed between the input and the transcoded video sequences. For the other methods, the PSNR results show the PSNR differences between each alternative method and the cascaded approach. Speed-up is defined as the ratio between the transcoding time required by the cascaded approach and that required by each method being compared. CIF sequences were encoded at 512 and 256 kbps respectively with one intra every 100 frames and were transcoded to 75% and 50% of their original bit rates as shown in FIG. 9 and FIG. 10. QCIF sequences were encoded at 256 and 128 kbps respectively and were transcoded to 75% and 50% of their original bit rates as illustrated in FIG. 11 and FIG. 12. The candidates mapping method is, on an average, more than 2 times faster than the cascaded method. Speed-ups and quality vary greatly between video sequences. It is not surprising to see that speed-ups, while still being substantial, are smaller for sequences dominated with smooth and predictable motion (such as container and news) since a cascaded approach can converge rapidly on optimal motion vectors for such sequences. It is worth noting that the quality of the output image obtained by the candidates mapping method is, on average, similar to that of the cascaded approach for higher input and output bit rates (differences between 0.06 dB and 0.12 dB). But the quality difference increases with a reduction of these input and output bit rates (average difference of 0.27 dB for CIF 256 kbps to 128 kbps and of 0.21 dB for QCIF 128 to 64 kbps).

The candidates mapping with conditional refinement method performs faster than the candidates mapping method (by about 8%) while providing a quite acceptable quality even at lower bit rates. Thus, the choice between these two methods depends on the trade-off one is willing to make between quality and speed-up.

FIG. 13 and FIG. 14 illustrate the results of the spatial resolution reduction for H.264. Four methods were used, statistics, candidates mapping, candidates mapping with conditional refinement and candidates mapping with no refinement. The statistics method reuses the mode decision only. The candidates mapping method maps the modes, MVs and the rest of the metadata at the encoder (as described earlier) where the best MVs are refined using ±1 search window. The candidates mapping with conditional refinement method is derived from the candidates mapping method and the chosen MVs are refined only if the MV tested currently is different from the predicted MV. The candidates mapping with no refinement algorithm is derived from the candidates mapping algorithm where the precision of the input MVs is utilized in the transcoder. CIF sequences were transcoded to different bit rates as shown in FIG. 13 and FIG. 14. The candidates mapping method is, on average, approximately 1.5 times faster than the cascaded method with a reasonable PSNR degradation of about −0.3 dB. The candidates mapping with conditional refinement method performs 17% faster than the candidates mapping method but adds another −0.3 dB of quality deterioration. The candidates mapping with no refinement algorithm is the fastest algorithm (more than 2 times faster) but with a 1 dB of loss in the quality of the output image.

FIG. 15 to FIG. 18 present the experimental results of the compression format adaptation from H.264 BP to MPEG-4 VSP. Three methods were compared: statistics, candidates mapping and candidates mapping with conditional refinement. In the statistics method, only the mode decision is transmitted to the encoder. The candidates mapping method sends modes, MVs and the rest of the metadata to the encoder as described earlier in this document. The chosen MVs are refined using a small search window ±1. The candidates mapping with conditional refinement method is derived from the candidates mapping method where the chosen MVs are refined only if the MV tested currently is different from the predicted MV. CIF and QCIF sequences were transcoded to different bit rates as shown in FIG. 15, FIG. 16, FIG. 17 and FIG. 18 respectively. The candidates mapping method is, on average, 1.34 to 1.84 times faster than the cascaded method. The reason for the resulted speed-ups being less impressive than that observed with the previous operations is that MPEG-4 has only 2 inter modes and one intra mode compared to H.264 (with 4 inter modes and four sub-partitions for the fourth mode and 2 intra modes with several directional prediction). As Intel IPP is highly optimized, the obtained speed-ups are quite acceptable. Meanwhile, the resulted quality degradation is, on an average, close to 1 dB compared to the cascaded approach. Therefore, the candidates mapping method is significantly faster than the cascaded and statistics methods but this benefit comes with a significant penalty in quality. Nevertheless, some real-time system may be ready to accept this quality degradation in order to increase speed. Also, the transcoding architecture used in the embodiments of this invention, can accommodate the various methods presented (cascade, statistics, candidates mapping, candidates mapping with conditional refinement). The candidates mapping with conditional refinement method performs faster than the candidates mapping method but degrades the quality even more.

FIG. 19 and FIG. 20 illustrate the results of compression format adaptation from H.264 BP to MPEG-4 VSP combined with spatial resolution reduction. Two algorithms were used, statistics and candidates mapping. The observed speed-ups are significantly smaller than those observed for the previous transcoding use cases. The statistics method shows no speed benefit compared to the cascaded approach. The candidates mapping method is, on an average, 20% faster but this comes with a significant quality degradation: between 1 dB and 2 dB. The results presented in the earlier paragraphs show that the architecture used in the embodiments of the present invention described in this application supports a wide variety of transcoding operations.

This application presents a unified video system able to perform a group of transcoding use cases. By using this approach, one has a large flexibility to perform a simple transcoding use case such as bit rate adaptation, temporal resolution adaptation (up scaling or down scaling), spatial resolution adaptation (up scaling or down scaling), logo/watermark insertion and compression format adaptation or heterogeneous transcoding where a set of transcoding use cases can be handled on demand. Such a unified transcoder would tremendously reduce the cost to develop software and decrease the efforts for maintenance and update. Moreover, it allows the integration of new transcoding use cases that may be required in the future and avoid developing new stand-alone architectures to support them. Experiments on a prototype subjected to single transcoding use cases as well a set of multiple transcoding use cases were described to illustrate the benefit of the system and the methods for the embodiments of this invention. New methods for bit rate adaptation, spatial resolution reduction, and compression format changing from H.264 to MPEG-4 with or without spatial resolution and bit rate reduction were presented. These methods are mostly illustrative as the architecture described in this application is highly flexible and can accommodate numerous methods and transcoding use cases.

Various changes and modifications of the embodiments shown in the drawings and described in the specification may be made within the scope of the following claims without departing from the scope of the invention in its broader aspect. For example multiple sets of policies, one for each transcoding use case may be deployed for striking the quality-cost tradeoff more efficiently. In addition to the various methods used for candidates mapping a method that never performs conditional refinement and always performs refinement with a full precision can be deployed in the embodiments of the invention. Such a method is expected to produce a very high quality for the output image at a high cost of encoding. Various operations performed during the transcoding may be performed in parallel. Using a multicore CPU to exploit this inherent parallelism can significantly reduce the transcoding time.

Although the embodiments of the invention have been described in detail, it will be apparent to one skilled in the art that variations and modifications to the embodiment may be made within the scope of the following claims.

What is claimed is:

1. A computerized method for transcoding a sequence of input images, each one of the input images comprising input macroblocks of pixels encoded in a first format, into a sequence of output images, each one of the output images comprising output macroblocks of pixels encoded in a second format, the method comprising: transcoding in a computer having a processor, comprising:
   reading a set of transcoding use cases, comprising two or more transcoding use cases, wherein each transcoding use case is characterized by a respective type of adaptation to be performed on an input image of the sequence of input images;
   decoding input macroblocks of the input image, comprising extracting metadata comprising encoding block modes and determining partitions and respective motion vectors, thereby decoding the input image into a decoded input image;
   based on the set of transcoding use cases, determining a number of stages for mapping motion vectors;
   performing transcoding operations on the decoded input image using the extracted metadata, the transcoding operations corresponding to the set of transcoding use cases and comprising mapping motion vectors to generate an adapted input image, each transcoding operation corresponding to a transcoding use case in the set of transcoding use cases; and
   re-encoding the adapted input image to generate a corresponding output image of the sequence of output images.

2. The method of claim 1, wherein the step of determining the number of stages further comprises determining whether a one-stage or a two-stage mapping of motion vectors is to be performed based on one or more of the following:
   types of the transcoding use cases; and
   a number of the transcoding use cases.

3. The method of claim 2, further comprising:
   provided the number of the transcoding use cases is one, determining that one-stage mapping of motion vectors is to be performed;
   provided the number of the transcoding cases is more than one, determining that one-stage mapping or two-stage mapping of the motion vectors is to be performed; and
   the two-stage mapping being performed provided the types of the transcoding use cases comprise a temporal resolution adaptation.

4. The method of claim 2, wherein the two-stage mapping further comprises:
   a first stage mapping, comprising one-to-one mapping of motion vectors for a temporal resolution adaptation; and
   a second stage mapping, comprising one-to-many mapping of the motion vectors for remaining transcoding use cases in the set of transcoding use cases.

5. The method of claim 2, wherein the types of transcoding use cases comprise:
   a bit rate adaptation;
   a temporal resolution adaptation;
   a spatial resolution adaptation;
   a compression format adaptation; and
   a logo/watermark insertion.

6. The method of claim 1, wherein the performing transcoding operations further comprises:
   mapping each one of the input macroblocks into a corresponding output macroblock;
   generating a motion vector for each one of the output macroblocks; and
   performing a conditional refinement of the generated motion vector.

7. The method of claim 6, further comprising determining whether a conditional refinement of motion vectors is to be performed based on a quality level for the output image, and characteristics of the input image and the output image.

8. The method of claim 6, wherein the performing the conditional refinement further comprises increasing accuracy of the generated motion vectors using a predetermined set of conditions.

9. The method of claim 8, wherein the predetermined set of conditions includes a condition that a candidate motion vector for a candidate block mode, chosen from a set of candidate block modes, is same as a predicted motion vector.

10. The method of claim 9, wherein the step of performing the conditional refinement of the generated motion vector further comprises:
performing refinement of the best motion vector provided the best motion vector is the predicted motion vector; and
reusing the candidate motion vector for the candidate block mode, provided the best motion vector is a selected candidate motion vector.

11. The method of claim 6, wherein the step of mapping each one of the input macroblocks into the corresponding output macroblock further comprises:
based on the set of transcoding use cases, generating a set of candidate block modes for the output macroblock, each candidate block mode having a respective set of candidate motion vectors including a predicted motion vector; and
choosing a candidate block mode from the set of candidate block modes that minimizes a cost-quality metric for the output macroblock, the cost-quality metric indicating a cost of encoding and quality of the output image.

12. The method of claim 11, wherein the step of choosing the candidate block mode further comprises:
evaluating the cost-quality metric for the set of candidate motion vectors including the predicted motion vector for each candidate block mode;
selecting the candidate motion vector producing a minimum value for the cost-quality metric as a best motion vector; and
selecting the candidate block mode corresponding to the best motion vector.

13. A computerized system for transcoding a sequence of input images, each one of the input images comprising input macroblocks of pixels encoded in a first format, into a sequence of output images, each one of the output images comprising output macroblocks of pixels encoded in a second format, the system comprising:
a processor;
a non-transitory computer readable storage medium having computer readable instructions stored thereon for execution by the processor, causing the processor to:
read a set of transcoding use cases, comprising two or more transcoding use cases, wherein each transcoding use case is characterized by a respective type of adaptation to be performed on an input image of the sequence of input images;
decode input macroblocks of the input image, comprising extracting metadata comprising encoding block modes, and determining partitions and respective motion vectors, thereby decoding the input image into a decoded input image;
based on the set of transcoding use cases, determine a number of stages for mapping motion vectors;
perform transcoding operations on the decoded input image using the extracted metadata, the transcoding operations corresponding to the set of transcoding use cases and comprising mapping motion vectors and to generate an adapted input image, each transcoding operation corresponding to a transcoding use case in the set of transcoding use cases; and
re-encode the adapted input image to generate a corresponding output image of the sequence of output images.

14. The system of claim 13, wherein the computer readable instructions further cause the processor to determine whether a one-stage or a two-stage mapping of motion vectors is to be performed based on one or more of the following:
types of the transcoding use cases; and
a number of the transcoding use cases.

15. The system of claim 14, wherein the computer readable instructions further cause the processor to:
determine that one-stage mapping of motion vectors is to be performed, provided the number of the transcoding use cases is one;
determining that one-stage mapping or two-stage mapping of the motion vectors is to be performed, provided the number of the transcoding cases is more than one; and
perform the two-stage mapping, provided the types of the transcoding use cases comprise a temporal resolution adaptation.

16. The system of claim 14, wherein the computer readable instructions further cause the processor to perform the two-stage mapping, comprising:
a first stage mapping, comprising one-to-one mapping of the motion vectors for a temporal resolution adaptation; and
a second stage mapping, comprising one-to-many mapping of the motion vectors for remaining transcoding use cases in the set of transcoding use cases.

17. The system of claim 14, wherein the types of transcoding use cases comprise:
a bit rate adaptation;
a temporal resolution adaptation;
a spatial resolution adaptation;
a compression format adaptation; and
a logo/watermark insertion.

18. The system of claim 13, wherein the computer readable instructions further cause the processor to:
map each one of the input macroblocks into a corresponding output macroblock;
generate a motion vector for each one of the output macroblocks; and
perform a conditional refinement of the generated motion vector.

19. The system of claim 18, wherein the computer readable instructions further cause the processor to further determine whether a conditional refinement of motion vectors is to be performed based on a quality level for the output image, and characteristics of the input image and the output image.

20. The system of claim 18, wherein the computer readable instructions further cause the processor to increase accuracy of the generated motion vectors using a predetermined set of conditions.

21. The system of claim 20, wherein the predetermined set of conditions includes a condition that a candidate motion vector for a candidate block mode, chosen from a set of candidate block modes, is same as a predicted motion vector.

22. The system of claim 21, wherein the computer readable instructions further cause the processor to perform the conditional refinement of the generated motion vector, further comprising:
performing refinement of the best motion vector provided the best motion vector is the predicted motion vector; and reusing the candidate motion vector for the candidate block mode, provided the best motion vector is a selected candidate motion vector.

23. The system of claim 18, wherein the computer readable instructions further cause the processor to map each one of the input macroblocks into the corresponding output macroblock, comprising:
  based on the set of transcoding use cases, generating a set of candidate block modes for the output macroblock, each candidate block mode having a respective set of candidate motion vectors including a predicted motion vector; and
  choosing a candidate block mode from the set of candidate block modes that minimizes a cost-quality metric for the output macroblock, the cost-quality metric indicating a cost of encoding and quality of the output image.

24. The system of claim 23, wherein the computer readable instructions further cause the processor to:
  evaluate the cost-quality metric for the set of candidate motion vectors including the predicted motion vector for each candidate block mode;
  select the candidate motion vector producing a minimum value for the cost-quality metric as a best motion vector; and
  select the candidate block mode corresponding to the best motion vector.

* * * * *